(12) United States Patent
Raja et al.

(10) Patent No.: US 7,882,427 B2
(45) Date of Patent: Feb. 1, 2011

(54) SYSTEM AND METHOD FOR MANAGING A SPREADSHEET

(75) Inventors: Ramkumar N. Raja, Milpitas, CA (US); Christopher Pomerantz, San Jose, CA (US); Murali Ramachandran, Fremont, CA (US); Jeffrey R. Duke, Oakland, CA (US)

(73) Assignee: Balenz Software, Inc., Santa Clara, CA (US)

( * ) Notice: Subject to any disclaimer, the term of this patent is extended or adjusted under 35 U.S.C. 154(b) by 842 days.

(21) Appl. No.: 11/761,341

(22) Filed: Jun. 11, 2007

(65) Prior Publication Data

US 2007/0277090 A1  Nov. 29, 2007

Related U.S. Application Data

(63) Continuation-in-part of application No. 10/897,646, filed on Jul. 23, 2004, now Pat. No. 7,231,593.

(60) Provisional application No. 60/489,777, filed on Jul. 24, 2003, provisional application No. 60/517,701, filed on Nov. 6, 2003.

(51) Int. Cl.
*G06F 17/00* (2006.01)
(52) U.S. Cl. .................. 715/212; 715/227; 715/229
(58) Field of Classification Search .................. 715/212, 715/220, 227, 229
See application file for complete search history.

(56) References Cited

U.S. PATENT DOCUMENTS

| | | | |
|---|---|---|---|
| 5,881,381 | A | 3/1999 | Yamashita et al. |
| 5,890,177 | A | 3/1999 | Moody et al. |
| 5,966,716 | A | 10/1999 | Comer et al. |
| 6,249,786 | B1 | 6/2001 | Wadewitz |
| 7,096,082 | B1 | 8/2006 | Connelly |
| 2004/0049730 | A1 | 3/2004 | Ishizaka |
| 2004/0103365 | A1 | 5/2004 | Cox |

OTHER PUBLICATIONS

"Invoice Numbering," Sep. 4, 1999. http://groups-beta.google.com/microsoft.public.excel.templates/msg/lab3b57ae3706c61?dmode=print&hl=en.

*Primary Examiner*—Adam M Queler
(74) *Attorney, Agent, or Firm*—Barnes & Thornburg LLP

(57) ABSTRACT

A system and method for managing a spreadsheet are disclosed. The method may include determining a portion of a digital image of a data statement, determining data of the data statement based on the portion of the digital image, and mapping a data cell of a standardized spreadsheet to the portion of the digital image based on the data of the data statement. The data of the data statement may be determined by applying an optical character recognition process to the digital image. The data cell may be mapped to the portion of the digital image based on a label or key included in the data of the data statement, a set of coordinate values, a mathematical equation, and/or the like. The method may further include determining a location of a second data statement based on the mapping data.

37 Claims, 53 Drawing Sheets

| | | | | | | | | |
|---|---|---|---|---|---|---|---|---|
| | A | B | C | D | E | F | G | H |
| 1 | | | | | | Sep 30, 03 | | |
| 2 | ASSETS | | | | | | | |
| 3 | | Current Assets | | | | | | |
| 4 | | | Checking/Savings | | | | | |
| 5 | | | | Checking | | 9,776.28 | | |
| 6 | | | | Savings | | 29,500.00 | | |
| 7 | | | Total Checking/Savings | | | 39,276.28 | | |
| 8 | | | Accounts Receivable | | | | | |
| 9 | | | | Accounts Receivable | | 32,748.76 | | |
| 10 | | | Total Accounts Receivable | | | 32,748.76 | | |
| 11 | | | Other Current Assets | | | | | |
| 12 | | | | Tools & Equipment | | 5,000.00 | | |
| 13 | | | | Inventory Asset | | 4,391.88 | | |
| 14 | | | | Undeposited Funds | | 34,197.88 | | |
| 15 | | | Total Other Current Assets | | | 43,589.76 | | |
| 16 | | Total Current Assets | | | | 115,614.80 | | |
| 17 | | Fixed Assets | | | | | | |
| 18 | | | Trucks | | | | | |
| 19 | | | | Original Cost | | 33,852.91 | | |
| 20 | | | | Depreciation | | -9,000.00 | | |
| 21 | | | Total Trucks | | | 24,852.91 | | |

Formula bar: =9776.28+29500

| Account Name | Current |
|---|---|
| Statement Date | 9/30/2003 |
| Periods | 3 |
| Total Assets | 0 |
| Total Liabs & Net Worth | 0 |
| Statement Type | Quarterly |
| Accountant | |
| Analyst | Wilma... |
| Current Assets | 0 |
| Cash | 39 |
| Time Deposits | |
| Marketable Securities | |
| Accts/Notes Rec-Trade | |
| Accts/Notes Rec-Related Co | |
| Acct/Notes Rec-Other | |
| Bad Debt Reserve (-) | |
| Operating Current Assets | |
| Raw Materials | |
| Work in Process | |
| Finished Goods | |
| Other Inventory | |
| Supplies | |
| Costs in Excess of Billings | |
| Income Tax Receivable | |
| Def Inc Tax Recover-CP | |
| Prepaids/Deferreds-CP | |

Spread - Valued Client Company                                                                      _ □ X Show/Hide Diff | Highlight Mapped Cells | Highlight Differences | Split Current: 7/31/2004 SUB Add Zone [None ▼] [Fix Zone] [Fit To Width ▼] Page [3 ▼] of 23 ⇐ ⇒ [Submit Spread] [▼] Current Assets [▼] [Save Draft] [Modify Item] [Show/Hide Unused]
[None ▼] [Clear Zone] [Auto Fill] [OCR]                                                              [Notes] [Mapped Cells]

[0    ] /1,000  [fx] [X]

Attachments

2004
Financials.pdf

| | July 31, | |
| --- | --- | --- |
| | 2004 | 2003 |
| CONSOLIDATED BALANCE SHEET | | |
| ASSETS | | |
| CURRENT ASSETS | | |
| Cash and cash equivalents | $ 4,906,389 | $ 3,372,130 |
| Contract receivables | | |
| Progress billings | 7,960,015 | 7,789,321 |
| Unbilled | 4,381 | - |
| Retentions | 1,022,754 | 1,243,532 |
| Allowance for doubtful accounts | (174,259) | (166,672) |
| Total contract receivables | 8,812,891 | 8,866,181 |
| Notes receivable | 30,976 | 5,658 |
| Other receivables | 3,525 | 840 |
| Due from joint venture | 150,000 | - |
| Costs and estimated earnings in excess of billings on uncompleted contracts | 1,423,568 | 1,267,417 |
| Work in process | - | 176,878 |
| Materials inventories | 188,139 | 148,753 |
| Federal tax deposit | 44,452 | 290,483 |
| Prepaid expenses and other current assets | 393,460 | 489,281 |
| Total current assets | 15,953,400 | 14,617,631 |
| PROPERTY AND EQUIPMENT | | |
| Land | 189,000 | 189,000 |
| Building | 711,000 | 711,000 |
| Leasehold improvements | 1,218,072 | 1,218,162 |
| Automotive equipment | 2,535,373 | 2,417,600 |
| Shop and construction equipment | 5,008,785 | 5,092,774 |
| Office furniture and equipment | 532,920 | 506,683 |
| | 10,195,150 | 10,135,219 |
| Less accumulated depreciation and amortization | 7,203,310 | 7,017,817 |
| Property and equipment, net | 2,991,840 | 3,117,402 |
| GOODWILL | 179,906 | 203,470 |

| Account Name | Current |
| --- | --- |
| Statement Date | 7/31/2004 |
| Periods | 12 |
| Total Assets | 0 |
| Total Liabs & Net Worth | 0 |
| Unexplained Adj to R/E | ? |
| Statement Type | FY-To-Date |
| Accountant | csmith |
| Analyst | |
| Reconcile | <NONE> |
| Current Assets | |
| Cash | 0 |
| Time Deposits | |
| Marketable Securities | |
| Accts/Notes Rec-Trade | |
| Bad Debt Reserve (-) | |
| Loans to Related Co - CP | |
| Due from Related Co - CP | |
| Accts/Notes Rec-other | |
| Income Tax Receivable | |
| Def Inc Tax Recover - CP | |
| Raw Materials | |
| Work in Process | |
| Finished Goods | |
| Other Inventory | |
| Supplies | |
| Costs in Excess of Billings | |
| Operating Current Assets | |
| Prepaid/Deferreds - CP | |
| Operating Current Assets | |
| Derivative Assets - CP | |
| Non-Op Current Assets | |
| Memo - 0 Decimals | |
| LIFO Reserve | |
| Off Bal Sheet Cur Assets | |
| Memo - 2 Decimals | |

Rounding: Thousands | Balance: + | Type: Cash_near Cash | Flow: Cash

Spread - Valued Client Company

Current: 7/31/2004 SUB

Attachments: 2004 Financials.pdf

CONSOLIDATED STATEMENT OF INCOME AND COMPREHENSIVE INCOME

Profit & Loss - 1

Year Ended July 31,

| | 2004 | 2003 |
|---|---:|---:|
| REVENUES | | |
| Construction contracts | $ 36,883,836 | $ 36,428,712 |
| Metal fabrication | 6,904,514 | 10,684,617 |
| Energy | 1,105,814 | 5,501,004 |
| Refinery maintenance | 3,545,085 | 2,029,625 |
| | 48,439,229 | 54,643,958 |
| COST REVENUES | | |
| Construction contracts | 32,685,955 | 32,442,845 |
| Metal fabrication | 4,463,689 | 7,760,007 |
| Energy | 1,058,779 | 4,473,383 |
| Refinery maintenance | 2,392,437 | 1,676,567 |
| Under applied indirect costs | 1,295,414 | 707,447 |
| | 42,496,274 | 47,060,249 |
| GROSS PROFIT | 5,942,955 | 7,583,709 |
| GENERAL AND ADMINISTRATIVE EXPENSES | 6,113,738 | 6,983,219 |
| (LOSS) / INCOME FROM OPERATIONS | (170,783) | 600,490 |
| GAIN ON SALE OF INVESTMENTS | 898,525 | - |
| OTHER INCOME, NET | 50,302 | 362,302 |
| INCOME BEFORE MINORITY INTEREST | 778,044 | 962,792 |
| MINORITY INTEREST IN JOINT VENTURE | (40,159) | 389,535 |
| INCOME BEFORE INCOME TAXES | 818,203 | 573,257 |
| INCOME TAX | 10,489 | 14,889 |
| NET INCOME | $ 807,714 | $ 558,368 |

Account Name: Current
Statement Date: 7/31/2004
Periods: 12
Total Assets: 0
Total Liabs & Net Worth: 0
Unexplained Adj to R/E: ?
Statement Type: FY-To-Date
Accountant: csmith
Analyst: <NONE>
Reconcile: 0

Current Assets / Cash / Time Deposits / Marketable Securities / Accts/Notes Rec-Trade / Bad Debt Reserve (-) / Loans to Related Co - CP / Due from Related Co - CP / Accts/Notes Rec-other / Income Tax Receivable / Def Inc Tax Recover - CP / Raw Materials / Work in Process / Finished Goods / Other Inventory / Supplies / Costs in Excess of Billings / Operating Current Assets / Prepaid/Defenrreds - CP / Operating Current Assets / Derivative Assets - CP / Non-Op Current Assets / Memo - 0 Decimals / LIFO Reserve / Off Bal Sheet Cur Assets / Memo - 2 Decimals Rounding: Thousands | Balance: + | Type: Cash_near Cash | Flow: Cash

Spread - Valued Client Company

Show/Hide Diff | Highlight Mapped Cells | Highlight Differences | Split

Current: 7/31/2004 SUB

Attachments | Add Zone None | Fix Zone | Width | Fit To | Page 3 of 23 | Clear Zone None | Auto Fill | OCR 2004 Financials.pdf

CONSOLIDATED BALANCE SHEET

Balance Sheet - 1

| | July 31, | |
|---|---|---|
| | 2004 | 2003 |
| ASSETS | | |
| CURRENT ASSETS | | |
| Cash and cash equivalents | $ 4,906,389 | 3,372,130 |
| Contract receivables | | |
| Progress billings | 7,960,015 | 7,789,321 |
| Unbilled | 4,381 | - |
| Retentions | 1,022,754 | 1,243,532 |
| Allowance for doubtful accounts | (174,259) | (166,672) |
| Total contract receivables | 8,812,891 | 8,866,181 |
| Notes receivable | 30,976 | 5,658 |
| Other receivables | 3,525 | 840 |
| Due from joint venture | 150,000 | |
| Costs and estimated earnings in excess of billings on uncompleted contracts | 1,423,568 | 1,267,417 |
| Work in process | - | 176,878 |
| Materials inventories | 188,139 | 148,753 |
| Federal tax deposit | 44,452 | 290,493 |
| Prepaid expenses and other current assets | 393,460 | 489,281 |
| Total current assets | 15,953,400 | 14,617,631 |
| PROPERTY AND EQUIPMENT | | |
| Land | 189,000 | 189,000 |
| Building | 711,000 | 711,000 |
| Leasehold improvements | 1,218,072 | 1,218,162 |
| Automotive equipment | 2,535,373 | 2,417,600 |
| Shop and construction equipment | 5,008,785 | 5,092,774 |
| Office furniture and equipment | 532,920 | 506,683 |
| | 10,195,150 | 10,135,219 |
| Less accumulated depreciation and amortization | 7,203,310 | 7,017,817 |
| Property and equipment, net | 2,991,840 | 3,117,402 |
| GOODWILL | 179,906 | 203,470 |

Submit Spread | Current Assets | Save Draft | Modify Item | Mapped Cells
Notes | Show/Hide Unused / 1,000 | fx | X

| Account Name | Current |
|---|---|
| Statement Date | 7/31/2004 |
| Periods | 12 |
| Total Assets | 0 |
| Total Liabs & Net Worth | 0 |
| Unexplained Adj to R/E | ? |
| Statement Type | FY-To-Date |
| Accountant | csmith |
| Analyst | |
| Reconcile | <NONE> |
| Current Assets | |
| Cash | 0 |
| Time Deposits | |
| Marketable Securities | |
| Accts/Notes Rec-Trade | |
| Bad Debt Reserve (-) | |
| Loans to Related Co - CP | |
| Due from Related Co - CP | |
| Accts/Notes Rec-other | |
| Income Tax Receivable | |
| Def Inc Tax Recover - CP | |
| Raw Materials | |
| Work in Process | |
| Finished Goods | |
| Other Inventory | |
| Supplies | |
| Costs in Excess of Billings | |
| Operating Current Assets | |
| Prepaid/Deferreds - CP | |
| Operating Current Assets | |
| Derivative Assets - CP | |
| Non-Op Current Assets | |
| Memo - 0 Decimals | |
| LIFO Reserve | |
| Off Bal Sheet Cur Assets | |
| Memo - 2 Decimals | |

Rounding: Thousands | Balance: + | Type: Cash_near Cash | Flow: Cash

SYSTEM AND METHOD FOR MANAGING A SPREADSHEET

This application is a continuation-in-part of U.S. patent application Ser. No. 10/897,646, filed on Jul. 23, 2004, the entirety of which is hereby incorporated by reference herein. This application also claims priority under 35 U.S.C. §119(e) to U.S. Provisional Application Ser. No. 60/489,777, filed on Jul. 24, 2003, the entirety of which is hereby incorporated by reference herein, and to U.S. Provisional Application Ser. No. 60/517,701 filed on Nov. 6, 2003, the entirety of which is also hereby incorporated by reference herein.

BACKGROUND OF THE DISCLOSURE

The present disclosure relates to systems and methods for managing spreadsheets, and more particularly to a system and method for managing a standardized spreadsheet such as an industry model spreadsheet.

In many business transactions, data statements are provided to a company by a customer. The data statements may include any type of data required by the company such as financial data, product quality data, demographic data, identification data, advertising data, or any other type of data used by the company. Accordingly, the data statements may take one of a number of forms including financial statements, product data statements, insurance statements, applications, and the like. The data statements are typically analyzed using predefined analysis procedures and/or compared with other data statements including historic data statements such as data statements from the same and/or other customers. Business decisions, such as loan approvals, may then be based on the results of such analysis and comparisons.

Once received, the data statements are typically entered into a data analyzing system to compare them with other data statements and/or analyze them using a predefined analysis algorithm. To provide consistency and improve accuracy of the analysis process, the analyzing systems typically accept the data of the data statements via a standardized spreadsheet. Because the data statements may take any one of a number of forms, may vary between customers and reporting periods (i.e., the time periods at which reoccurring data statements are provided by the customer), and are typically not organized in a predefined format, the data statements are usually entered into the standardized spreadsheet by hand. The standardized spreadsheet may be standardized based on any criteria adopted by the company or industry using the spreadsheet. For example, the standardized spreadsheet may be standardized based on a type of product, service customer profile or any other criteria capable of improving the consistency and accuracy of the analysis process. The process of entering data from the data statement into the standardized spreadsheet is commonly known as "spreading" the data statement. However, because the data statements typically vary and are entered in by hand, among other adverse factors, the spreading process may be inaccurate, inconsistent, and inefficient.

One particular example of the difficulties associated with spreading data statements involves the financial industry. The financial industry utilizes financial industry model spreadsheets as standardized spreadsheets to organize the financial data provided by various customers and improve analysis of such data. The finance industry models are typically based on broad industry classifications such manufacturing, retail, and service industries. The financial data is provided to a finance company, such as a bank or loan company, by the customer in the form of a financial statement. The financial statement may be provided to the finance company via email, a fax, through online acquisition from a public reporting agency, or through other means of conveyance. Accordingly, the financial statement may be embodied as a spreadsheet or fax. The financial statements are typically routed first to a relations manager of the finance company. The relations manager forwards the statements to a financial analyst. The analyst then spreads the financial statement into the financial industry model spreadsheet (i.e., inaccurately spread). To do so, the analyst enters the financial data contained in the financial statement into the financial industry model spreadsheet. However, because the financial statements may vary over time and across different customers, inaccuracies and inconsistencies may occur. Once the financial statement has been spread, a financial data analyzing system may be used to analyze the financial data. However, if the financial data has been inaccurately entered into the financial industry model spreadsheet, the analysis will be inaccurate. Accordingly, any business decision, such as granting or denying a loan application, made by the relations manger based on such inaccurate analysis will be erroneous.

SUMMARY OF THE DISCLOSURE

According to one aspect, a method for managing a standardized spreadsheet may include displaying a digital image of a first data statement and/or the standardized spreadsheet to a user. The method may also include determining data of the first data statement based on the digital image. The data of the first data statement may be determined by performing an optical character recognition process on the digital image. For example, the optical character recognition process may be performed on the entire digital image or on a portion of the digital image less than the entire digital image. The method may also include selecting a second portion of the digital image including the first portion. In such embodiments, the optical character recognition process may be performed on the second portion of the digital image.

The method may also include determining a first portion of the digital image based on a first selection made by the user. For example, a set of coordinates of a spatial portion may be determined based on the first selection by the user. In such embodiments, the set of coordinates may be stored. The method may further include determining a data cell of the standardized spreadsheet based on a second selection made by the user. For example, a data cell of an industry financial model spreadsheet may be determined based on the second selection made by the user. Additionally, the method may include mapping the data cell of the standardized spreadsheet to the first portion of the digital image. The data cell may be mapped to the first portion by mapping the data cell of the standardized spreadsheet to the first portion of the digital image using at least a portion of the data.

In some embodiments, the data of the first data statement may include a label and/or an associated numeric value. In such embodiments, mapping the data cell of the standardized spreadsheet to the first portion of the digital image may include storing the label in a relationship to the data cell of the standardized spreadsheet. The method may also include copying the numeric value into the data cell of the standardized spreadsheet. Additionally, the method may include indicating errors in the data of the first data statement to the user. For example, the method may include determining the validity of the numeric value and/or determining the validity of the spelling of the label. The errors may be indicated to the user by highlighting a portion of the digital image. In some embodiments, the method may include indicating to the user that the data cell of the standardized spreadsheet is mapped to the portion of the first data statement. Additionally, in some embodiments, the method may include notifying the user that the first data statement has been received.

The method may also include receiving a digital image of a second data statement, determining data of the second data statement based on the digital image of the second data statement, and/or comparing the data of the first data statement and the data of the second data statement. Additionally, the method may include indicating differences of the data of the second data statement relative to the data of the first data statement. For example, the method may include indicating whether a row has been added to and/or deleted from the second data statement relative to the first data statement. The method may further include determining a second portion of the digital image of the data statement based on a selection made by the user and associating the second portion of the digital image to the data cell of the standardized spreadsheet. Additionally, the method may include indicating to the user that the data cell has been associated with the second portion. The method may further include determining the data of the second portion of the digital image, wherein associating the second portion of the digital image to the data cell of the standardized spreadsheet comprises associating the data of the second portion of the digital image to the data cell of the standardized spreadsheet.

According to another aspect, a computer may include a processor and a memory device. The memory device may be electrically coupled to the processor. The memory device may have stored therein a plurality of instructions which, when executed by the processor, cause the processor to display a digital image of a first data statement and a standardized spreadsheet to a user. The plurality of instructions may also cause the processor to determine a first portion of the digital image based on a first selection made by the user. Additionally, the plurality of instructions may cause the processor to perform an optical character recognition process on the first portion of the digital image to determine data of the first data statement. Further, the plurality of instructions may cause the processor to determine a second portion of the digital image within the first portion based on a second selection by the user. The plurality of instructions may also cause the processor to determine a data cell of the standardized spreadsheet based on a third selection made by the user. The plurality of instructions may further cause the processor to map the data cell of the standardized spreadsheet to the second portion of the digital image. For example, the plurality of instructions may cause the processor to map the data cell of the standardized spreadsheet to the first portion of the digital image using at least a portion of the data.

In some embodiments, the data of the first data statement includes a label and an associated numeric value. In such embodiments, the plurality of instructions may cause the processor to store the label in a relationship to the data cell of the standardized spreadsheet. Additionally, the plurality of instructions may cause the processor to copy the numeric value into the data cell of the standardized spreadsheet. Further, the plurality of instructions may cause the processor to determine the validity of the numeric value.

Additionally, in some embodiments, the plurality of instructions may also cause the processor to receive a digital image of a second data statement, determine a first portion of the digital image of the second data statement based on a fourth selection made by the user, perform an optical character recognition process on the first portion of the digital image of the second data statement to data of the second data statement, and/or compare the data of the first data statement and the data of the second data statement. In such embodiments, the plurality of instructions may further cause the processor to indicate differences of the data of the second data statement relative to the data of the first data statement. Additionally, the plurality of instructions may cause the processor to determine a second portion of the digital image of the data statement based on a fifth selection made by the user and associate the second portion of the digital image to the data cell of the standardized spreadsheet. Yet further, the plurality of instructions may cause the processor to determine the data of the second portion of the digital image and associate the data of the second portion of the digital image to the data cell of the standardized spreadsheet.

According to a further aspect, a method for providing a digital image of a data statement may include displaying the digital image to a user and highlighting a spatial portion of the digital image in response to the user selecting a data cell of a standardized spreadsheet. The spatial portion may be determined based on a stored mapping of the data cell. The stored mapping may include, for example, a set of coordinates, a label, or the like.

BRIEF DESCRIPTION OF THE DRAWINGS

Figure 5:
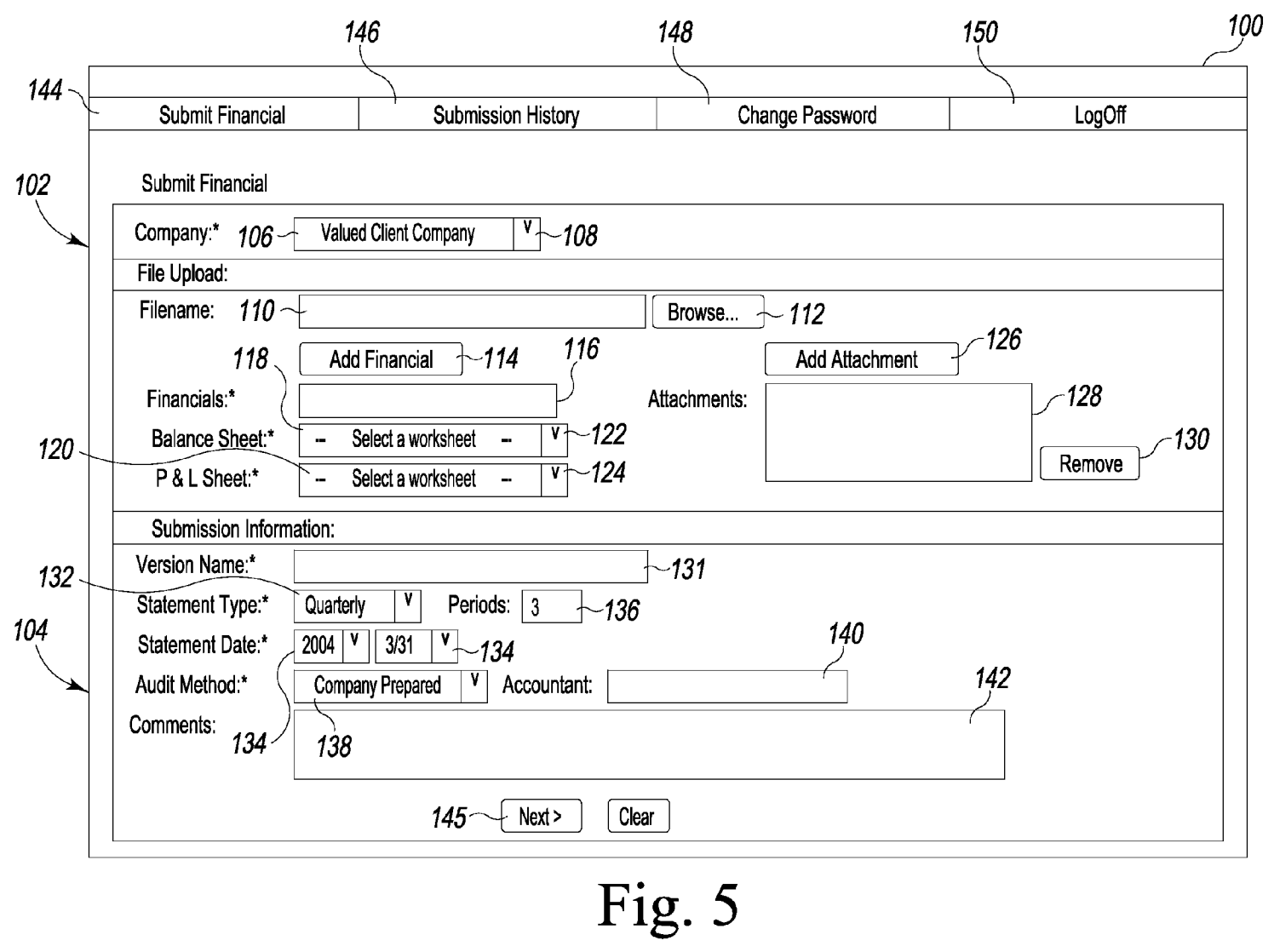

FIGS. 5-13 illustrate various screen displays which are displayed on a client machine during operation of the system of FIG. 1;

FIGS. 15-52 illustrate various screen displays that are displayed on a client machine during the execution of the algorithm of FIG. 14.

DETAILED DESCRIPTION OF THE DRAWINGS

Figure 1:
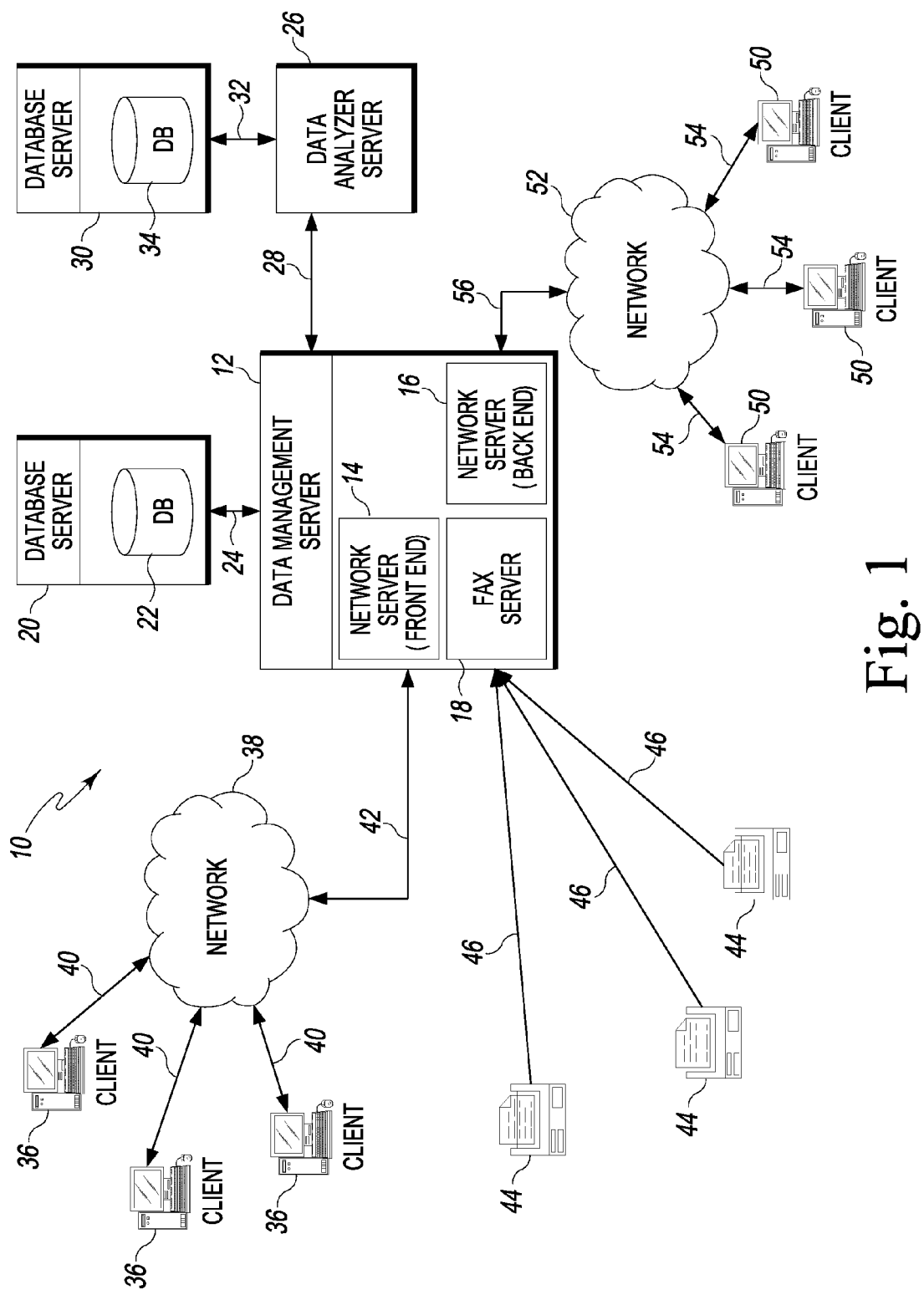
FIG. 1 is a simplified block diagram of a network-based system which incorporates the features of the present disclosure therein.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In regard to one illustrative embodiment, as shown in FIG. 1, a system 10 for managing a spreadsheet includes a data management server 12. The data management server 12 includes a front end network server 14 and a back end network server 16. Additionally, the data management server 12 may include a digital image server 18 such as a fax server. In FIG. 1, the front end network server 14, the back end network server 16, and the digital image server 18 are embodied as portions of a single data management server machine. However, in other embodiments, the data management server 12 may include separate, but communicatively coupled, servers 14, 16, 18.

The system 10 also includes a database server 20 having an associated database 22. The database server 20 is coupled to the data management 12 server via a communication link 24. The system 10 may also include a data analyzer server 26 coupled to the data management server 12 via a communication link 28. A database server 30 may be communicatively coupled to the data analyzer server 26 via a communication link 32. The database server 30 includes an associated database 34. Although shown as separate data servers, in some embodiments, the database servers 20, 30 are a single database server with separate databases 22, 34 stored therein.

A number of client machines 36 may communicate with the front end network server 14 of the data management server 12 via a network 38. The network 38 may be embodied as any type of network such as a local area network (LAN) or a wide area network (WAN). Moreover, in a specific illustrative embodiment, the network 38 is embodied as a publicly-accessible global network such as the Internet. Each of the client machines 36 is coupled to the network 38 via a communication link 40. Similarly, the front end network server 14 is coupled to the network 38 via a communication link 42. It should be appreciated that the communication links 40, 42 may be provided as any number of different types of data links including both wired and wireless data links. Moreover, it should also be appreciated that one or more intervening modems (not shown), data routers (not shown), and/or Internet service providers ("ISPs") (not shown) may be used to transfer the data between the data management server 12, the client machines 36, and the network 38.

A number of scanners 44 may communicate with the digital image server 18 of the data management server 12 via one of a number of communication links 46. The scanners 44 may be of any type of document scanner capable of producing a digital image of a document such as, but not limited to, a fax machine, a digital copier, and the like. The communication links 46 may be provided as any number of different types of data links including both wired and wireless data links. In one specific embodiment, the communication links 46 may form a portion of the public switched telephone network (PSTN) system. Alternatively, the scanners 44 may be communicatively coupled to a remote digital image server configured to communicate with the data management server 12 via the network 38 and communication link 42.

The system 10 also includes a number of client machines 50 communicatively coupled to the back end network server 16 of the data management server 12 via a network 52. The network 52 may be embodied as any type of network such as a LAN or WAN. Additionally, in some embodiments, the network 52 and the network 38 may be the same network. For example, the networks 38, 52 may be embodied as a publicly-accessible global network such as the Internet. Each of the client machines 50 is coupled to the network 52 via a communication link 54. Similarly, the back end network server 16 is coupled to the network 52 via a communication link 56. It should be appreciated that the communication links 54, 56 may be provided as any number of different types of data links including both wired and wireless data links. Moreover, it should also be appreciated that one or more intervening modems (not shown), data routers (not shown), and/or Internet service providers ("ISPs") (not shown) may be used to transfer the data between the data management server 12, the client machines 50, and the network 52. Further, in such embodiments, the network 52 may be communicatively coupled to both network servers 14, 16.

Although three client machines 36, three scanners 44, and three client machines 50 are illustratively shown in FIG. 1, it should be appreciated that the system 10 may include any number of client machines 36, scanners 44, and client machines 50. Additionally, the system may include any number of data management servers 12, data analyzer servers 26 and database servers 20, 30.

In a conventional manner, each of the data management server 12, front end network server 14, back end network server 16, digital image server 18, client machines 36, 50, data analyzer server 26, and/or the database servers 20, 30 includes a number of components commonly associated with such machines. For example, although not shown in detail in the drawings, each of the servers 14, 16, digital image server 18, client machines 36, 50, data analyzer server 26, and the database servers 20, 30 may include, amongst other things customarily included in such machines, a central processing unit ("CPU"), a non-volatile memory such as a read only memory ("ROM"), a volatile memory such as a random access memory ("RAM"), and one or more data storage devices. It should also be appreciated that such components may be integrated into a single housing or may be provided as a number of separate, discrete devices. It should also be realized that the data management server 12, front end network server 14, back end network server 16, digital image server 18, client machines 36, 50, data analyzer server 26, and/or the database servers 20, 30 may be operated with known, commercially available software operating systems.

As such, the front end network server 14 and back end network server 16 may be embodied as any type of commercially available network servers. The storage devices associated with the network servers 14, 16 maintain a number of databases and files which are utilized in the construction and operation of an information portal such as a website or user interface. The network servers 14, 16 may also function as gateways (not shown) for exchanging information across networks that are incompatible and that use different protocols. The gateway may be embodied as any combination of commercially available hardware and/or software that connects different types of networks such that information can be exchanged therebetween.

Similarly, the data servers 20, 30 may be embodied as any type of commercially available data servers. The storage devices associated with the data servers 20, 30 maintain a number of databases and files which are utilized in the storage and analysis of data. In particular, the data server 20 maintains one or more databases 22 which are used to store data statements waiting to be spread and standardized spreadsheets containing data previously spread. For example, the database 22 may have stored therein a number of financial statements received from customers and a number of financial industry model spreadsheets containing financial data previously spread from previously received financial statements. Similarly, the data server 30 maintains one or more databases 34 for storing standardized spreadsheets containing data spread from data statements received by the data management server 12, as well as, other application data used by the data analyzer server 26 to analyze data contained in the standardized spreadsheets.

The client machines 36, 50 preferably include output devices such as display monitors (not shown) for displaying a number of images to a user. As such, the clients 36, 50 may be embodied as any type of commercially available computing device such as a personal computer ("PC"). Moreover, the clients 36, 50 may also be embodied as "mobile" devices such as cellular phones, mobile data terminals, portable computers, personal digital assistants ("PDA"), or some other device of similar kind.

A customer may utilize one of the client machines 36 or scanners 44 to submit one or more data statements to the data management server 12. A data statement may include any type of data requested by a company. For example, the data statements may include financial data, product quality data, demographic data, identification data, advertising data, or any other type of data used by the company. Accordingly, the data statements may take one of a number of forms including financial statements, product data statements, insurance statements, applications, and the like. In one specific embodiment, the data statements are financial statements including financial data related to the customer. The data statements may be embodied as a spreadsheet, a digital image such as a fax, or formatted data using, for example, Extensible Markup Language (XML) or Hypertext Markup Language (HTML). In one specific embodiment, the data statements are embodied as an Excel spreadsheet created using Microsoft Excel which is commercially available from Microsoft Corporation of Redmond, Wash.

A customer may submit a data statement spreadsheet using one of the client machines 36. To do so, the customer may access the data management server 12 via the network 38 and the front end network server 14. In the case of an internet-based system (i.e., the network 38 is embodied as the Internet), the network server 14 is embodied as a web server and, as such, hosts a website which may be accessed by the customer from one of the client machines 36. In doing so, a data statement user interface is downloaded from the front end network server 14 to the customer's client machine 36. The customer may then provide identification information and attach a data statement for submission to the data management server 12. Alternatively, the customer may submit the data statement via email using an appropriate email software program. In such embodiments, the data statement is attached to an email and transmitted from the client machine 36 to the data management server 12 via the network 38. Further, in some embodiments, the customer may provide a hard copy of the data statement spreadsheet to the company. A user (e.g., a company analyst or relations manager) of the system 10 may then submit the data statement spreadsheet to the data management server 12 using one of the client machines 50. The submission process of the data statement spreadsheets via the client 36 and the submission process of the data statement spreadsheets via the client 50 are similar. In particular, the user of the client 50 may be presented with a data statement user interface similar to the data statement user interface presented to a customer via one of the client machines 36. Yet further, the data statements may be acquired by the company from a public reporting agency such as EDGAR Online commonly available at http://www.edgaronline.com. Such data statements are typically in the form of a spreadsheet and may be electronically submitted to the data management server 12 by a user.

A customer may also submit a data statement image, such as a data statement fax, using one of the scanners 44. To do so, the customer may provide a print out or other hard copy of the data statement to the scanner 44. The scanner 44 converts the hard copy of the data statement to a software copy (e.g., as an image of the hard copy) using a method commonly known and transmits the software copy of the data statement to the digital image server 18 of the data management server 12 via the communication links 46. In some embodiments, the digital image is provided to the data management server 12 via an email. For example, the digital image server 18 may be configured to produce an email containing the digital image upon receipt of the digital image from the scanner 44.

After the data statement has been received by the data management server 12, the server 12 stores the data statement in the database 22 of the database server 20. A user of the system 10 may then use a client machine 50 to spread the data statement. As used herein, the term "spread" refers to the process of transferring data from a data statement, such as a spreadsheet or fax, to a standardized spreadsheet, such as a financial industry model spreadsheet. Spreading may be done manually by entering in data contained in the data statement into the standardized spreadsheet by hand. Alternatively, spreading may be done automatically by copying data contained in the data statement to the standardized spreadsheet based on some criteria, such as identity data including location data, text labels, and spatial coordinates, as will be explained in greater detail below in regard to FIG. 2. Additionally, as used herein, the term "standardized spreadsheet" refers to any spreadsheet used by a company, corporation, or other institution to bring into conformity the reporting of information of a client or customer irrespective of how the information is presented or provided by the customer. Such spreadsheets may be standardized based on any one or more criteria defined by the company using the spreadsheet. For example, the spreadsheet may be standardized based on the type of product or service, type of company or industry, type of data reported, customer profiles, or any other criteria adopted by the company using the spreadsheet. One example of a standardized spreadsheet is a financial industry model spreadsheet.

To spread the data statement, the user communicates with the data management server 12 via the network 52 and the back end network server 16. In doing so, a spreading user interface is downloaded from the back end network server 16 to the user's client machine 50. Utilizing the spreading user interface, the user may manually or automatically spread the data statement, identify changes in the data statement relative to previously spread data statements, and the like, as discussed below in regard to FIGS. 5-52.

Once the data statement has been spread into the standardized spreadsheet, the standardized spreadsheet may be submitted to the data analyzer server 26. To do so, the data management server may use an application program interface (API) to convert the data contained in the standardized spreadsheet to a format acceptable to a data analysis software program stored on and executed by the data analyzer server 26. For example, in one specific embodiment, the data management server 12 first converts the data contained in the standardized spreadsheet to XML data using Extensible Markup Language (XML). The XML data is subsequently converted to a format acceptable by the data analysis software program using an API. Accordingly, by converting the data of the standardized spreadsheet first into XML data, the data can be subsequently formatted for any data analysis program by use of alternative APIs.

The data analysis software is stored on and executed by the data analyzer server 26. The data analysis software may be any type of software for analyzing data. Typically, the data analysis software is industry dependant and configured to analyze a particular type of data such as financial data, product quality data, and the like. In one specific embodiment, the data analysis software is Moody's KMV Financial Analyst commonly available from Moody's KMV of San Francisco, Calif.

Once the data has been submitted to the data analyzer server 26, a user may utilize the data analysis software to analyze the submitted data. Depending upon the specific data analysis software, such analysis may include comparison of data based on previously submitted data or standards, identification of risk factors, identification of invalid data, and the like. Based upon such analysis of the data, the user may make business decisions such as approving or denying a loan application, rejection of an order or product, adjustment of a market plan, or any other business decision based upon the analysis of the data.

In one specific embodiment of the present disclosure, an analyst of a finance company may use one of the client machines 50 to spread a financial statement received by the data management server 12 into a financial industry model spreadsheet. The financial statement may be in the form of a spreadsheet or a digital image such as a fax image. Once the financial statement has been spread, the analyst may submit the financial industry model spreadsheet to the data analyzer server 26. In doing so, the data contained in the financial industry model spreadsheet is converted into a format acceptable by the data analysis software being executed on the data analyzer server 26. Once the financial industry model spreadsheet has been submitted, the analyst may utilize the data analysis program to analyze the data based on one of a number of criteria. The analysis of the data may then be forwarded to a relations manager of the finance company. Based on such analysis, the relations manager may make a business decision such as the approval or denial of a loan application and the like. Additionally, the analysis may provide warnings of financial risk thereby allowing the relations manager to react accordingly.

Figure 2:
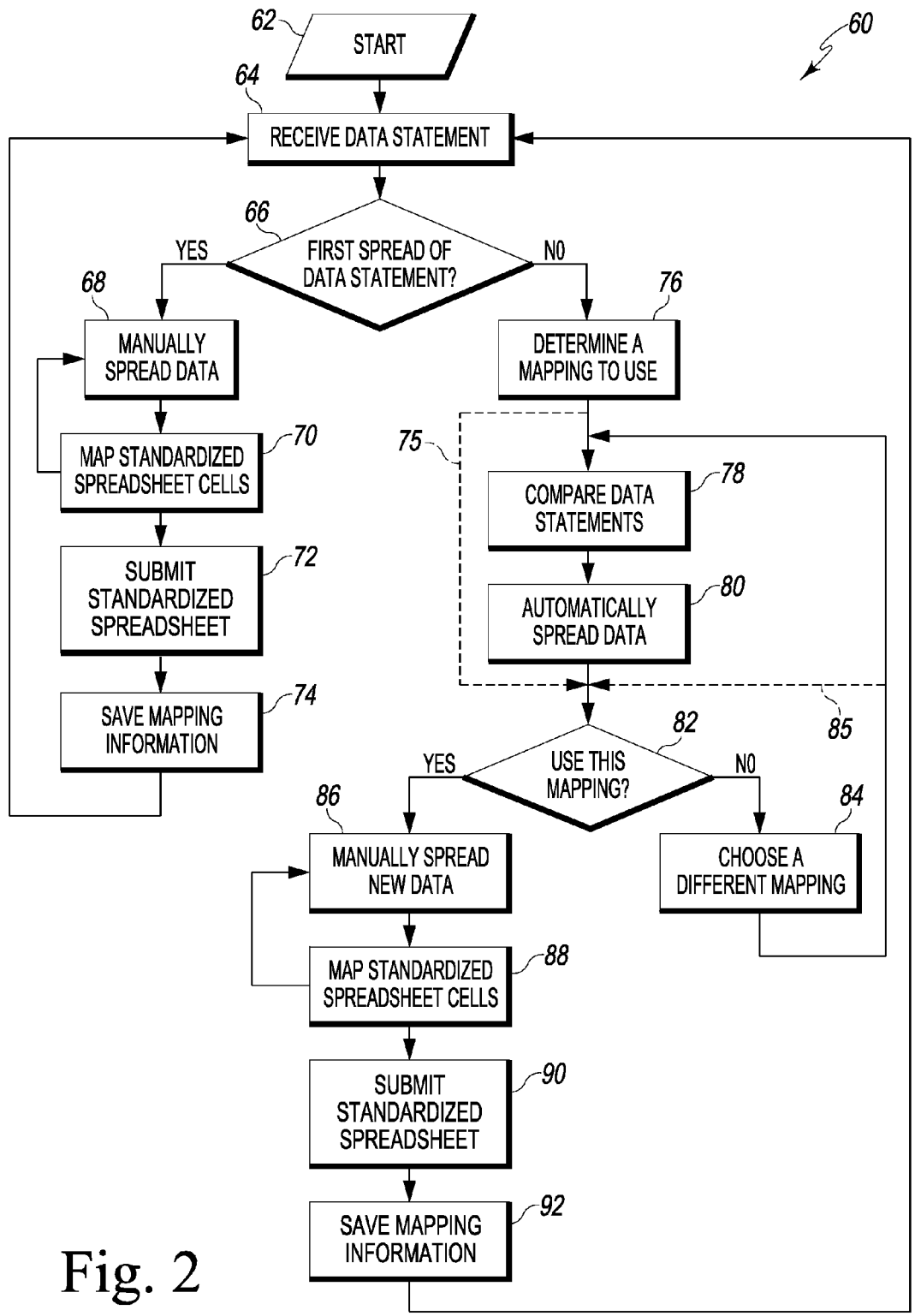
FIG. 2 illustrates an algorithm for spreading a data statement used by the system of FIG. 1.

Referring now to FIG. 2, an algorithm 60 for spreading a data statement is illustrated and begins with process step 62. In process step 62, initialization steps and procedures may be performed. For example, in process step 62, a communication link between the data management server 12 and one of the client machines 50 may be established. Subsequently, in process step 64, a data statement is received by the data management server 12. As discussed above in regard to FIG. 1, the data statement may be embodied as a spreadsheet, a digital image such as a fax, or other formatted data; may include any type of data such as financial data, product quality data, demographic data, identification data, advertising data; and may take one of a number of forms including financial statements, product data statements, insurance statements, applications, and the like. The data statement may be received from a client machine 36 via the network 38, from a scanner 44 via communication links 46, or from a client machine 50 via the network 52. For example, in some applications, an analyst may provide the data statement to the data management server 12 via the client machine 50.

In some embodiments, when a new data statement is received from a customer, the system 10 is configured to provide a notification to user associated with the customer. For example, a notification email may automatically be sent by the system 10 to the associated analyst. Additionally, if a new data statement has not been received from the customer within a predefined period of time, a notification may be provided to the associated relations manager, analyst, or other user. Based on such a notification, the user may contact the customer to determine the reason for the delay.

When a new data statement is received, the user may view a list containing newly received data statements and select one of the data statements to be spread. If the data statement is embodied as a digital image, the data statement may also need to be assigned to a particular company or customer before it may be spread. Once a user has selected a new data statement to be spread, the user is presented with a spreading user interface including the data statement and a standardized spreadsheet via the client machine 50.

In process step 66, it is determined if the current data statement is the first data statement to be spread for the particular customer submitting the data statement. The system 10 may determine if the current data statement is the first data statement for the customer to be spread based on one or more of a number of criteria including, for example, customer identification data, the existence of previously spread data statements, the existence of stored standardized spreadsheets, or the like.

If the current data statement is the first data statement for the customer to be spread, the algorithm 60 advances to process step 68. In process step 68, the data statement is manually spread into a standardized spreadsheet. To do so, the user selects a portion of the data statement. In embodiments wherein the data statement is a spreadsheet, the portion of the data statement may include one or more data cells of the spreadsheet. Alternatively, in embodiments wherein the data statement is a digital image, the portion of the data statement may include a spatial portion of the image. After the user has selected a portion of the data statement, the user selects a data cell of the standardized spreadsheet. If the data statement is a digital image, the user then enters the value contained in the portion of the data statement into the selected data cell of the standardized spreadsheet. Typically, financial values are entered in thousands or in some other currency format. However, if the current data statement is a spreadsheet, the system 10 (e.g., client 50 or server 12) is configured to automatically copy the data contained in the one or more data cells of the data statement spreadsheet to the selected data cell of the standardized spreadsheet. In addition, if the selected portion of the data statement spreadsheet includes more than one data cell, the system 10 is configured to combine the data contained in data cells of the data statement spreadsheet using an appropriate mathematical formula. For example, the system 10 may combine data cells of the data statement by summing the cells. The user may delete, change, or add to the mathematical formula. For example, the user may add a constant value to the formula or change one or more mathematical operators. Once the data contained in the data cells of the data statement have been combined, the resulting data value is stored in the selected data cell of the standardized spreadsheet.

In process step 70, the data cells of the standardized spreadsheet are mapped to the selected portions of the data statement from which the data originated. As used herein, the terms "map", "mapped", and "mapping" refer to any automated assignment of a mathematical correspondence or other relationship between (i) one or more data cells of a standardized spreadsheet and (ii) one or more data cells of a different spreadsheet, one or more spatial portions of an image as defined by a set of coordinates, or one or more other portions of a data statement. In one specific embodiment, the mathematical correspondence or other relationship may be embodied as a mathematical formula using data cell identification data of a data cell of a spreadsheet. In another specific embodiment, the mathematical correspondence or other relationship may be embodied as a set of coordinates associated with a portion of an image.

As illustrated in FIG. 2, the data cells of the standardized spreadsheet are mapped after each manual spread step (i.e., after each portion of the data statement is spread to a cell of the standardized spreadsheet). Accordingly, after each manual spread step has been mapped, the process flow of algorithm 60 loops back to process step 68 in which an additional portion of the data statement is spread. The process flow continues to loop between steps 68 and 70 until the user has spread and the system 10 has mapped all the portions of the data statement desired by the user. However, it should be appreciated that in other embodiments, the data cells of the standardized spreadsheet may be mapped after the data statement has been completely spread. The mapping of the standardized spreadsheet may be used during the spreading of successive data statements to automatically spread the data statement and/or provide information concerning the spread or mapping of the previous data statements to the user.

In embodiments wherein the data statement is a spreadsheet, the data cells of the standardized spreadsheet are mapped based on identity data associated with the data cells of the data statement spreadsheet selected by the user. As used herein, the term "identity data" refers to any data used to identify a portion of a data statement including, but not limited to, the location of the portion on the data statement, text labels associated with the portion, spatial coordinates of the portion, and XML tags associated with the portion. For example, if the data statement is a spreadsheet, the identity data includes the row and column numbers of the data cell(s) of the data statement spreadsheet. Accordingly, the data cells of the standardized spreadsheet are mapped based on the row and column numbers of the data cell(s) of the data statement spreadsheet selected by the user. In one illustrative embodiment, the mapping of the data cells of the standardized spreadsheet to the data cells of the data statement include identity data associated with the data cells of the data statement, any mathematical formula used to combine the data cells, and identity data associated with the data cell of the standardized spreadsheet selected by the user. The mapping may be stored and subsequently retrieved to perform automatic spreading on other data statements. The mapping may be stored using any format including XML. For example, one illustrative XML formatted mapping is shown below.

```
<ColumnID>1</ColumnID>
<TableName>Current Assets</TableName>
<ColumnName>Accts/Notes Rec-Other</ColumnName>
<Formula>=round('Sheet1'$R9C6, 3)/1000</Formula>
<Value>23</Value>
```

Wherein, the data defined by the <ColumnID> is an identifier which identifies the data cell of the standardized spreadsheet that was selected by the user. In the illustrative embodiment, the identifier is a numeric value. However, in other embodiments, the identifier may be a text label or any other type of data capable of identifying the data cell of the standardized spreadsheet. The data defined by the <TableName> and <ColumnName> tags are used for display purposes. The data defined by the <Formula> tag identifies the location of the data cells of the data statement spreadsheet that are mapped to the data cell of the standardized spreadsheet and defines the mathematical formula, if any, used with the data of the data cells of the data statement spreadsheet. The <Value> tag identifies the data value of the mathematical formula using the data of the data cells of the data statement spreadsheet. The data value identified by the <Value> tag is stored in the data cell of the standardized spreadsheet.

Alternatively, in embodiments wherein the data statement is a digital image, the data cells of the standardized spreadsheet are mapped based on a spatial portion of the digital image selected by the user. For example, when the user selects the portion of the fax, the coordinates of the selected portion are determined. The set of coordinates may subsequently be stored in relation to the data cell of the standardized spreadsheet as described above in regard to the data statement spreadsheet. The mapping (i.e., the set of coordinates) may be stored using any format including XML. For example, one illustrative XML formatted mapping is shown below.

```
<ColumnID>1</ColumnID>
<TableName>Current Assets</TableName>
<ColumnName>Accts/Notes Rec-Other</ColumnName>
<Formula>=40{{//:F0X400Y200W40H20</Formula>
<Value>40</Value>
```

Wherein, the data defined by the <ColumnID> is an identifier (e.g., a numeric value, text label, or the like) which identifies the data cell of the standardized spreadsheet that was selected by the user. The data defined by the <TableName> and <ColumnName> tags are used for display purposes. The data defined by the <Formula> tag identifies the location of the data cells of the data statement spreadsheet that are mapped to the data cell of the standardized spreadsheet and the mathematical formula, if any. The "{{//" term is used to delimit the value or mathematical formula from the identity data (i.e., location data). The <Value> tag identifies the data value, as entered by the user, for the portion of the data statement image identified by the location data. The data value identified by the <Value> tag is stored in the data cell of the standardized spreadsheet.

Once all the selected data cells of the standardized spreadsheet have been mapped to the selected portions of the data statement, the standardized spreadsheet is submitted to the data analysis software of the data analyzer server 26 in process step 72. To do so, the data contained in the standardized spreadsheet is converted to a format acceptable by the data analysis software. For example, the data may first be converted to XML data and subsequently to a format acceptable by the data analysis software using an associated API.

In process step 74, the mapping data is stored on the database 22 of the data server 20. The mapping data may be retrieved to facilitate the automatic spreading of subsequent data statements. Additionally, the standardized spreadsheet is saved on the database 22. Once the mapping data and standardized spreadsheet has been saved, the algorithm 60 loops back to process step 64 to wait to receive additional data statements.

Returning now to step 66, if the current data statement is not the first data statement for the customer to be spread, the algorithm 60 advances to process step 76. In process step 76, a mapping to be use with the current data statement is determined. The most previous mapping (e.g., stored, XML formatted mapping data) is used. The most previous mapping is determined by comparing the current data statement and previous data statements to determine the most recent data statement, which has been spread and which associated mapping data has been stored, which is of the same type (i.e., Monthly, Quarterly, or Annually) as the current data statement. The mapping of the most recent previous data statement which most closely matches the type of the current data statement is selected. Once selected, the mapping data associated with the selected previous data statement is retrieved, for example, from database 22.

If the data statement is a spreadsheet or data table, the algorithm 60 advances to process step 78. However, if the data statement is a digital image, the algorithm 60 skips process step 78 and advances to process step 82 as indicated by dashed line 75. In process step 78, the previous data statement selected in process step 76 is compared with the current data statement. The data statements may be compared using any suitable comparing algorithm such as a text comparing algorithm. One illustrative algorithm 94 for comparing two data statements is illustrated in FIG. 3 and will be described now with the understanding that such an algorithm is merely illustrative and other algorithms for comparing two or more data statements may be used.

Figure 4:
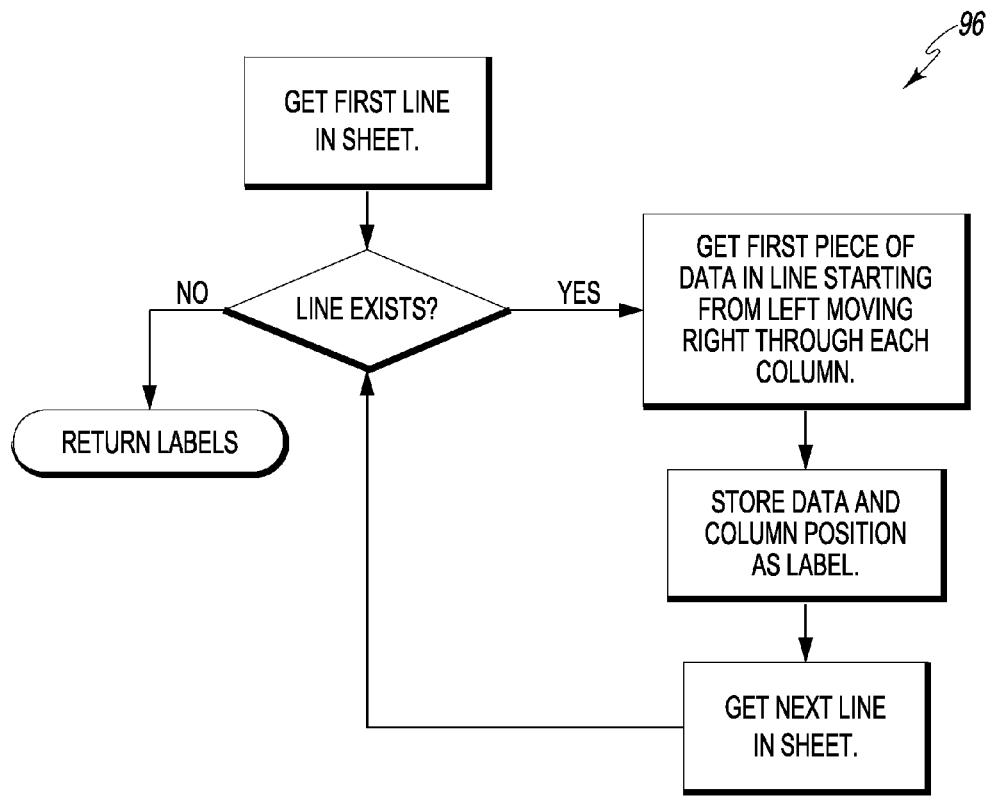
FIG. 4 illustrates an algorithm for extracting text labels from a data statement used in a process step of the algorithm of FIG. 3.

The algorithm 94 first retrieves the first sheet of previous statement. The first sheet may be, for example, a balance sheet or a profit and loss sheet of a financial statement. If no first sheet exists for the previous statement, the algorithm 94 exits. If a first sheet of the previous data statement does exist, the algorithm 94 retrieves the corresponding sheet of the current data statement. If there is no corresponding sheet of the current data statement available, the algorithm 94 retrieves the next sheet of the previous statement or exits if the next sheet of the previous statement is unavailable. Accordingly, the algorithm 94 attempts to locate corresponding sheets of the previous data statement and the current data statement. Once corresponding sheets of the data statements have been retrieved, the algorithm 94 extracts or retrieves the text labels associated with the data cells from each sheet. The text labels of the data statements may be extracted using any suitable algorithm. One illustrative algorithm 96 for extracting text labels of a data statement is illustrated in FIG. 4. Algorithm 96 first determines if the first line in the current sheet of the data statement exists. If not, the algorithm 96 exits. If the first line of the current sheet of the data statement does exist, the algorithm 96 retrieves the first piece of data in the line. The algorithm 96 retrieves such data using a left-to-right retrieval process across each column of the current line or row. Once the text label for the current row has been retrieved, the text label is stored along with the column position of the text label. Algorithm 96 subsequently retrieves the next line in the current sheet of the data statement. The algorithm 96 continues in the above-described process loop until no additional lines or rows of the sheet exist. Once the algorithm has inspected each line or row of the current sheet of the data statement, the algorithm 96 exits.

Figure 3:
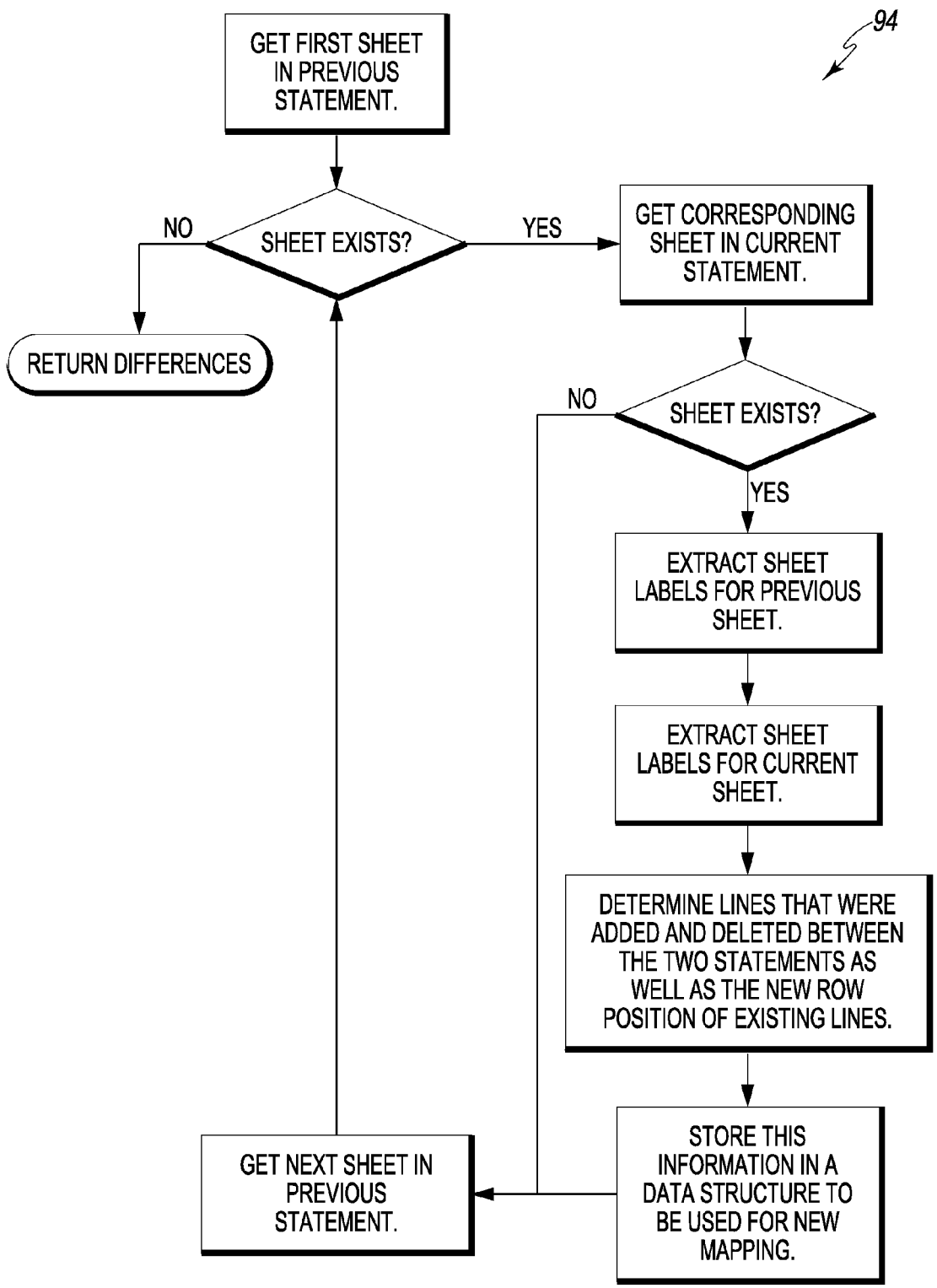
FIG. 3 illustrates an algorithm for comparing two data statements used by the algorithm of FIG. 2.

Referring now back to FIG. 3, after the text labels for each data statement have been retrieved, the algorithm 94 determines if any rows of the current data statement have been added, deleted, or moved relative to the previous data statement. To do so, the algorithm 94 compares the text labels and the position data associated with the text labels. Any differences between the text labels and positions are stored in a data structure or other memory location for use with the mapping data associated with the previous data statement during the automatic spreading of the current data statement, as described below.

Referring now back to FIG. 2, in process step 80 the current data statement is automatically spread into the standardized spreadsheet. To do so, in one specific embodiment, the mapping data associated with each data cell of the standardized spreadsheet is retrieved. The mapping data is updated or modified based on the comparison of the current and previous data statements performed in process step 78. Accordingly, the data structure or other memory location, in which the comparison data was stored in process step 78, is retrieved. For example, if the mapping data includes the row and column numbers of a data cell of the current data statement, such row and column numbers are updated to reflect the differences between the two data statements. Accordingly, if a row has been added above the mapped row, the row number in the current mapping data will be increased by one. Once the mapping data has been updated based on the comparison of process step 78, the data contained in the data cells as determined by the mapping data is retrieved and stored in the associated data cell of the standardized spreadsheet. The associated data cell of the standardized spreadsheet is identified in the mapping data, as discussed above in regard to process step 70. Additionally, if the mapping data includes any mathematical formula or equation, the data retrieved from the data cell(s) of the data statement is used with the mathematical formula or equation to determine a data value. The data value is subsequently stored in the associated data cell of the standardized spreadsheet.

In some embodiments, after the data statement has been automatically spread, the data portions of the data statement which have been mapped are determined and identified to the user. The data portions (i.e. data cells of a spreadsheet or spatial portions of a fax image) may be identified by highlighting the data portion. If the data statement is a digital image which has not yet been spread, then no data portion will be mapped or identified to the user. However, the user may view previously mapped data statements, including digital images, to view which data portions of the previous data statement which was mapped to data cells of the standardized spreadsheet. Additionally, the user may select a particular data cell of the standardized spreadsheet to highlight the particular mapped portion of the data statement. Accordingly, a user may analyze the mapping of previous data statements to determine how to map or adjust the current data statement. Further, after all the data cells of the data statement have been spread, any additional portions, i.e. data rows, of the data statement may be indicated to the user by, for example, highlighting the portion. Additionally, any portions of the data statement which were deleted are indicated to the user by, for example, highlighting the portion.

The algorithm 60 subsequently advances to process step 82. In process step 82, the algorithm determines if the current mapping (e.g., the previous data statement selected to be used as the mapping) is correct. The user may review the previous data statement and/or the automatic spreading to determine if another mapping is desired. If so, the algorithm advances to process step 84 wherein a different mapping is chosen. The different mapping (e.g., previous data statement) may be chosen affirmatively by the user or, in some embodiments, may be automatically selected by the algorithm 60 using the method described in process step 76. The algorithm then advances back to process step 78 if the current data statement is a spreadsheet or data table and, alternatively, to process step 82 if the current data statement is a digital image as indicated by dashed line 85. However, if the user determines that the current mapping is the correct mapping to use, the algorithm 60 advances to process step 86.

In process step 86, any new data portions (i.e., new data cells or spatial portions) are manually spread into the standardized spreadsheet. The process used to manually spread new data portions is similar to the process used in step 68. However, in some applications, the new portions may be spread by expanding a previously mapped data portion of the data statement to include the new data. For example, if the data statement is a digital image including a new line of data, an existing mapped spatial portion may be expanded to include the new row of data and the value added manually to the value sorted in the associated (i.e. mapped) data cell of the standardized spreadsheet. Additionally, mapped data portions may be altered to account for deleted or removed data or data portions. For example, if the data statement is a spreadsheet and a data row of a mapped data portion of the data statement spreadsheet including several data rows has been removed, the data portion may be adjusted accordingly.

In process step 88, any newly spread data portions of the current data statement are mapped to the associated data cells of the standardized spreadsheet. The process used to map the data portions to the data cells of the standardized spreadsheet is similar to the mapping process described above in regard to process step 70. As illustrated in FIG. 2, the data cells of the standardized spreadsheet are mapped after each manual spread step (i.e., after each new portion of the data statement is spread to a cell of the standardized spreadsheet). Accordingly, after each manual spread step has been mapped, the process flow of algorithm 60 loops back to process step 86 in which an additional new portion of the data statement is spread. The process flow continues to loop between steps 86 and 88 until the user has spread and the system 10 has mapped all the new portions of the data statement desired by the user.

After any new portions have been mapped to selected data cells of the standardized spreadsheet, the standardized spreadsheet is submitted to the data analysis program of the data analyzer server 26 in process step 84. To do so, the data contained in the standardized spreadsheet is converted to a format acceptable by the data analysis program. Once the standardized spreadsheet has been submitted, the mapping data for the current data statement is stored on the database 22 of the data server 20. Additionally, the standardized spreadsheet is saved on the database 22. Once the mapping data and standardized spreadsheet has been saved, the algorithm 60 loops back to process step 64 to wait to receive additional data statements.

Referring now to FIGS. 5-9, data statements embodied as spreadsheets may be submitted to the data management server 12 and manually and/or automatically spread into a standardized spreadsheet which may subsequently be submitted to the data analyzer server 26. To do so, a data statement spreadsheet may be submitted to the data management server 12 via a data statement user interface 100 illustratively shown in FIG. 5. The user interface 100 may be used by a customer, via client 36 and network 38. Additionally, a similar user interface is usable by a user of the system 10 to submit data statements via client 50 and network 52. The user interface 100 will be described herein with the understanding that the user interface usable by the user may be similar with similar functionality. The user interface 100 includes a number of data fields for submission of identification data related to the data statement. Identification data may be entered into the data fields by direct data input (i.e., the entering of data via a keyboard coupled to the clients 36, 50) or by choosing a selection from an associated pull-down menu of choices. The pull-down menu may be activated or "called-up" by selection of an associated pull-down button. For example, the user interface 100 includes a company name field 106 for storing the name of the company submitting the data statement. The company name may be entered from a pull-down menu accessible via a pull-button 108. The user interface 100 also includes a file upload section 102 and a submission information section 104. The file upload section 102 includes a filename data field 110. A file may be selected by directly typing the name of the file in the data field 110 or by using a browse button 112 to locate and select the file After the customer or user has selected a file, the filename of the file appears in the filename data field 110. The customer or user may then identify the file as the data statement (e.g., financial statement) to be submitted by selecting an add financial button 114. After the user has identified the file as the data statement, the user may select the Balance sheet via button 122 and the Profit and Loss sheet via button 124 of the data statement from associated pull-down tables. Further, the customer or user may submit additional files or documents by selecting an add attachment button 126. Upon selection of button 126, the file identified in the data field 110 is included as an attachment to the data statement and the name of the file appears in an attachment box 128. The customer or user may remove any unwanted attachments listed in box 128 by selecting the attachment name and selecting a remove button 130.

The submission information section 104 of the user interface 100 includes a Version Name data field 131 in which the customer or user enters the name of the data statement submission for later reference. Additionally, the customer or user enters the statement type and date of the data statement in data fields 132 and 134, respectively. The user also indicates the number of periods included in the data statement via data field 136. The customer or user further indicates the audit method used in data field 138 and the name of an accountant in data field 140. Further, additional notes or comments may be drafted in a comment field 142.

Once the data statement has been uploaded and all the applicable information has been entered into the user interface 100, the data statement and associated information may be submitted to the data management server 12 via selection of a next button 145. In some embodiments, the customer may be asked for an electronic signature or other identification after selection of the button 145. Additionally, the customer or user may review the submission history for the company via selection of a button 146, change their password via selection of a button 148, logoff via selection of a button 150, or return to the user interface 100 via selection of button 144.

Figure 6:
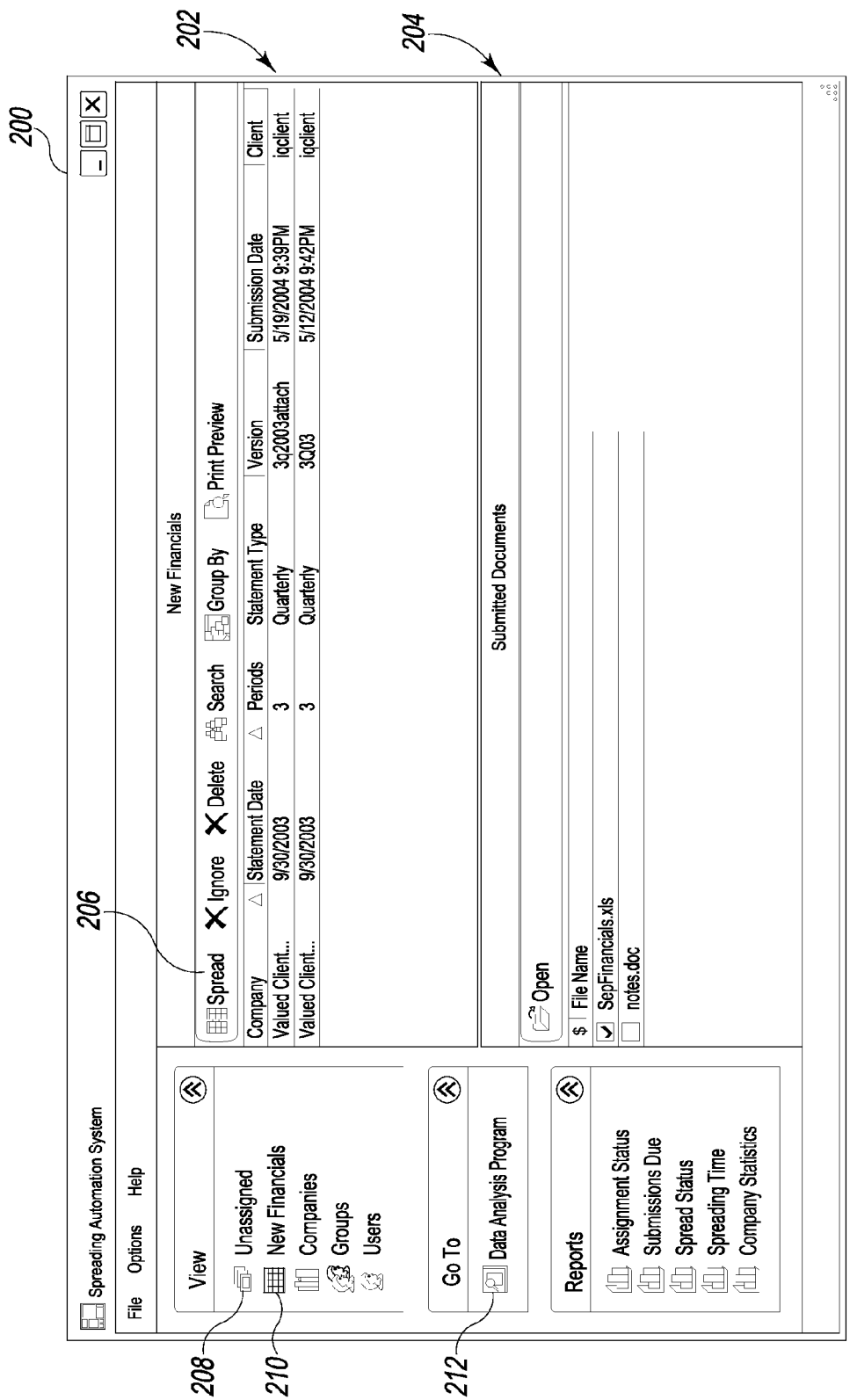

Once a data statement is received by the data management server 12, a user (e.g., a company analyst) may log into the server 12 via one of the client machines 50 and the network 52 to spread the data statement. When a user logs into or otherwise connects to the data management server 12, a spreading user interface 200 is downloaded to the client machine 50 and presented to the user. As illustrated in FIG. 6, the user interface 200 notifies the user of newly received data statement spreadsheets that are waiting to be spread. A new financial pane 202 and a submitted documents pane 204 are displayed on the user interface 200. Any newly received data statement spreadsheets waiting to be spread are displayed in the new financial pane 202 along with associated data such as the name of the company that submitted the data statement, the statement date, the statement type, the statement version, and the submission date. However, additional associated data may be displayed in other embodiments. When a data statement is selected in the new financial pane 202, any documents or files submitted with the data statement are displayed in the submitted documents pane 204. To spread a data statement, the user may select the data statement in the new financial pane 202 and select a spread button 206.

The user interface 200 also includes a button 208 to view data statements that have been received but have not been assigned to a company. Such data statements are typically digital data statements such as digital images and must be assigned to a company before being spread. Additionally, a button 210 is selectable by the user to review newly received data statements. When a user selects the button 210, the financial pane 202 and the submitted documents pane 204 are presented to the user as illustrated in FIG. 6. Further, the user may select button 212 to access the data analysis software and perform analysis on submitted standardized spreadsheet data.

As shown in FIG. 7, when a user selects a new data statement to be spread, a data statement pane 214 and a standardized spreadsheet pane 216 are displayed in a user interface 201. The current data statement 218 (i.e., spreadsheet) is displayed to the user in the pane 214 and a standardized spreadsheet 220 is displayed in the pane 216. If the data statement 218 is the first data statement to be spread for the company, the user interface 201 will appear similar to the user interface 201 illustrated in FIG. 7. Because there is no previous mapped standardized spreadsheet, the pane 216 includes only the current standardized spreadsheet 220 having empty data cells. Additionally, because there is no previous data statement, a data statement selection bar 222 located above the data statement 218 includes only the current data statement 218.

Because a data statement has never been spread for the customer, the current data statement 218 must be manually spread into the standardized spreadsheet 220. To do so, the user may select a portion of the current data statement 218. For example, the user may select one or more data cells of the data statement 218 to be spread. After the user has selected the portion of the data statement, the user may select a data cell of the standardized spreadsheet 220 to map the data cell of the spreadsheet 220 to the selection portion of the data statement 218. For example, as illustrated in FIG. 7, a user may select two data cells 226 of the current data statement spreadsheet 218. The user may subsequently select a data cell 228 of the standardized spreadsheet 220. In response, the data management system 12 mathematically combines (e.g., sums or subtracts) the data values stored in the selected two data cells 226 of the data statement 218 and stores the combination in the selected data cell 228 of the standardized spreadsheet 220. The data values and formula used to determine the value stored in the data cell 228 of the spreadsheet 220 are displayed in a mapping formula field 224 located above the spreadsheet 220. In addition, the data management server 12 or client machine 50 maps the selected data cells 226 to the data cell 228 of the standardized spreadsheet 220. The server 12 or client 50 may map the cells 226, 228 using one of a number of methods as discussed above in regard to FIG. 2. In one illustrative embodiment, the cells 226, 228 are mapped based on identity data of the cells 226. Specifically, the cells 226, 228 are mapped based on the row and column numbers of the cells 226. The mapping data includes any mathematical function or equation as defined in the formula box 224. The mapping data may be stored on the database server 20 in relation to the selected data cell 228 of the standardized spreadsheet. Specifically, the mapping data includes an identifier such as a numeric or text label which uniquely identifies the data cell of the standardized spreadsheet. The stored mapping data may then be used with subsequent data statements to automatically spread the data of the subsequent data statements.

During the manual spreading of the data statement 218, the user may select a highlight mapped cells button 230 to identify which of the data portions or cells of the data statement 218 spreadsheet have been mapped. The mapped data portions (i.e., data cells) of the data statement spreadsheet 218 are identified to the user by highlighting the data portions. Additionally, the user may determine which data cell(s) of the standardized spreadsheet 220 is mapped to which data portion or cell of the data statement 218 by selecting either the data portion (i.e., one or more data cells) on the data statement 218 or the data cell on the standardized spreadsheet 220. In response, both the data portion of the data statement 218 and the data cells of the standardized spreadsheet 220 are highlighted as illustrated by cells 226, 225 of FIG. 7.

Once the data portions of the data statement 218 have been manually spread to data cells of the standardized spreadsheet 220, the user may submit the mapped standardized spreadsheet to the data analysis program by selecting a submit button 232. In response, the standardized spreadsheet is saved on the database server 20. Additionally, the data contained in the standardized spreadsheet is converted to a format acceptable by the data analysis program.

Figure 8:
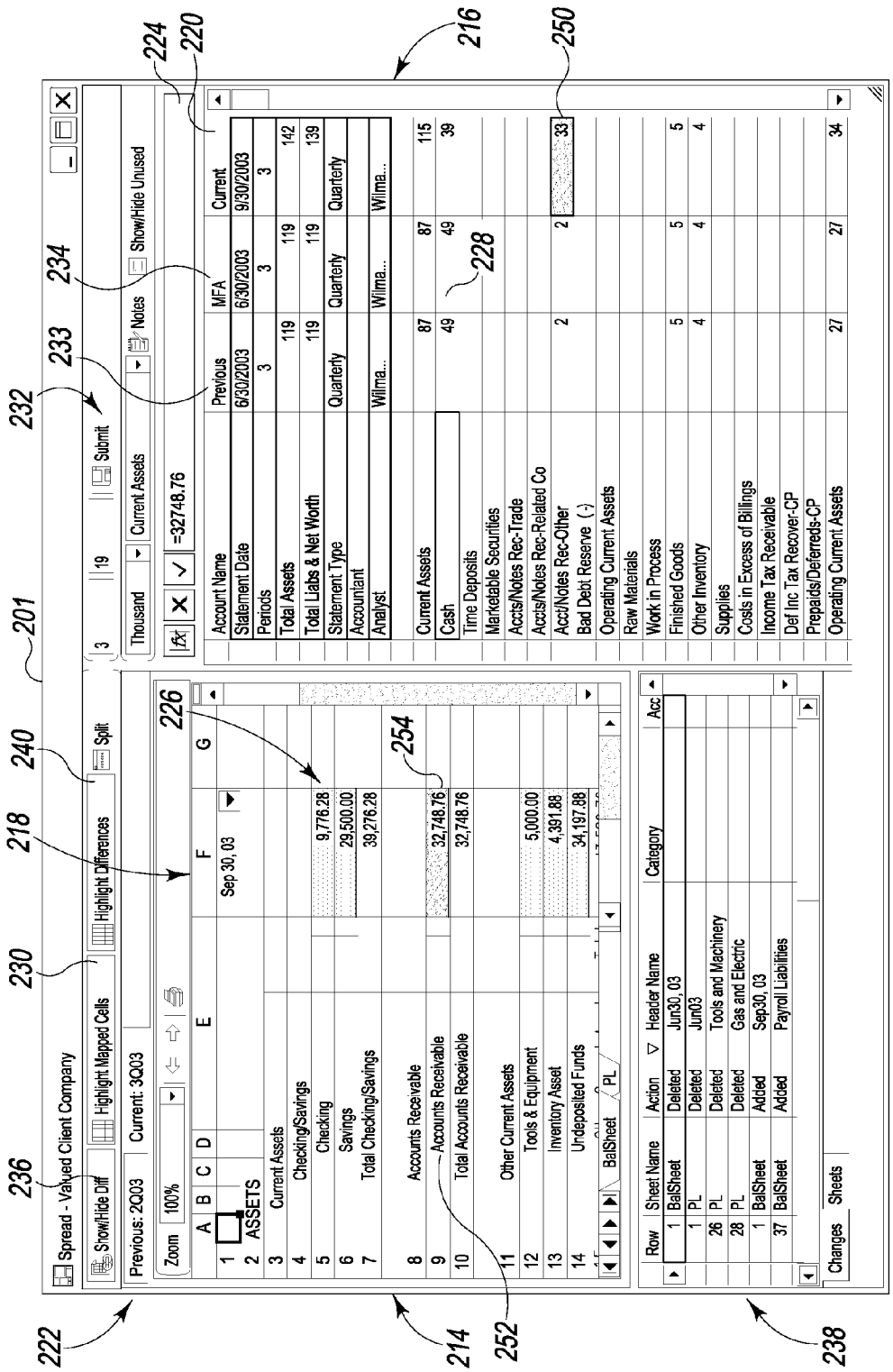

When a data statement has previously been spread for the customer, the newly received data statement spreadsheet is automatically spread when the user selects the spread button 206. As illustrated in FIG. 8, the data statement 218 is spread into the standardized spreadsheet 220 based stored mapping associated with the data cells of the spreadsheet 220. For example, for each data cell of the standardized spreadsheet, the data management server 12 may retrieve mapping data from a storage location such as the database 22 of the data server 20. The mapping data may include an identifier, such as a numeric value or a text label, associated with the particular data cell, identity data associated with one or more portions of the current and/or previous data statement, and any applicable mathematical equation or formula to be used with the data contained in the one or more portions. In addition, the mapping data is modified based on a comparison of a previous data statement and the current data statement as discussed in regard to FIG. 2. Once the mapping data has been updated or modified based on the comparison, the data contained in the portions of the current data statement as defined by the updated identity data is retrieved. The retrieved data is subsequently copied into the data cell of the standardized spreadsheet 220

The user interface 201 may also display a number of standardized spreadsheets to the user. For example, as illustrated in FIG. 8, the user interface 201 may display the current standardized spreadsheet 220, a previous standardized spreadsheet 233, and a data analysis software spreadsheet 234. The spreadsheet 234 reflects the values of the previous standardized spreadsheet 233 as stored in the data analysis software. Accordingly, the data values of the spreadsheets 233 and 234 may vary.

The previous standardized spreadsheet 233 and previous data statements, accessible via the data statement selection bar 222, may be viewed by the user to identify previous mappings. The user may select the highlight mapped cells button 230 to highlight the cells of the data statement 218 that have been mapped to data cells of the current standardized spreadsheet 220. The user may also determine which data cell of the standardized spreadsheet 220 is mapped to which data portion or cell of the data statement 218 by selecting either the data portion (i.e., one or more data cells) on the data statement 218 or the data cell on the standardized spreadsheet 220. In response, both the data portion of the data statement 218 and the data cells of the standardized spreadsheet 220 are highlighted. Additionally, the user may select a show/hide differences button 236 to display a differences pane 238. Differences, such as added and/or deleted rows, between the current data statement and previous data statements are identified in the differences pane 238. Such differences are determined by the data management server 12 by comparing the current data statement with a previous data statement. The previous data statement is selectable by the user and may be the most recently spread data statement spreadsheet or, alternatively, an older data statement spreadsheet.

Figure 9:
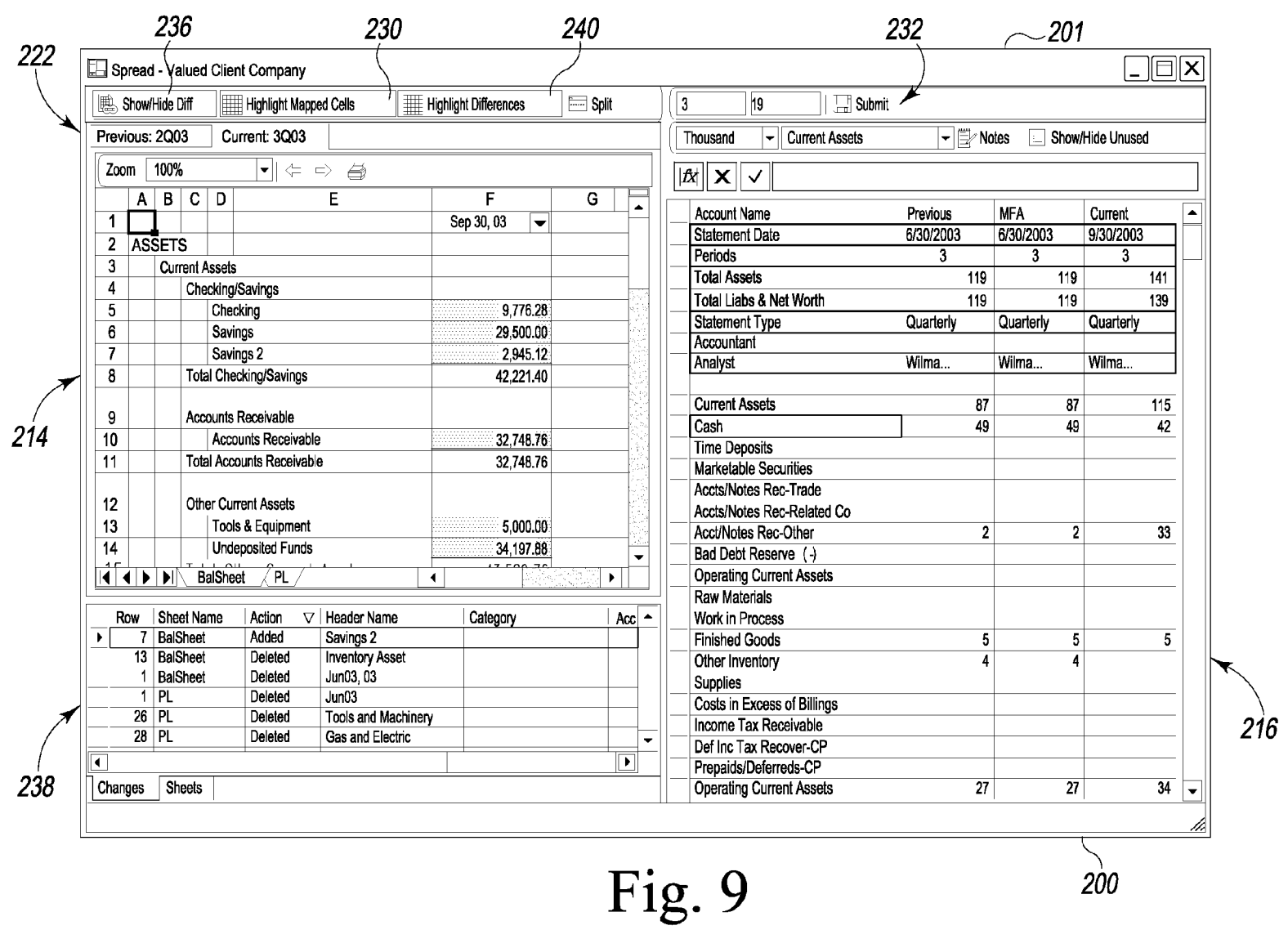

The user may also identify the lines or rows of the current data statement which have been added and the lines or rows of the previous data statement which have been deleted by selecting a highlight differences button 240. When the user selects the button 240, data cells associated with data rows of the current data statement 214 which have been added are relative to the previous data statement are highlighted. As illustrated in FIG. 9, row 7 of the present data statement 214 has been added and is highlighted. Similarly, if a row has been deleted, the row is highlighted in the previous data statement. The data cells may be highlighted in different colors to indicate to the user whether the row has been added or deleted. The differences between the current data statement 214 and the previous data statement are also indicated on the differences pane 238 selectably viewable via the button 236.

Once the data portions or cells of the data statement 218 have been automatically and/or manually spread to data cells of the standardized spreadsheet 220, the user may submit the current standardized spreadsheet to the data analysis program by selecting the submit button 232. In response, the current standardized spreadsheet is saved on the database server 20 and the data contained in the standardized spreadsheet is converted to a format acceptable by the data analysis program and stored on the database sever 30.

Figure 10:
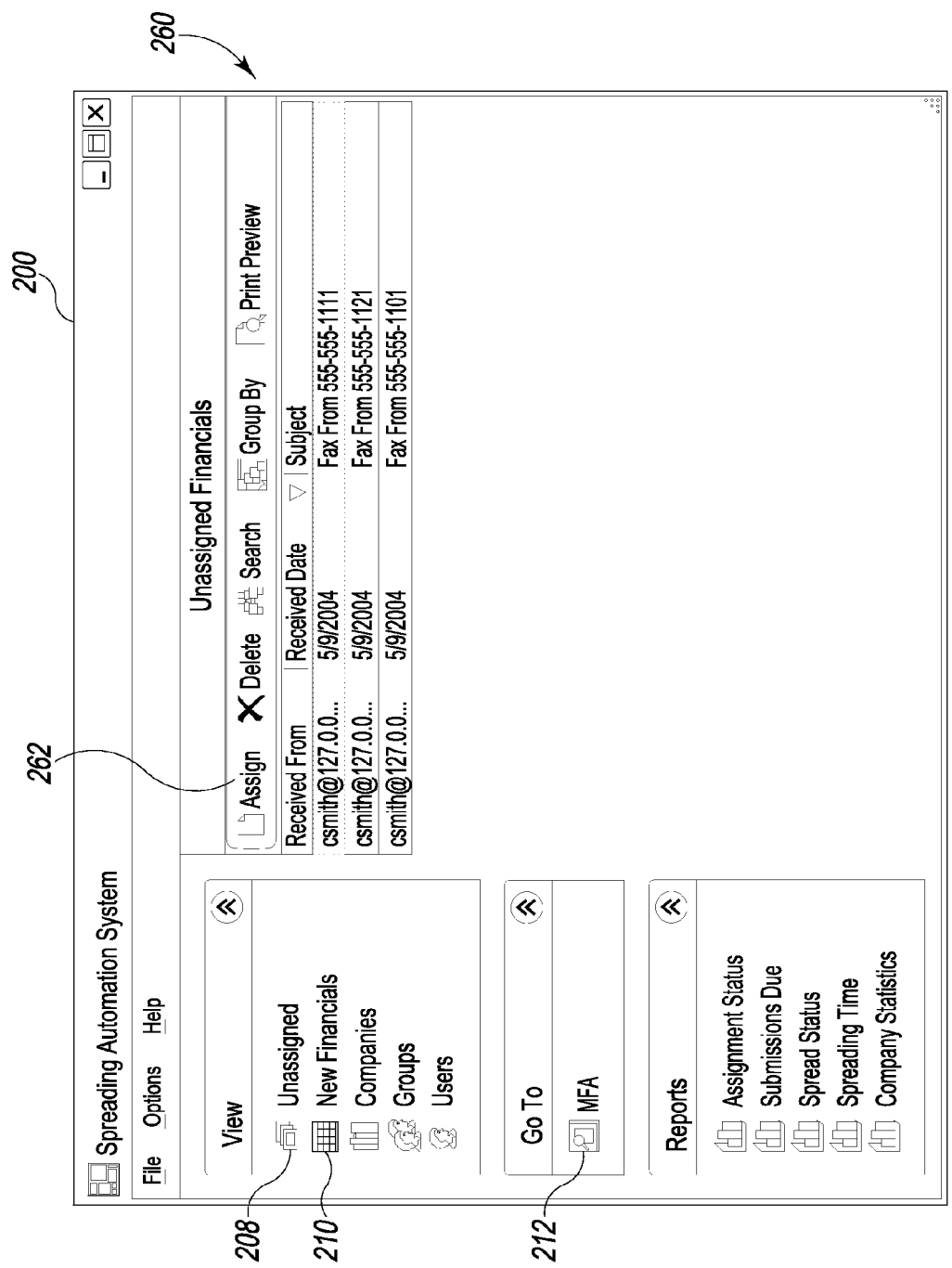

Referring now to FIGS. 10-13, the user may select the unassigned button 208 of the user interface 200 to view data statements, typically embodied as digital images such as digital images of a fax, which have been received but not assigned to a company. When the user selects the button 208, an unassigned financials pane 260 is displayed to the user on the user interface 200 as illustrated in FIG. 10. Any received but unassigned data statements are displayed to the user on the pane 260. Additional data related to the unassigned data statement may also be displayed on the pane 260 including, for example, the date on which the data statement was received and the fax number transmitting the data statement. The user may browse the list of unassigned data statements and select a data statement to assign to a company. Once the user has selected a data statement, the user may assign the data statement to a company by selecting an assign button 262.

Figure 11:
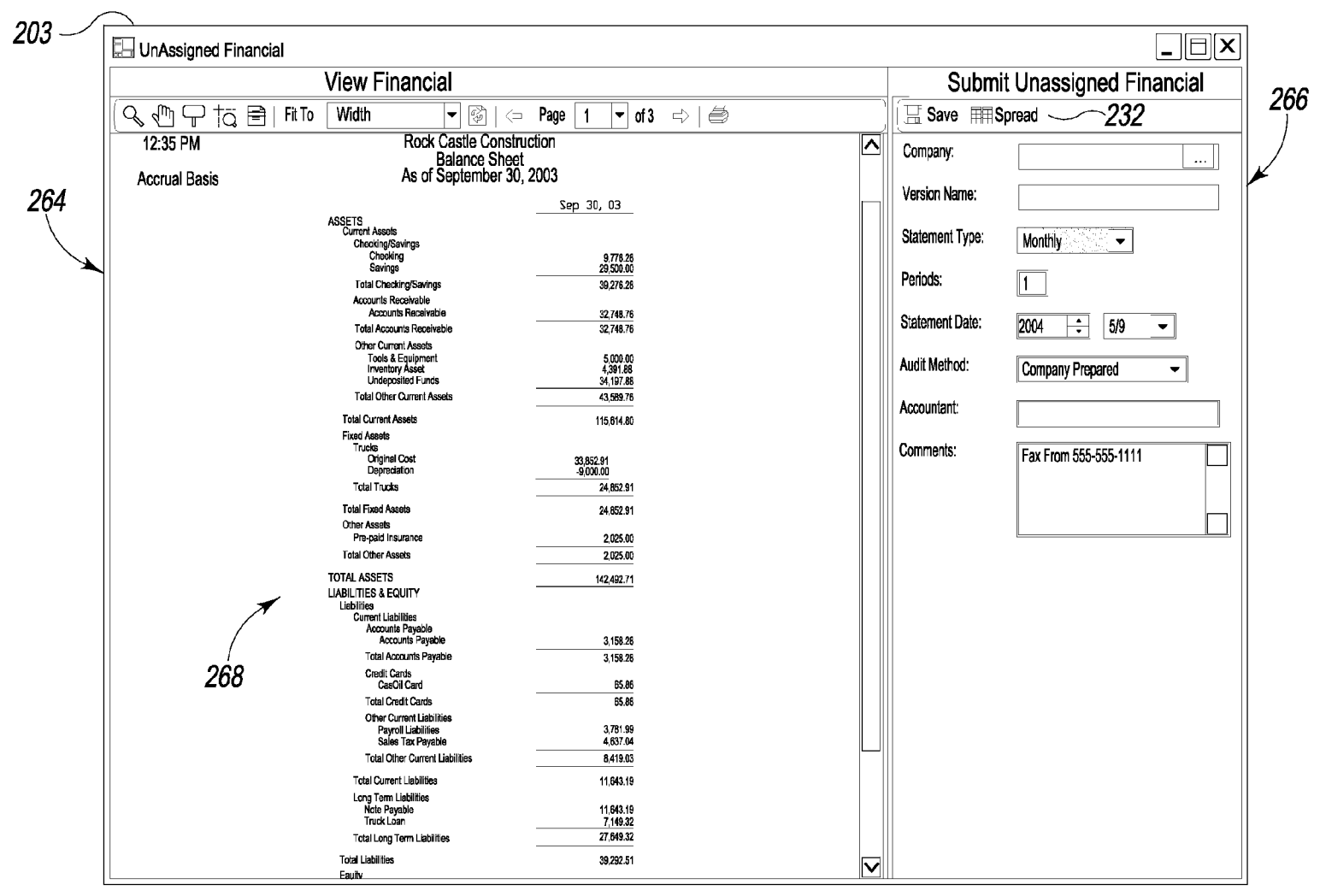

As illustrated in FIG. 11, when the user selects the assign button 262, a user interface 203 is presented to the user. The user interface 201 includes a data statement pane 264 and a submit pane 266. The data statement 268 (i.e., a digital image) is displayed to the user in the pane 264 to allow the user to quickly review the data statement image. The user may supply company identification data in the submit pane 266 to assign the data statement to the company. For example, the user may supply the name of the company, the version name of the data statement, the data statement type, the number of periods included in the data statement, the statement data, the audit method, the associated accountant, and any comments such as the fax number used to transmit the data statement. Once the user has entered in the appropriate identification data in submit pane 266, the user may select the spread button 232 to spread the data statement.

When the user selects the spread button 232 to spread the data statement, a spreading user interface 300 is displayed to the user. The user interface 300 includes a data statement pane 268 and a standardized spreadsheet pane 269. A standardized spreadsheet 270 is displayed in the standardized spreadsheet pane 269. If the data statement 268 is the first data statement to be spread for the company, the user interface 300 will appear similar to the user interface 300 illustrated in FIG. 12. Because there is no previous mapped standardized spreadsheet, the pane 269 includes only the single standardized spreadsheet 270 having empty data cells. Additionally, because there is no previous data statement, a data statement selection bar 222 located above the data statement 268 includes only the current data statement 268.

Figure 12:
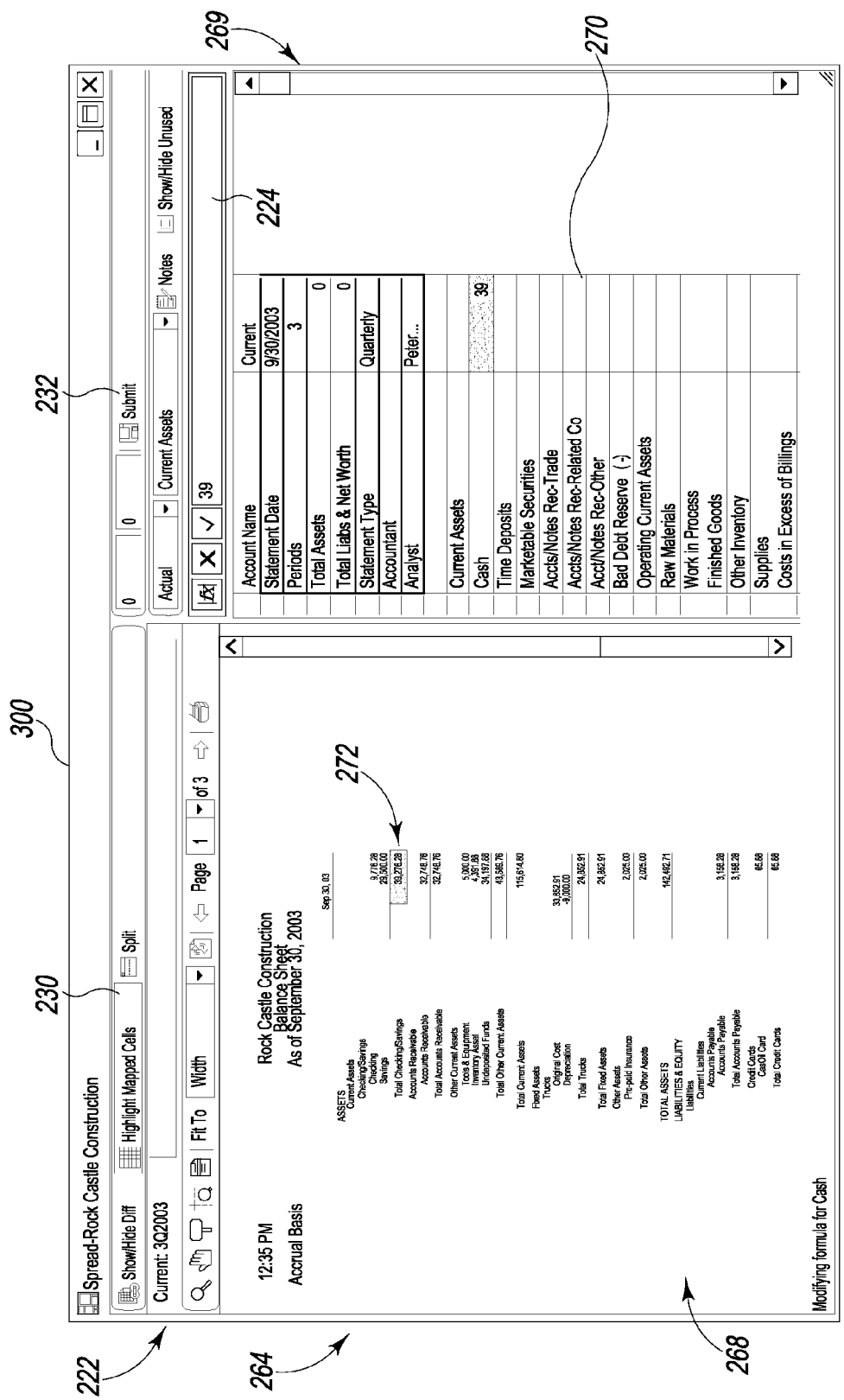

Because the current data statement 268 is a digital image, the data statement 268 must be manually spread. To do so, the user may select a portion of the data statement 268. For example, the user may select a spatial portion of the digital image. As illustrated in FIG. 12, in response to the user's selection, a selection box 272 appears on the image. The user may adjust the size and shape of the selection box 272 to include any of the data present on the data statement 268. The selection box 272 is defined by a set of coordinates which are mapped on the data statement 268. After the user has selected the spatial portion of the data statement 268, the user may select a data cell of the standardized spreadsheet 270 to map the data cell of the spreadsheet 270 to the selected spatial portion of the data statement 268. Because the data statement 268 is not a spreadsheet, the data values contained in the selection box 272 are not automatically copied into the data cell of the standardized spreadsheet 270. Accordingly, the user must enter the data values of the data contained within the selection box 272 into the selected data cell of the standardized spreadsheet 270. Typically, numerical data values are entered based on a data format such as representing currency amounts in thousands and the like. However, the selected data cell of the standardized spreadsheet is automatically mapped to the selected spatial portion of the data statement 268 based on the set of coordinates.

When the user selects the spatial portion of the data statement 268 and the data cell of the standardized spreadsheet 270, the data management server 12 or client 50 maps the data cell of the spreadsheet 270 to the spatial portion. To do so, for example, the data management server 12 may store the set of coordinates which define the selection box 272. The set of coordinates may be stored in relation to the data cell of the standardized spreadsheet 270. For example, the set of coordinates may be stored in an XML file in an association with an identifier (e.g., a number value or a text label) associated with the data cell of the standardized spreadsheet 270. Alternatively, a relationship such as a formula, equation, or data points may be determined to relate the set of coordinates to the data cell of the standardized spreadsheet 270. The set of coordinates and the relationship equation may then be stored and subsequently retrieved to determine the relation of the spatial portion as defined by the set of coordinates and the data cell of the standardized spreadsheet 270

Once a data cell of the standardized spreadsheet 270 has been mapped to a selected data portion (i.e., spatial portion) of the data statement 268, the user may select the highlight mapped cells button 230 to identify which of the data portions of the data statement 268 and which of the data cells of the standardized spreadsheet 270 have been mapped. The mapped data portions are identified to the user by highlighting the associated spatial potions of the data statement 268. Additionally, the user may determine which data cell of the standardized spreadsheet 270 is mapped to which data portion of the data statement 268 by selecting either the data portion (i.e., the spatial portion as defined by the set of coordinates) on the data statement 268 or the data cell on the standardized spreadsheet 270. In response, both the data portion of the data statement 268 and the data cells of the standardized spreadsheet 270 are highlighted as illustrated in FIG. 12.

Once the data portions of the data statement 268 have been manually spread to data cells of the standardized spreadsheet 270, the user may submit the standardized spreadsheet to the data analysis program by selecting the submit button 232. In response, the standardized spreadsheet 270 is saved on the database server 20. Additionally, the data contained in the standardized spreadsheet is converted to a format acceptable by the data analysis program and saved on the data server 30.

Figure 13:
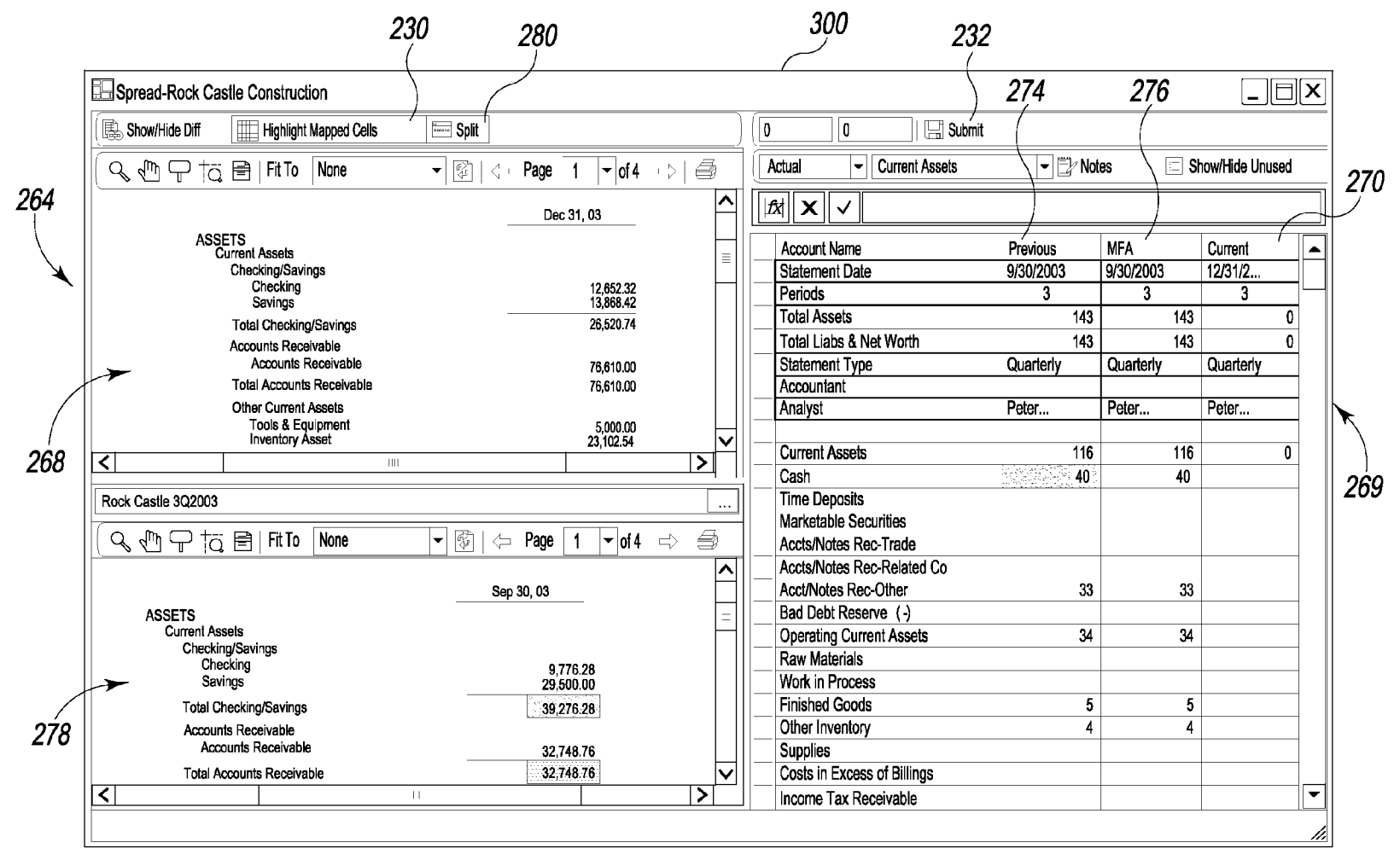

When a data statement has previously been spread for the customer, the user interface 300 may display a number of standardized spreadsheets to the user. For example, as illustrated in FIG. 13, the user interface 300 may display the current standardized spreadsheet 270, a previous standardized spreadsheet 274 and a data analysis software spreadsheet 276. The spreadsheet 276 reflects the values of the previous standardized spreadsheet 276 as stored in the data analysis software. Accordingly, the data values of the spreadsheet 274 and 276 may vary.

As shown in FIG. 13, the current data statement 268 and the previous data statement 278 may be viewed together in the data statement pane 268 by selection of a split button 280. The user may select the highlight mapped cells button 230 to highlight the data portions of the data statement 278 which have been mapped to data cells of the previous standardized spreadsheet 274. The user may also determine which data cell of the previous standardized spreadsheet 274 is mapped to which data portion or spatial portion of the previous data statement 278 by selecting either the data portion on the data statement 278 or the data cell on the previous standardized spreadsheet 274. In response, both the data portion of the data statement 278 and the data cell of the standardized spreadsheet 270 are highlighted. The user may thus analyze the mapping of the previous data statement 278 to use as a guide to spread the current data statement 268 to the current standardized spreadsheet 270 thereby reducing inaccuracies and inconstancies in the spreading process. The previous data statement is selectable by the user and may be the most recently spread data statement spreadsheet or, alternatively, an older data statement spreadsheet.

Once the data portions (i.e., the selected spatial portions) of the data statement 268 have been manually spread to data cells of the current standardized spreadsheet 270, the user may submit the current standardized spreadsheet 270 to the data analysis program by selecting the submit button 232. In response, the current standardized spreadsheet is saved on the database server 20 along with the associated mapping data and the data contained in the standardized spreadsheet is converted to a format acceptable by the data analysis program and stored on the database server 30.

Figure 14A:
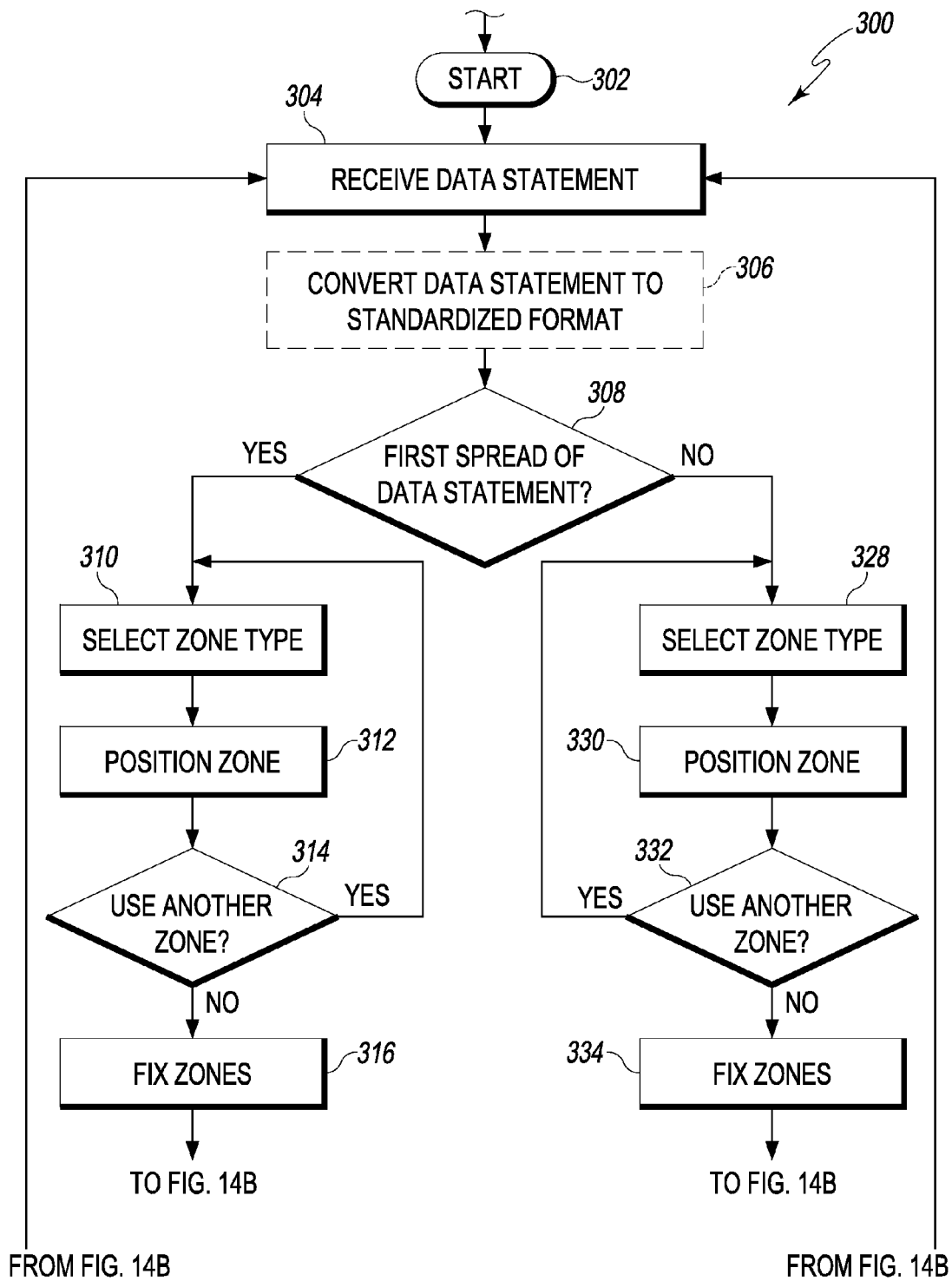
FIG. 14 is illustrates another algorithm for spreading a data statement.
Figure 14B:
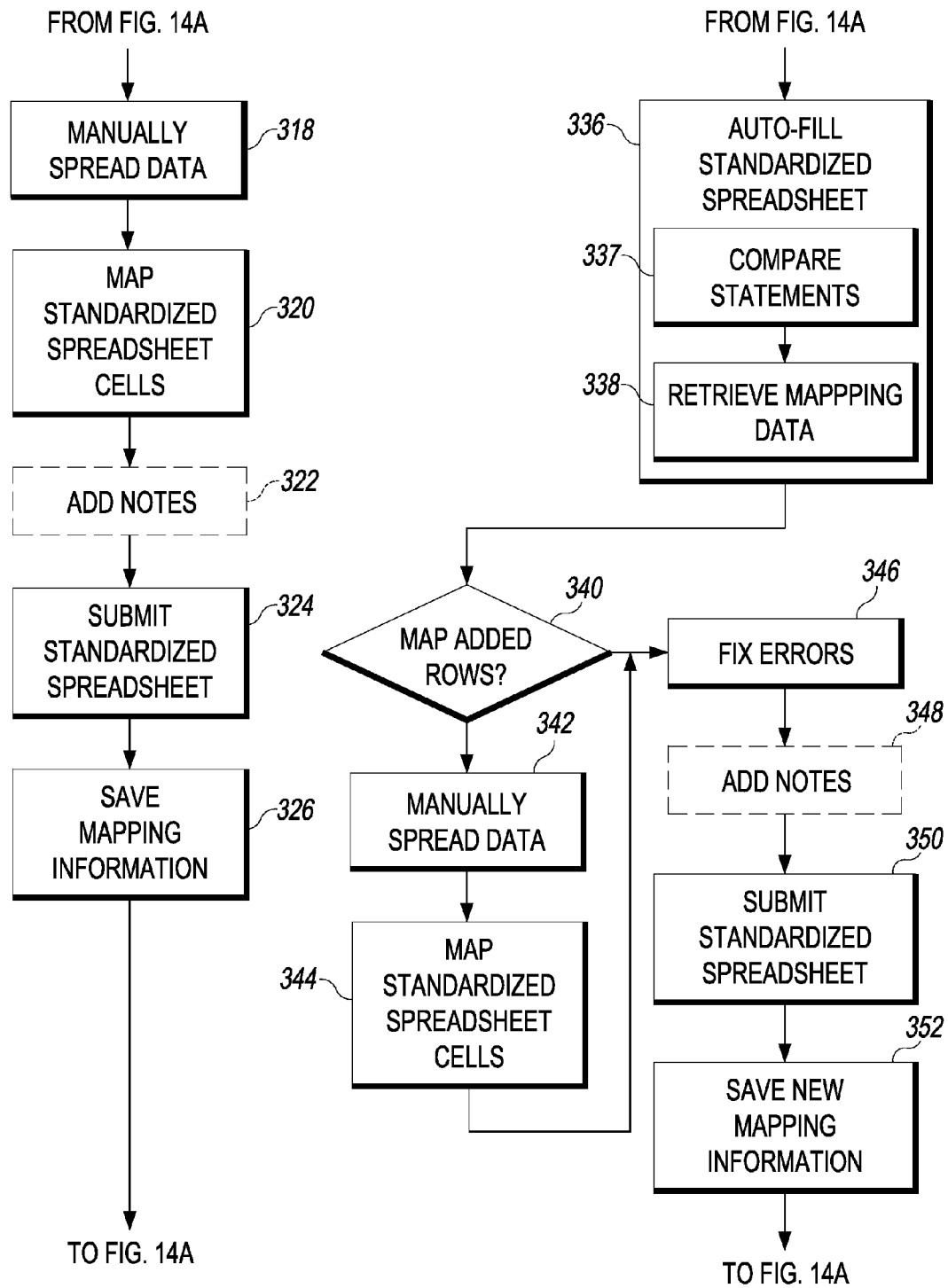

Referring now to FIG. 14, in another embodiment, an algorithm 300 for spreading data statements received in a digital image format (e.g., received via facsimile) beings with a process step 302. In process step 302, initialization steps and procedures may be performed. For example, in process step 302, a communication link between the data management server 12 and one of the client machines 50 may be established. Subsequently, in process step 304, a data statement is received by the data management server 12. As discussed above in regard to FIG. 1, the data statement may include any type of data such as financial data, product quality data, demographic data, identification data, advertising data, loan request data, etc. As such, the data statement may take one of a number of forms including financial statements, product data statements, insurance statements, loan and other applications, and/or the like. Additionally, in one particular embodiment, the data statement is embodied as a digital image such as facsimile or the like. However, in other embodiments, the data statement may be embodied as any type of document, such as a word processing document, a Portable Document Format (PDF) document, or the like, which is convertible to a digital image format as discussed below in regard to process step 306. The data statement may be received from a client machine 36 via the network 38, from a scanner 44 via communication links 46, or from a client machine 50 via the network 52. For example, in some applications, an analyst may provide the data statement to the data management server 12 via the client machine 50.

As discussed above in regard to FIG. 2, when a new data statement is received from a customer, the system 10 may be configured to provide a notification to a user associated with the customer in some embodiments. For example, a notification email may automatically be sent by the system 10 to the associated analyst. Additionally, if a new data statement has not been received from the customer within a predefined period of time, a notification may be provided to the associated relations manager, analyst, or other user. Based on such a notification, the user may contact the customer to determine the reason for the delay.

In process step 306, the data statement is converted to a standardized digital image format. In one particular embodiment, the data statement is converted to a Joint Photographic Experts Group (JPEG) format. However, in other embodiments, the data statement may be converter to other types of digital image formats including, but not limited to, a Bitmap (BMP) format, a Graphics Interchange Format (GIF), a Tagged Image File Format (TIFF), and/or the like. It should be appreciated that the data statement may be converted to any digital image format in process step 306 on which Optical Character Recognition (OCR) may be performed as discussed in more detail below in regard to process step 316. If, however, the data statement is received in the standardized digital image format (e.g., the data statement is received in a JPEG format), process step 306 may be skipped.

When a new data statement is received, the user may view a list containing newly received data statements and select one of the data statements to be spread as illustrated in, for example, FIG. 6. If the data statement was received in process step 304 as a digital image, the data statement may also need to be assigned to a particular company or customer before it may be spread. Once a user has selected a new data statement to be spread, the user is presented with a spreading user interface 500 as illustrated in FIG. 15. The user interface 500 includes a data statement pane 502 and a standardized spreadsheet pane 504. The user interface 500 may also include an attachment pane 506, which displays all of the documents or other attachments 508 associated with the current data statement. The current data statement 510 is displayed to the user in the data statement pane 502 and the standardized spreadsheet 512 is displayed in the standardized spreadsheet pane 504. The illustrative standardized spreadsheet 512 includes only a single column of data cells; however, when previous data statements have been spread, the standardized spreadsheet 512 may include any number of additional columns of data cells containing the historical data as illustrated, for example, in FIG. 42.

In process step 308, it is determined if the current data statement is the first data statement to be spread for the particular customer submitting the data statement. The system 10 may determine if the current data statement is the first data statement for the customer to be spread based on one or more of a number of criteria including, for example, customer identification data, the existence of previously spread data statements, the existence of stored standardized spreadsheets, or the like.

Figure 16:
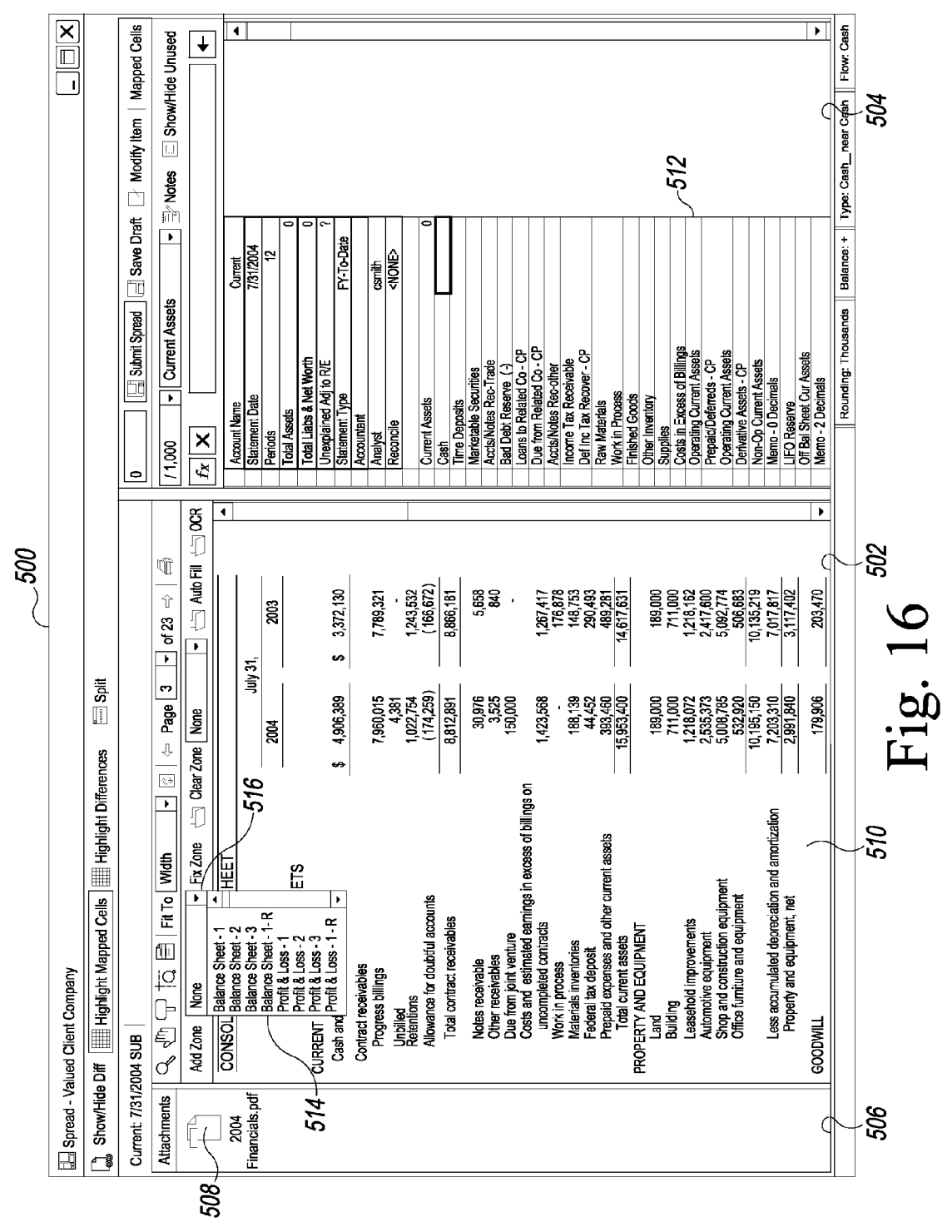
Figure 17:
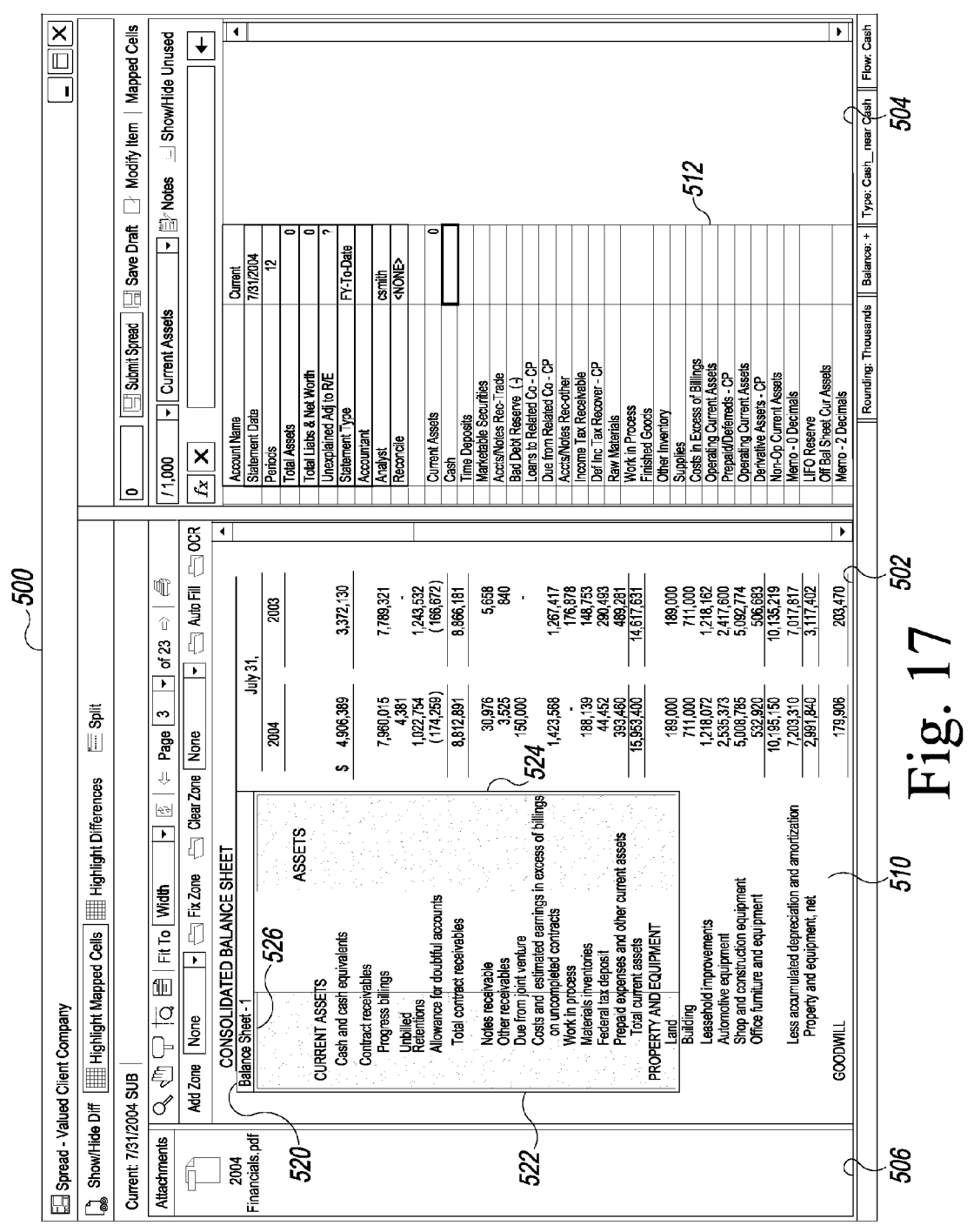

If the current data statement is the first data statement for the customer to be spread, the algorithm 300 advances to process step 310. In process step 310, the user begins spreading the data statement by first selecting a zone type to apply to the digital image of the data statement. As illustrated in FIG. 16, the user may select a zone type from a drop down menu 514, which is viewable by selecting a down-arrow icon 516. Once the zone type has been selected from the drop down menu 514, the zone is applied to the data statement 510 (i.e., to the digital image of the data statement). For example, the user may select a balance sheet zone from the drop down menu 514. As illustrated in FIG. 17, when the user makes such a selection, a balance sheet zone 520 is applied over the data statement 510. The balance sheet zone 520 includes a key or label column 522 and a data column 524. The key or label column 522 is configured to overlay the text keys or labels of the data statement 510. Similarly, the data column 524 is configured to overlay the data of the same row of the data statement 510 as the associated text key or label.

In some embodiments, the column 522 may include indicia to indicate that it is a key or label column. For example, as illustrated in FIG. 17, the key or label column 522 includes a bold or colored horizontal line 526 at the top of the column 522. However, in other embodiments, other types of indicia may be used. For example, the column 522 may have a background color different from the data column 524 in some embodiments. As such, the key or label column 522 is readily identifiable even in those zone types wherein the column 522 is in an alternative position compared to the balance sheet zone 522 such as in zone types wherein the key or label column 522 is positioned on the right side of the zone as discussed below in more detail in regard to process step 314.

Figure 18:
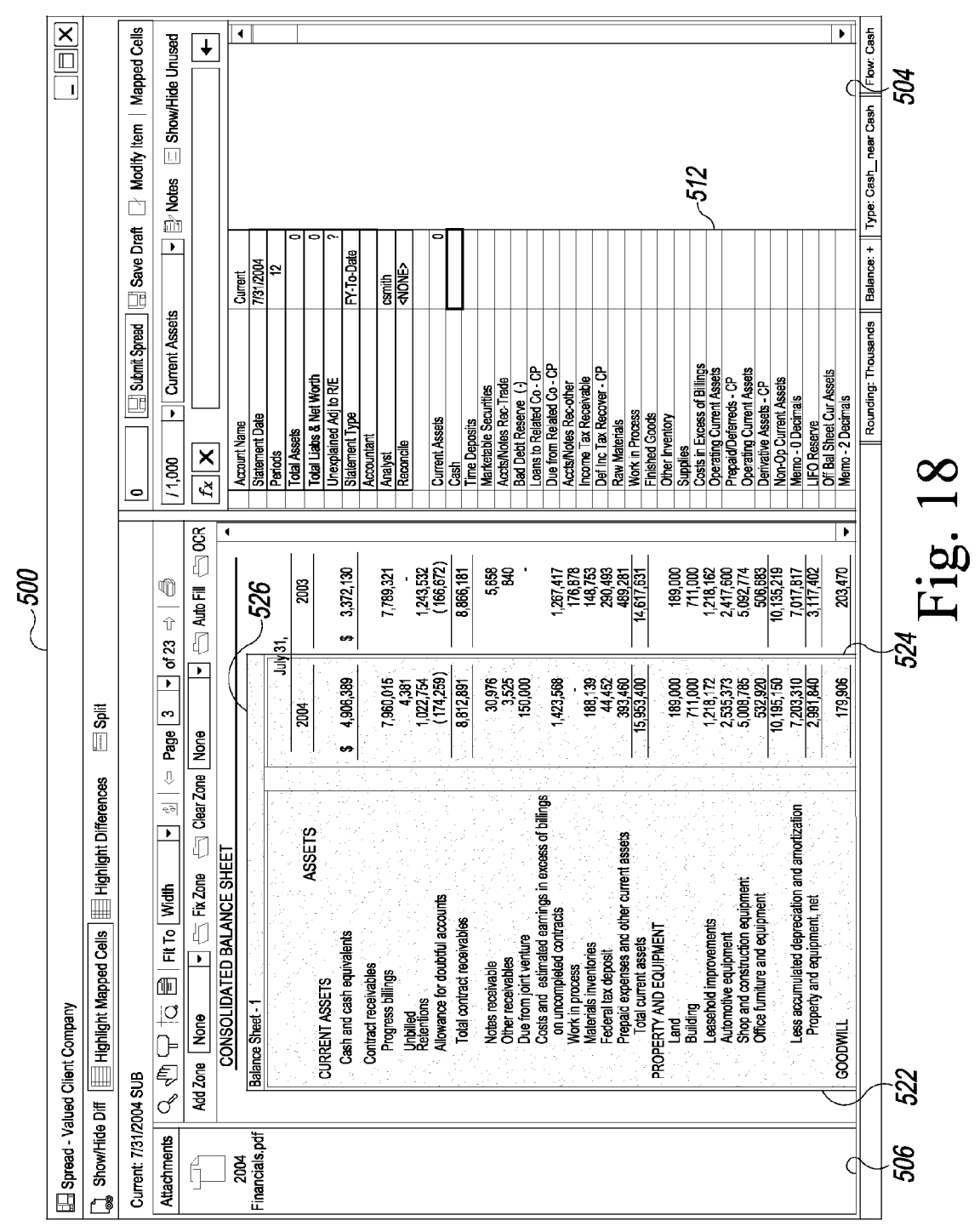

The balance sheet zone 520 is initially applied to the data statement 510 in a default position. However, in process step 312, the user may reposition the selected zone (e.g., the balance sheet zone 520) and/or resize the zone. For example, as illustrated in FIG. 18, the balance sheet zone 520 has been repositioned such that the key or label column 522 overlays the labels 528 of the data statement 510 and the data column 524 overlays the data 530 of the data statement 510. In addition, the balance sheet zone 520 has been resized such that the columns 522, 524 overlay the complete set of keys or labels and associated data, respectively, of the current page of the data statement 510.

Figure 19:
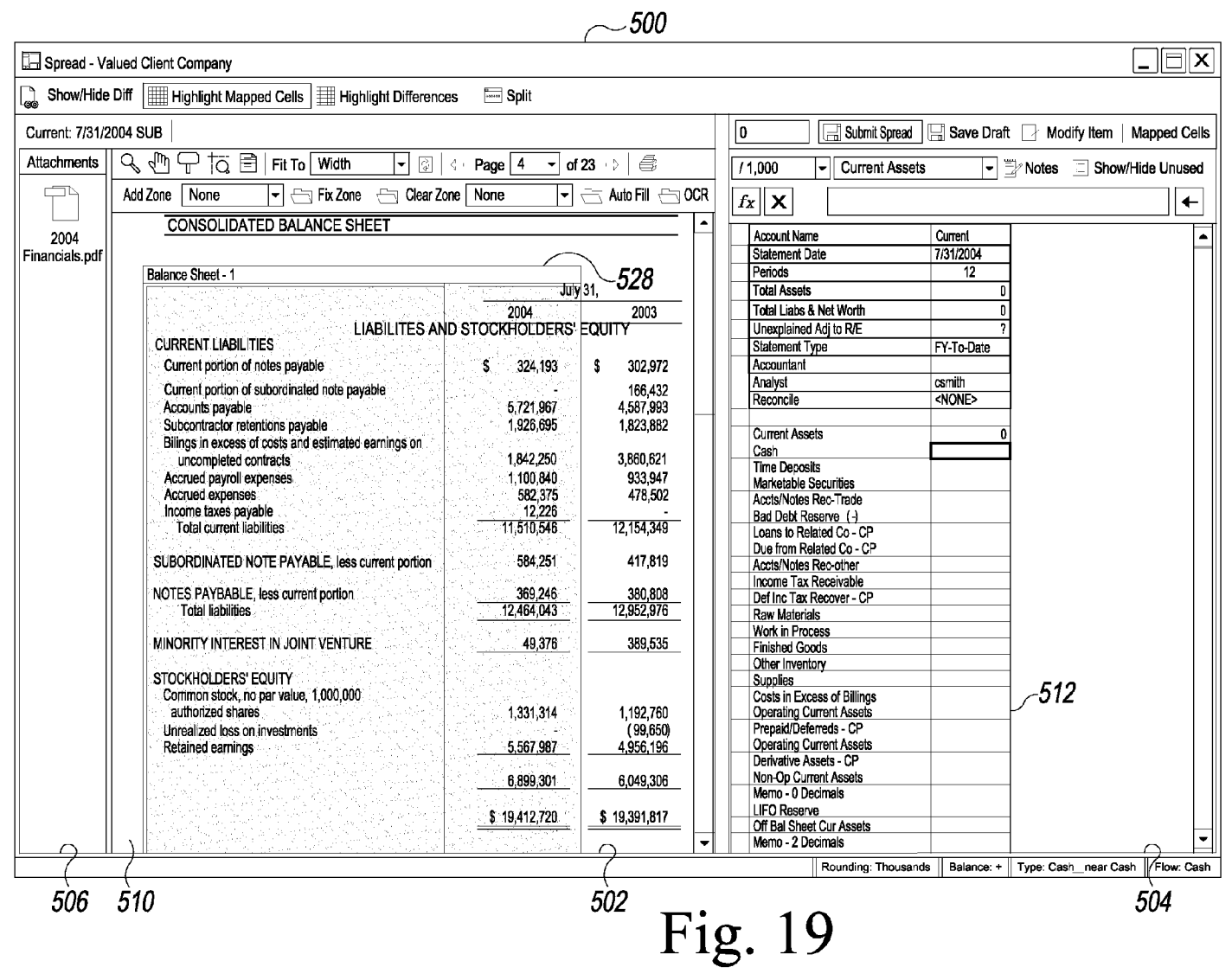

Once the user has positioned and sized the current zone in process step 312, the user may apply additional zones to the data statement 510 in process step 314. In this way, the algorithm 300 loops between process steps 310, 312, and 314 until the user has applied all of the desired zones to the data statement 510. For example, as illustrated in FIG. 19, if the current data statement 510 includes multiple pages, the user may apply a second balance sheet zone 520 to one or more of the remaining pages. When the same type of zone (e.g., another balance sheet zone 520) is selected to be applied to another page of the data statement 510, the new balance sheet zone 528 is configured to default to the size and position of the previously used balance sheet zone 520. The new balance sheet zone 528 may, however, be repositioned and resized in process step 312.

Additionally, other types of zones may be selected and applied to the data statement 510. For example, as illustrated in FIG. 20, a profit and loss sheet zone 530 may be selected from the drop-down menu 514 and applied to the profit and loss portion of the data statement 510. The profit and loss sheet zone 530 is substantially similar to the balance sheet zone 520 and may be repositioned and resized in process step 312 such that a key or label column 532 of the profit and loss sheet zone 530 overlays the keys or labels of the profit and loss portion of the data statement 510 and a data column 534 of the profit and loss zone 530 overlays the data of the same row of the data statement 10 as the associated text key or label. Different types of zones (e.g., balance sheet zone 520 and profit and loss zone 530) may be used on a single data statement 510 such that data associated with identical keys or labels may be mapped correctly. For example, the balance sheet portion of the data statement 510 may include a "cash" label and associated data and the profit and loss portion of the data statement 510 may also include a "cash" label and associated data. By using different zone types to overlay on the different portions of the data statement 510, the data from each portion of the data statement 510 may be mapped correctly to the corresponding data cells of the standardized spreadsheet 512 as discussed in more detail below in regard to process steps 318 and 320.

Figure 21:
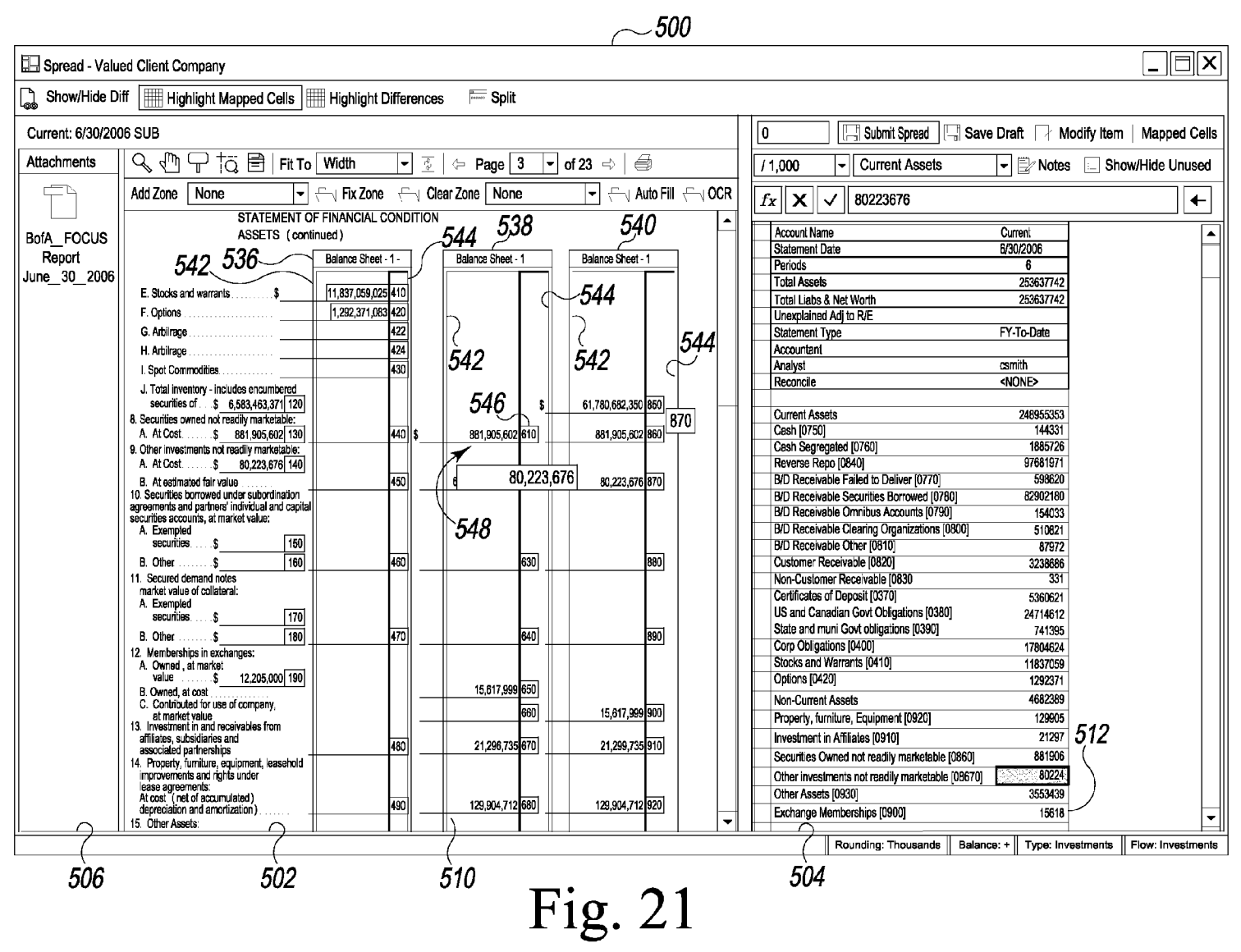

Additionally, in some embodiments, multiple zones of the same zone type may be applied to a single page of the data statement 510. For example, as illustrated in FIG. 21, a user may apply a first balance sheet zone 536, a second balance sheet zone 538, and a third balance sheet zone 540 to the data statement 510. In such embodiments, each zone of the same type is treated as a portion of one larger zone. For example, if multiple "Balance Sheet" zones are used across a number of different pages of the data statement 510, the system 10 treats the number of zones as a single zone. As discussed above in regard to process step 312 of the algorithm 300, each of the balance sheet zones 536, 538, 540 may be repositioned and resized on the data statement 510. Each of the balance sheet zones 536, 538, 540 includes a key or label column 544 configured to overlay the text keys or labels of the data statement 510 a data column 542 configured to overlay the data of the same row of the data statement 510 as the associated text key or label. It should be appreciated that any zone type may include a key or label column positioned on either side of the data column. For example, as shown in FIG. 21, the key or label columns 544 of the illustrative balance sheet zones 536, 538, 540 are positioned on the right side of the corresponding data column 542. However, in other embodiments, any one or more of the key or label columns 544 may be positioned on the left side of the corresponding data column 542 as illustrated in FIG. 18.

As discussed above, each key or label column 544 is positioned such that the column 544 overlays the text keys or labels of the data statement 510. In the illustrative example of FIG. 21, the text keys or labels are embodied as numeric numbers, but may be embodied as other indicia in other embodiments. As such, the data associated with each numeric number is mapped based on the numeric number as discussed in more detail below in regard to process steps 318 and 320. For example, the balance sheet zone 538 includes a key 546 defined as "610" in the key or label column 544 of the balance sheet zone 538. The data 548 associated with the key 546 (i.e., with the number "610") is positioned toward the left of the key 546 and is defined as "881,905,602." As such, it should be appreciated that each key or label may be embodied as character text data, numeric text data, and/or position data as discussed in more detail below.

Figure 22:
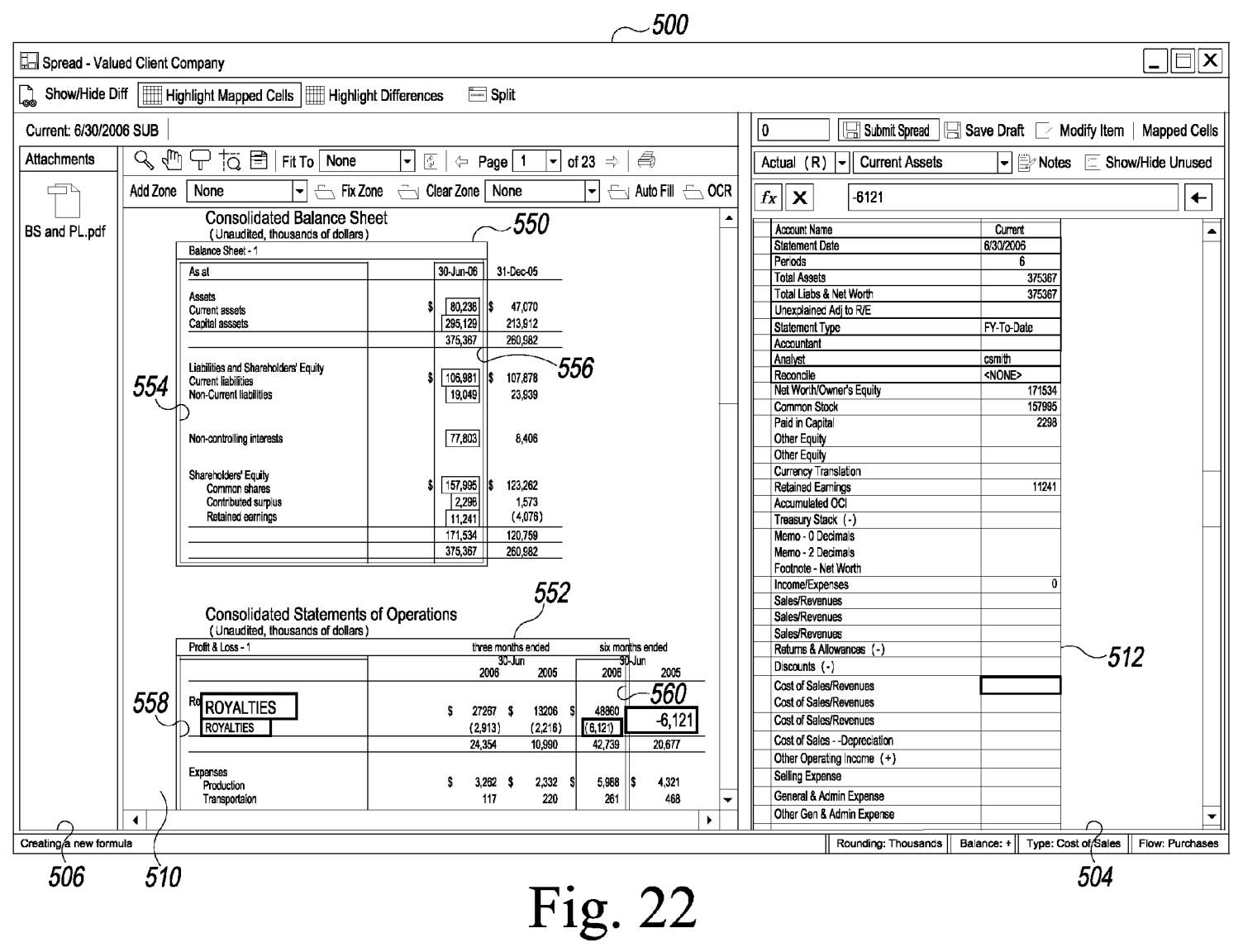

In addition to multiple zones of the same type, multiple zones of different types may be applied to or overlaid on the same page of the data statement 510. For example, as illustrated in FIG. 22, a balance sheet zone 550 and a profit and loss sheet 552 may be applied to the same page of the data statement 510. Each zone 550, 552 may be positioned and resized as discussed above in regard to process step 312. Additionally, as discussed previously, each zone includes a key or label column and a data column. In particular, the balance sheet zone 550 includes a key or label column 554 configured to overlay the text keys or labels of the data statement 510 and a data column 556 configured to overlay the data of the same row of the data statement 510 as the associated text key or label. Similarly, the profit and loss sheet zone 552 includes a key or label column 558 configured to overlay the text keys or labels of the data statement 510 and a data column 560 configured to overlay the data of the same row of the data statement 510 as the associated text key or label.

Figure 23:
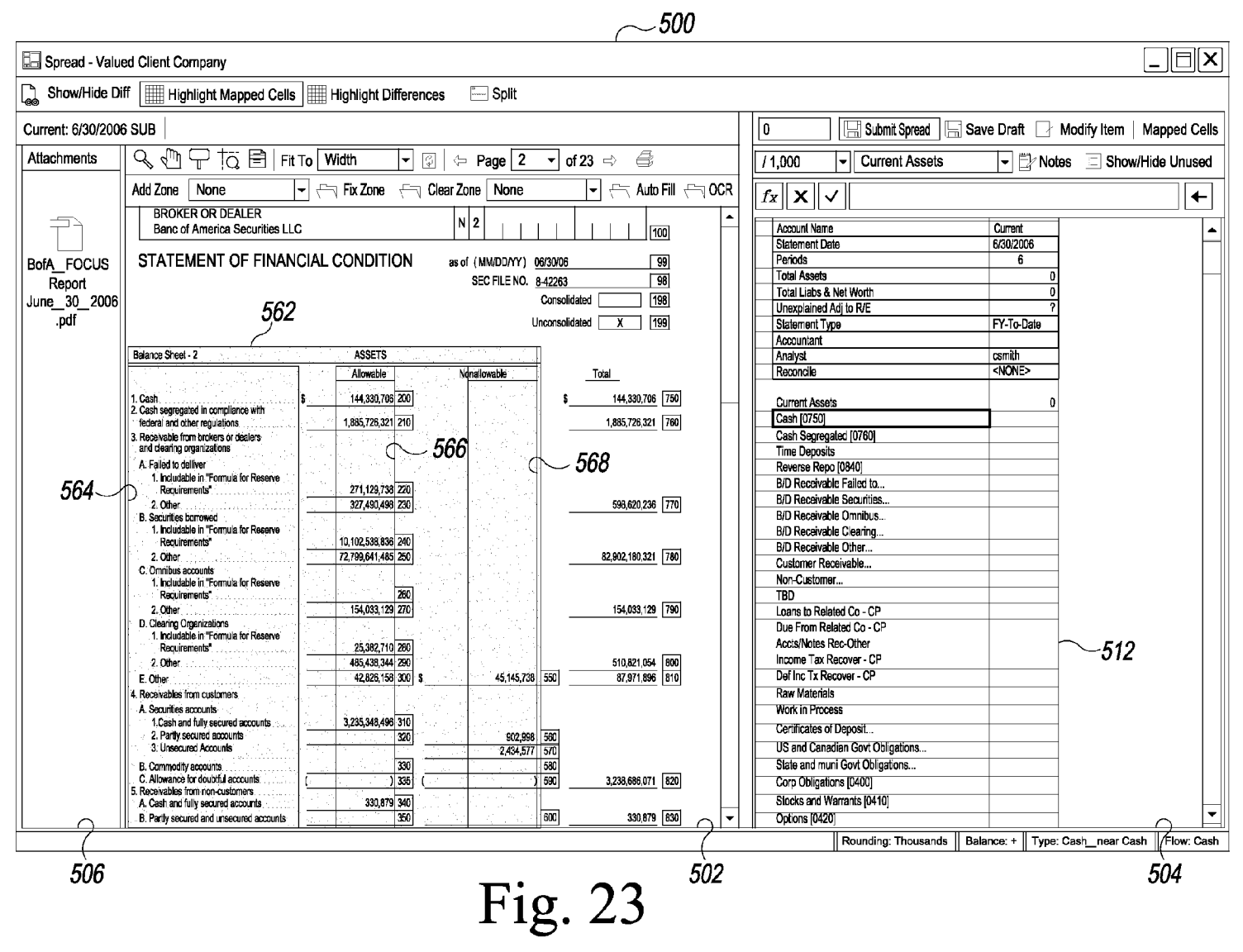
Figure 24:
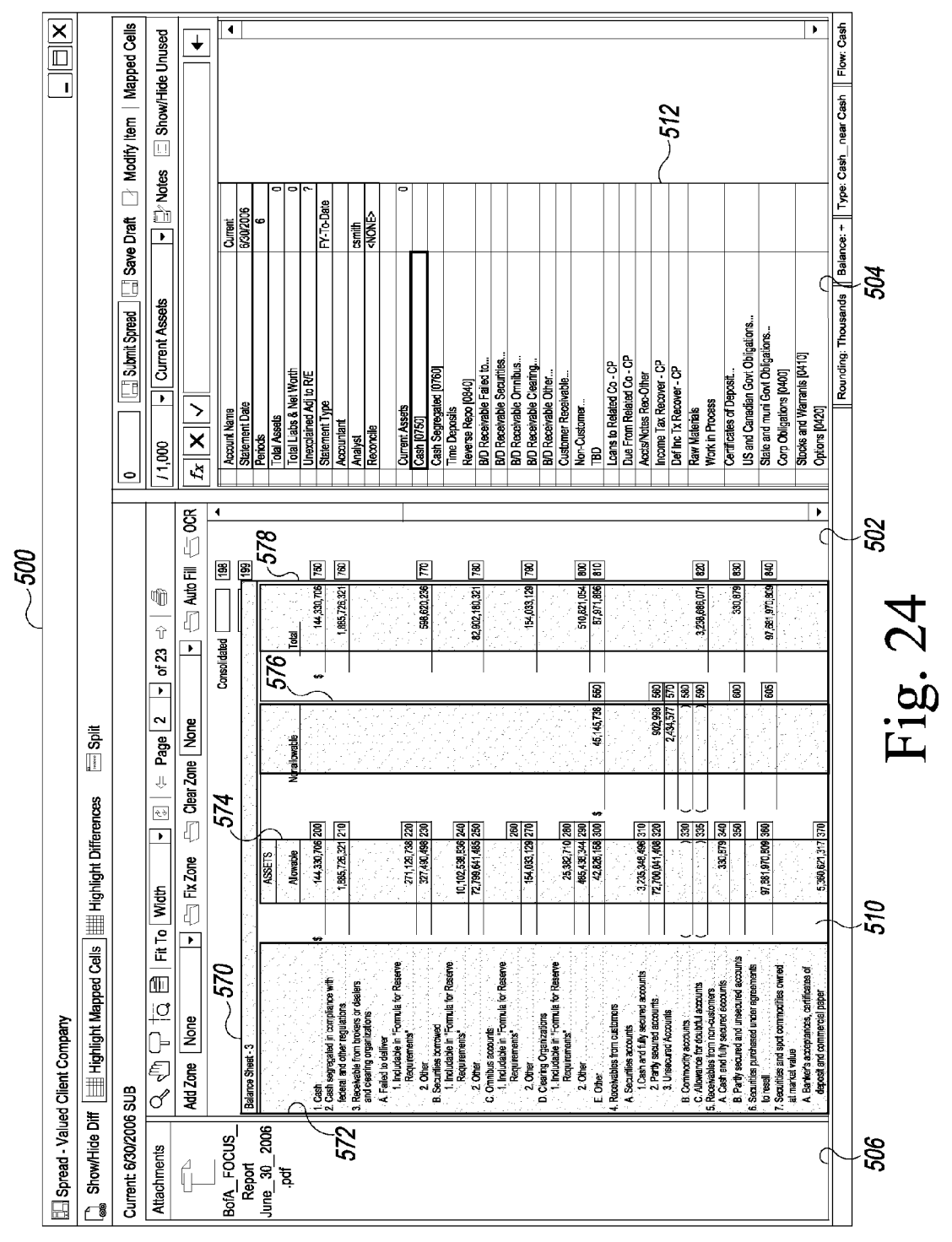

Additionally, zones having different configurations may be used in some embodiments. For example, the zones may include one or more key or label columns and one or more data columns. In embodiments wherein a zone include more than one key column, the combined key or label (i.e., the combination of keys or labels from each column of a single row) may be used for mapping the data items of the data column(s) to the standardized spreadsheet 512 as discussed below in regard to process steps 320 and 322. Additionally or alternatively, as illustrated in FIGS. 23 and 24, zones may include multiple data columns in some embodiments. For example, as illustrated in FIG. 23, a balance sheet zone 562 having a key or label column 564, a first data column 566, and a second data column 568 may be used to overlay a data statement having multiple data columns. The balance sheet zone 562 may be repositioned and resized such that the key or label column 564 overlays the text keys or labels of the data statement 510 and each data column 566, 568 overlays one of the data items associated with the text key or labels. Because the illustrative data statement 510 of FIG. 23 includes separate keys or labels for each data item of each row, multiple balance sheet zones may be used in other embodiments as illustrated in FIG. 21. In embodiments, wherein a single balance sheet zone 562 having multiple data columns 566, 568 is used, the data of each data column 566, 568 is mapped to the standardized spreadsheet 512 based on, in part, the associated key or label in the key column 564 and the column number (or other indicia identifying each column) in which the data is positioned as discussed in more detail below in regard to process steps 320 and 322.

As discussed above, each zone type may have any number of data columns. For example, in other embodiments, zones having three or more data columns may be used. For example, as illustrated in FIG. 24, a balance sheet zone 570 having a single key or label column 572, a first data column 574, a second data column 576, and a third data column 578 is used to overlay a data statement 510 having multiple data columns. Similar to balance sheet zone 562 of FIG. 23, the balance sheet zone 570 may be repositioned and resized such that the key or label column 572 overlays the text keys or labels of the data statement 510 and each data column 574, 576, 578 overlays one of the data items associated with the text key or labels. Again, because the illustrative data statement 510 of FIG. 24 includes separate keys or labels for each data item of each row, multiple balance sheet zones may be used in other embodiments as illustrated in FIG. 21. In embodiments, wherein a single balance sheet zone 570 having multiple data columns 574, 576, 578 is used, the data of each data column 574, 576, 578 is mapped to the standardized spreadsheet 512 based on, in part, the associated key or label in the key column 572 and the column number (or other indicia identifying each column) in which the data is positioned in a similar manner as described above in regard to the balance sheet zone 562 of FIG. 23.

Figure 25:
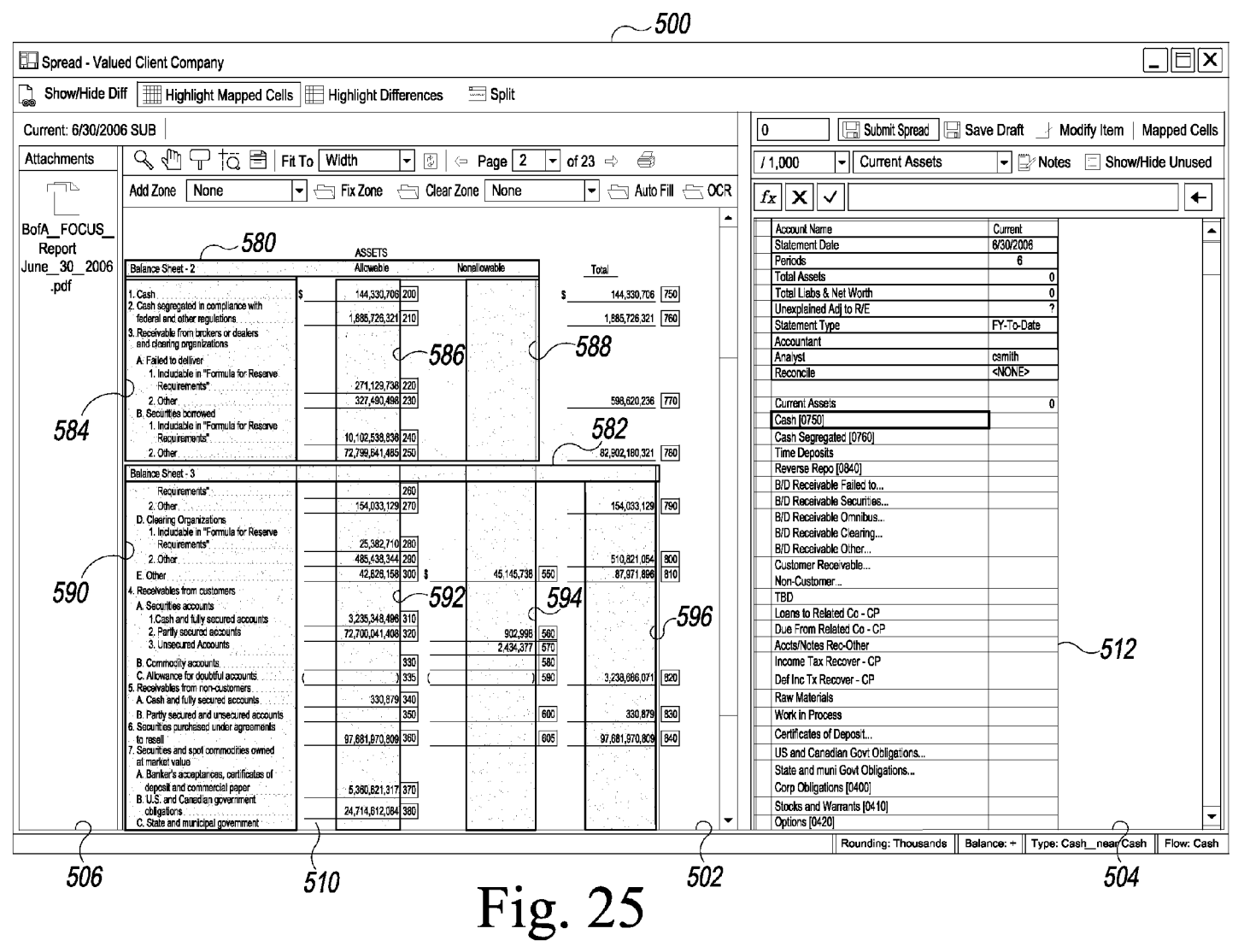

In addition to using different zone types on a single page of the data statement 510 as illustrated in FIG. 22, zones having different numbers of data columns and/or key columns may be used on a single page of the data statement 510. For example, as illustrated in FIG. 25, the user may apply a balance sheet zone 580 having two data columns and a balance sheet zone 582 having three data columns. In particular, the balance sheet zone 580 includes a single key or label column 584, a first data column 586, and a second data column 588. The balance sheet zone 582 includes a single key or label column 590, a first data column 592, a second data column 594, and a third data column 596. Each balance sheet zone 580, 582 may be repositioned and resized such that the key or label columns 584, 590 overlay the text keys or labels of the data statement 510 and each data column 586, 588, 592, 594, 596 overlays one of the data items associated with the text key or labels.

Figure 26:
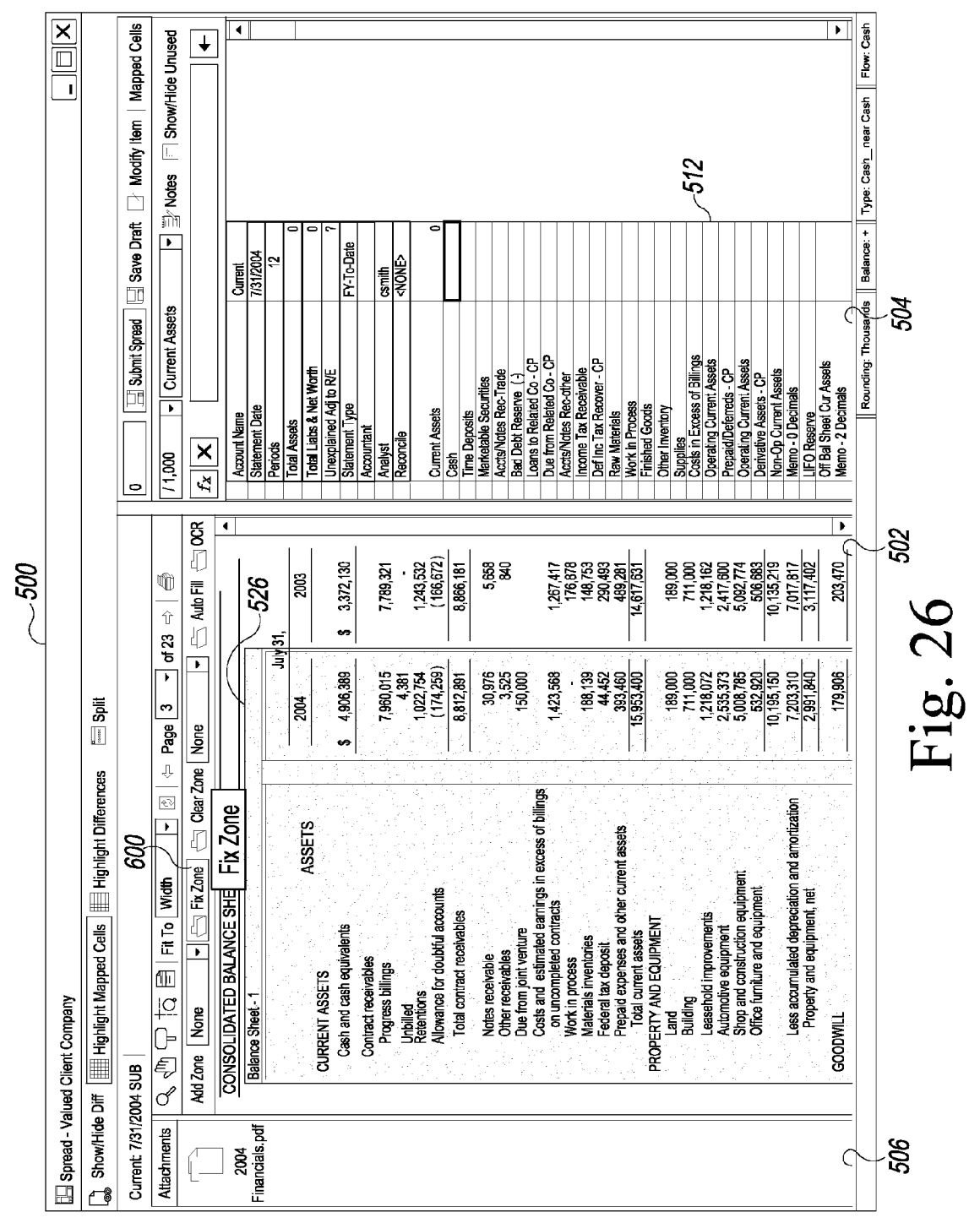

Referring now back to process step 314 of algorithm 300, once the user has applied and positioned all of the desired zones on the data statement 510, the zones are subsequently fixed in process step 316. To do so, the user may select a fix zone button 600 from the user interface 500 as illustrated in FIG. 26. Once selected, an optical character recognition (OCR) process is applied to the data statement 510. For example, in one embodiment, an optical character recognition process is applied to each page of the data statement 510 on which one or more zones have been applied. Alternatively, in other embodiments, the optical character recognition process may be applied only to those portions of the data statement 510 that are overlaid with a zone. Further, in other embodiments, the complete data statement 510 or portions greater than the overlaid portions of the data statement 510 may be subjected to the optical character recognition process. Additionally, although in the illustrative embodiment the optical character recognition process is not applied to the data statement 510 until the zones have been fixed in process step 316, the optical character recognition process may be applied to the data statement when the data statement is initially received (e.g., in process step 304) in other embodiments. In such embodiments, the data associated with the portions of the data statement overlaid with a zone are retrieved in process step 316.

Any optical character recognition process may be used that is capable of converting digital images of text to readable and editable text. When the optical character recognition process is applied to the zones, the data generated by the process is stored in a table format of the system 10. By storing the data in a table format, the system 10 may refer to the processed data by, for example, row and column. As discussed above, all zones of the same type are treated as a portion of a single, larger zone. As such, the system 10 is configured to store the data located in each zone of the same type in a single zone data table (e.g., a balance sheet data table, a profit and loss sheet data table, etc.). It should be appreciated that such zone data tables include all of the data located in the relevant zones. That is, even data that is not subsequently mapped to the standardized spreadsheet (see process steps 318 and 320 below) is stored in the zone data tables. Once the zones that have been applied to the data statement 510 are fixed in process step 316, each zone may change color, background texture, or other indicia to indicate to the user that the zone has been fixed. For example, as illustrated in FIG. 27, the background of each zone may switch from a shaded or dark background when un-fixed to an un-shaded or light background once the particular zone or zones have been fixed.

Figure 28:
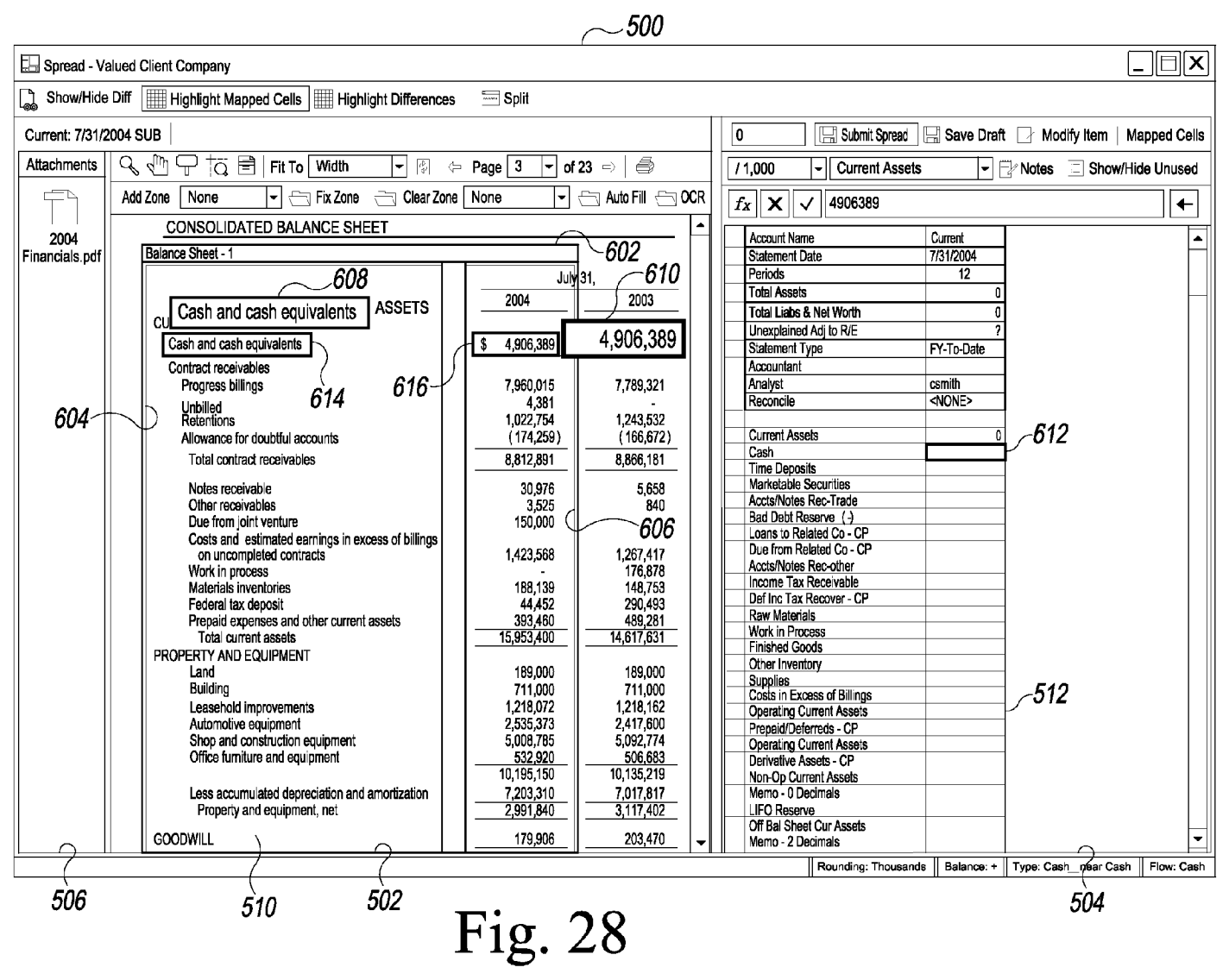

Once the optical character recognition process has been applied to the data statement 510 in process step 316, the data statement 510 is manually spread into the standardized spreadsheet 512 in process step 318. To do so, the user may select a portion of the data statement 510 overlaid with the associated zone. That is, a user may select a particular data item or, in some embodiments, a key or label associated with the desired data item. For example, as illustrated in FIG. 28, the user may select a data item 616 located in the data column 606 of the balance sheet zone 602 (i.e., a spatial region of the data statement 510 surrounding the desired piece of data). In response, the data item 616 and the associated key 614 located in the key or label column 604 are highlighted. Additionally, a data window 610 and a key window 608 are displayed to the user near the highlighted key and data. The numerical value, text, or other data associated with data item 616, as generated by the optical character recognition process, is displayed in the data window 610. Similarly, the textual data of the highlighted key or label 614, as generated by the optical character recognition process, is displayed in the key or label window 608. The numerical, textual, and/or other data displayed in the windows 608, 610 may be displayed in a larger font than that of the data statement 510 to increase readability for the user. The user may also review the displayed text and numerical values to ensure accuracy and correct any inaccuracies, which may have developed during the optical character recognition process, as discussed in more detail below in regard to process step 346.

Figure 29:
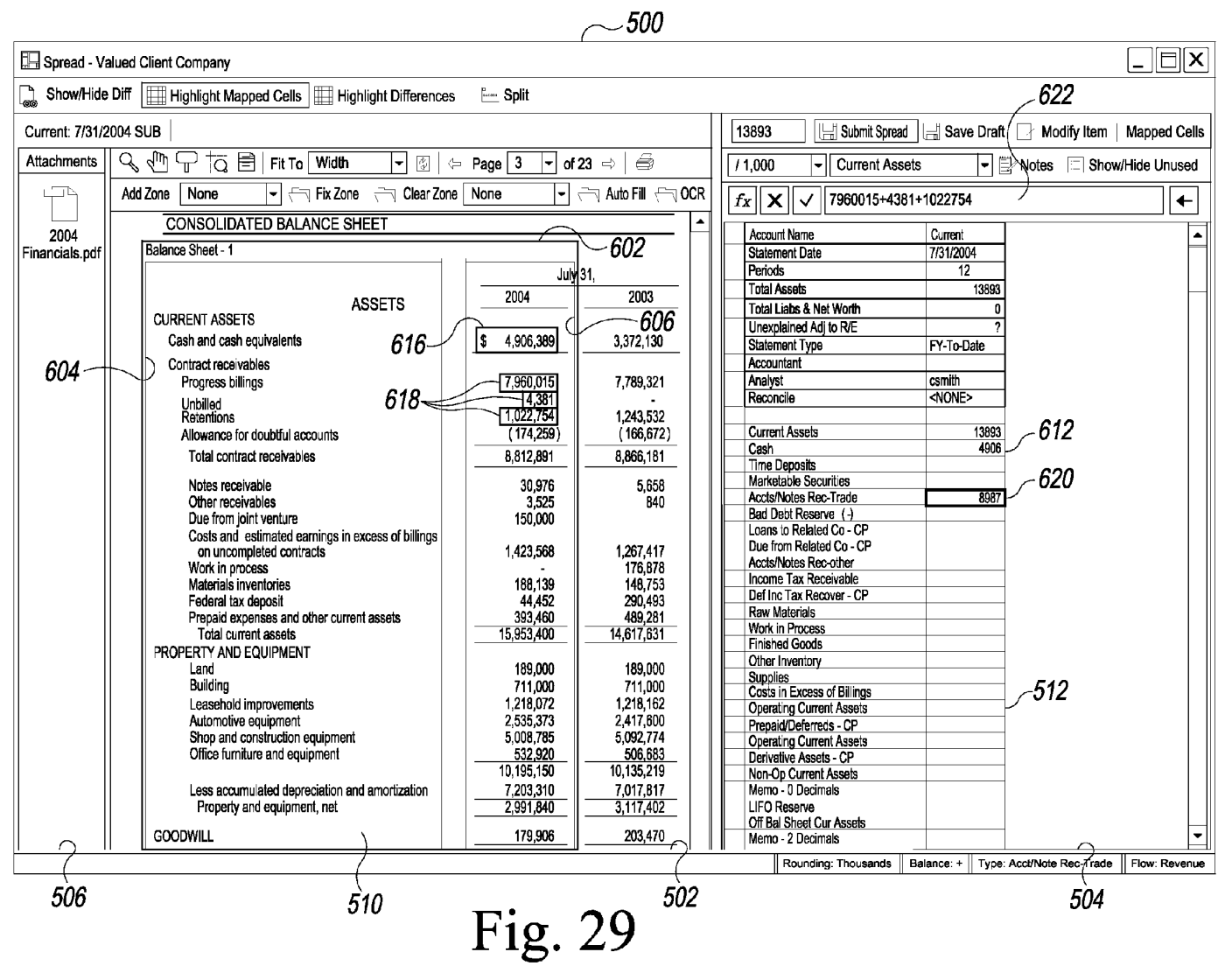

Once the user has selected a portion of the data statement 510 (e.g. the data item 616), the user may then select an appropriate data cell of the standardized spreadsheet 512 that is to be mapped to the selected portion. When the user selects a data cell 612 of the standardized spreadsheet 512, indicia of the selection is applied to the data cell 612. Illustratively, the data cell 612 becomes shaded upon selection, but other means of indicating the selection to the user may be used in other embodiments. Additionally, once the user selects the appropriate data cell 612 in the standardized spreadsheet 512, the system 10 copies the numeric value, text, or other data of the selected data item 616, which is displayed in the data window 610 (see FIG. 28), to the selected data cell 612 as illustrated in FIG. 29. In this way, the user is not required to manually type in the numeric value, text, or other data. The data cell 612 may be mapped to the data item 616 of the data statement 510 using any suitable data that identifies the location of the data item 616. For example, in one particular embodiment, the data cell 612 may be mapped to the data item 616 based on the name or type of zone in which the data item 616 is located (e.g., "Balance Sheet 1"), the row and/or column of the zone in which the data item is located, the key or label 614 associated with the data item 616, and spatial coordinates of the data item 616 on the digital image of the data statement 510. However, in other embodiments, other identity data may be used to map the data cell 612 to the data item 616. For example, in some embodiments, only the spatial coordinates of the data item 616 on the digital image of the data statement 510 may be used.

Once the selected data cell 612 of the standardized spreadsheet 512 has been mapped to the data item 616 located in the data column 606, the data item 616 is highlighted to indicate that it has been mapped. The data item 616 may be highlighted using any suitable manner. For example, the data item may be shaded, colored, or the like.

In some embodiments, the user may select more than a single data item of the data column 606 to map to a single data cell of the standardized spreadsheet 510. For example, as illustrated in FIG. 29, the user may alternate selecting each desired data item 618 from the data column 606 (or, in some embodiments, the key or label associated therewith) and a data cell 620 of the standardized spreadsheet 512 in which the data should be applied. In response, the system 10 is configured to combine the numerical values or other data of each selected data item 618, as generated by the optical character recognition process, using an appropriate mathematical formula. For example, in embodiments wherein the data is embodied as numerical values, the system 10 may combine the numeric values by summing the values. The mathematical formula used, as well as the data being combined, is displayed to the user in a data window 622 located above the standardized spreadsheet 512. The user may delete, change, or add to the mathematical formula. For example, the user may add a constant value to the formula or change one or more mathematical operators. Once the numerical values of each selected data item 618 have been combined, the resulting data value is stored in the selected data cell 620 of the standardized spreadsheet 512.

Figure 30:
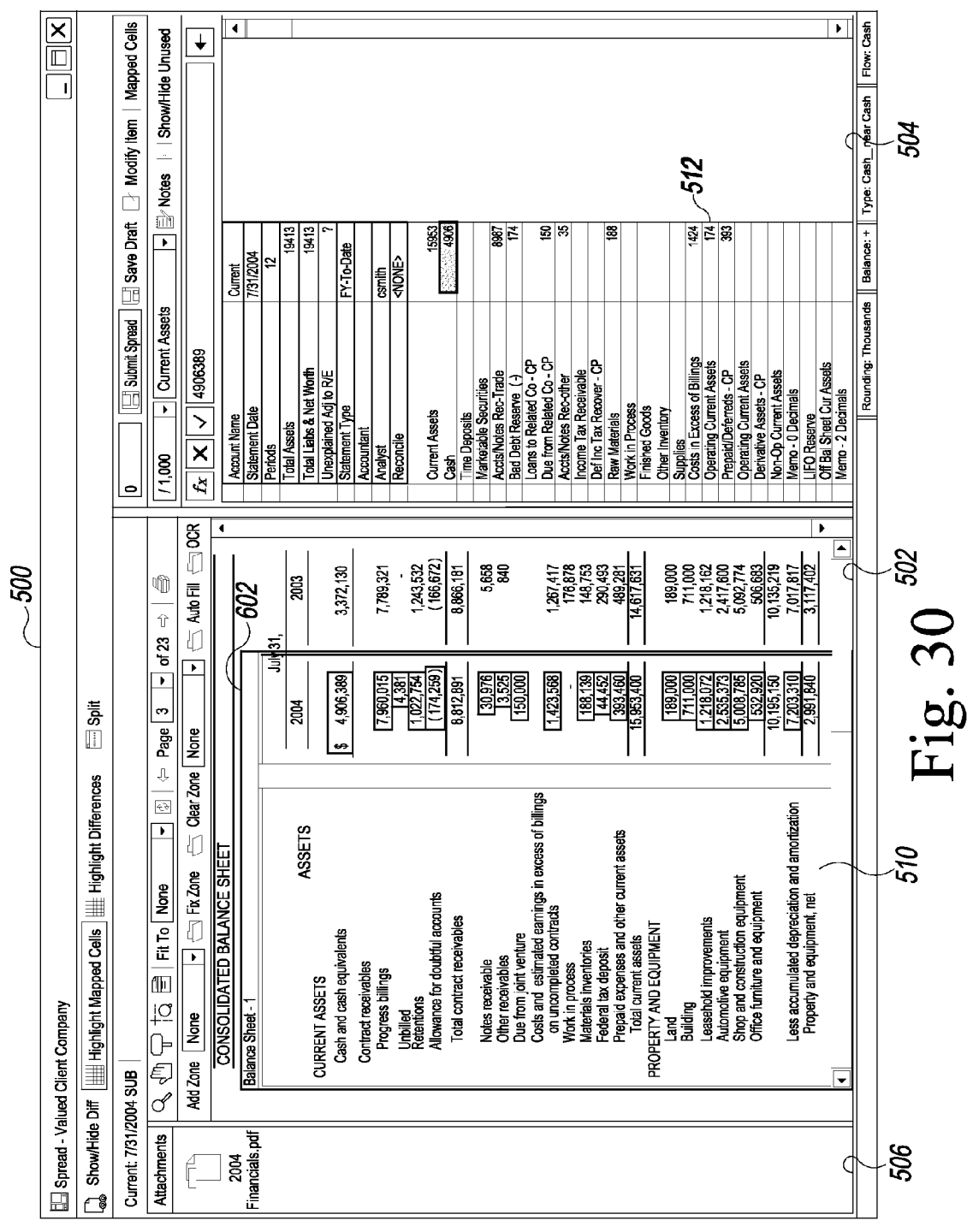
Figure 31:
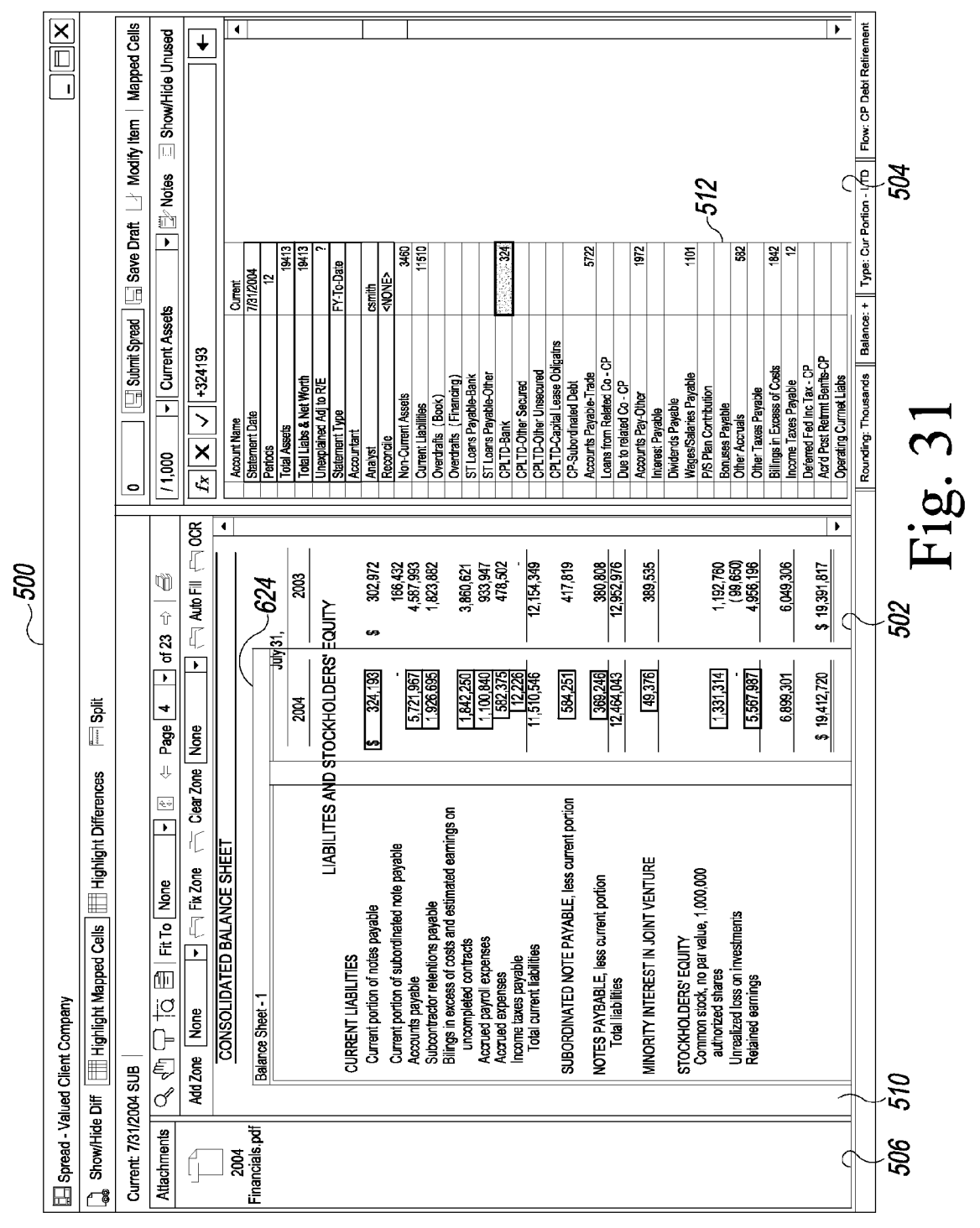
Figure 32:
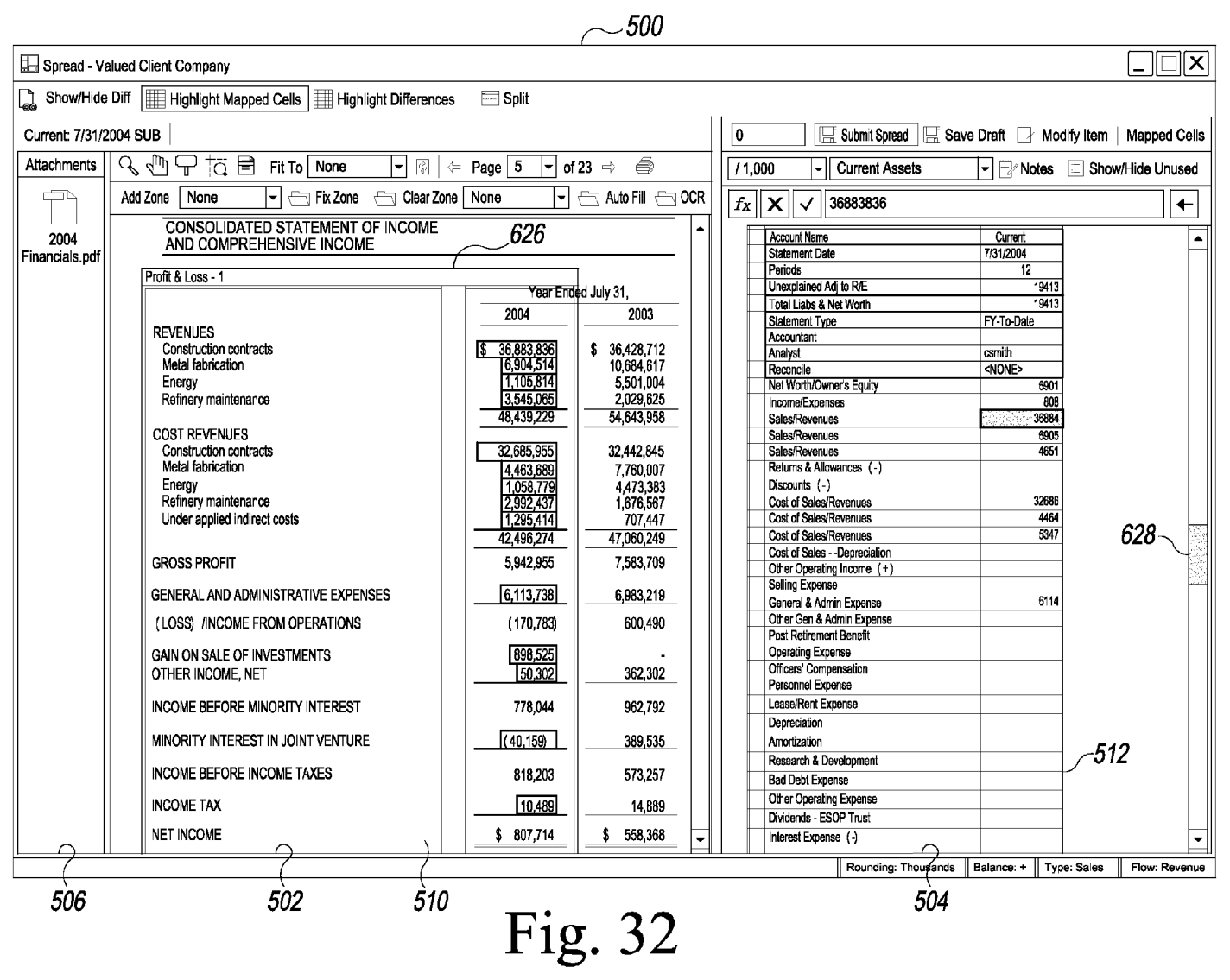

The user may continue mapping each desired data item of the zone (e.g., the balance sheet zone 602) until every desired data item is mapped to a data cell of the standardized spreadsheet 512. As illustrated in FIG. 30, each data item of the data column 606 of the balance sheet zone 602 that has been mapped is highlighted and each mapped data cell of the standardized spreadsheet 512 includes the corresponding numerical value or combination of values. Once the initial zone has been fully mapped (e.g., the balance sheet zone 602), the user may continue on mapping the remaining zones that have been applied to the present data statement 510. For example, as illustrated in FIG. 31, a balance sheet zone 624 has been applied to the liabilities and stockholders' equity portion of the data statement 510 and has been subsequently mapped to the liabilities portion of the standardized spreadsheet 512. Similarly, as illustrated in FIG. 32, a profit and loss sheet zone 626 has been applied to the statement of income portion of the data statement 510 and has been subsequently mapped to the income/expenses portion of the standardized spreadsheet 512. The different portions of the standardized spreadsheet 512 may be located by adjusting a slider button 628 located on the right side of the standardized spreadsheet 512.

Figure 33:
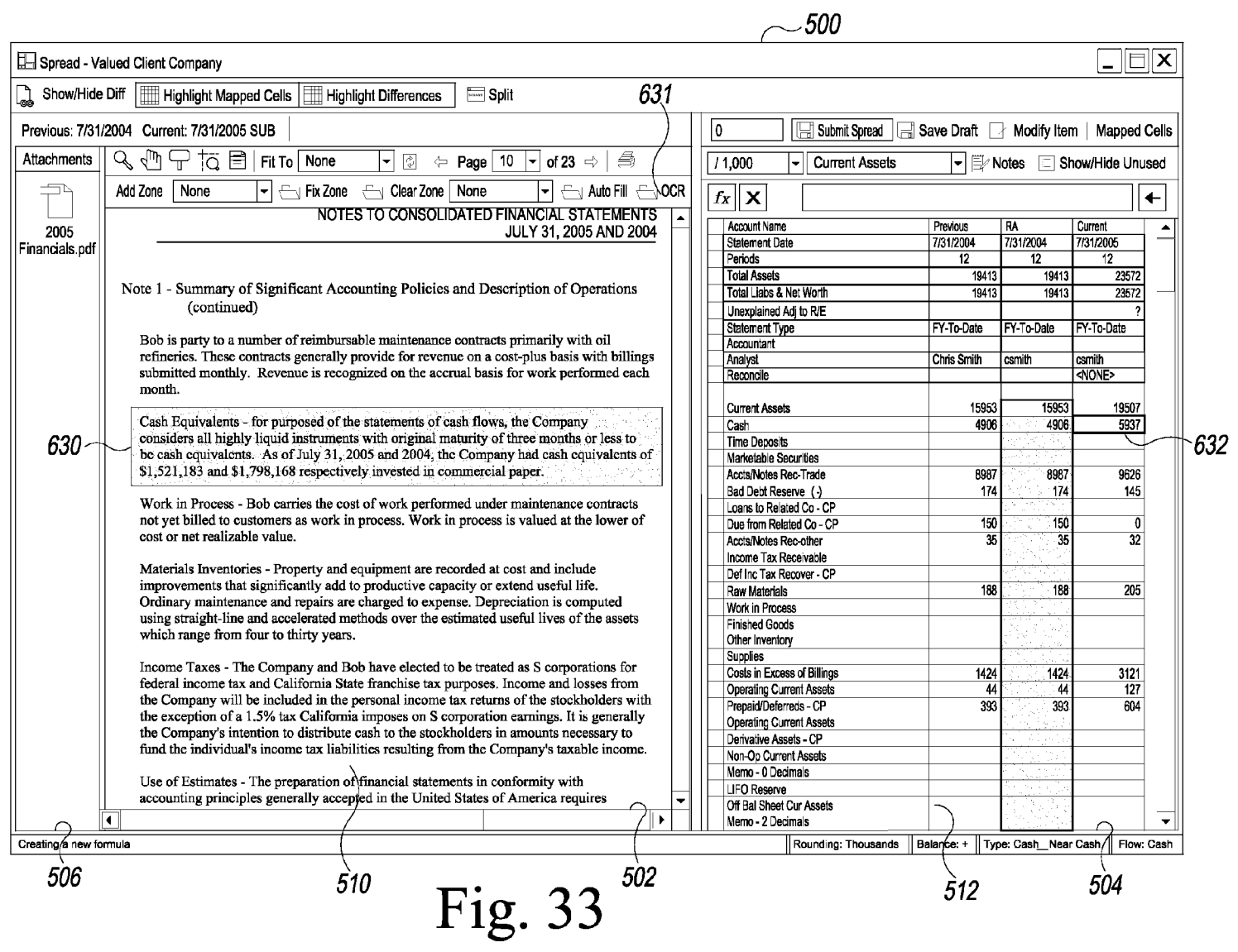
Figure 34:
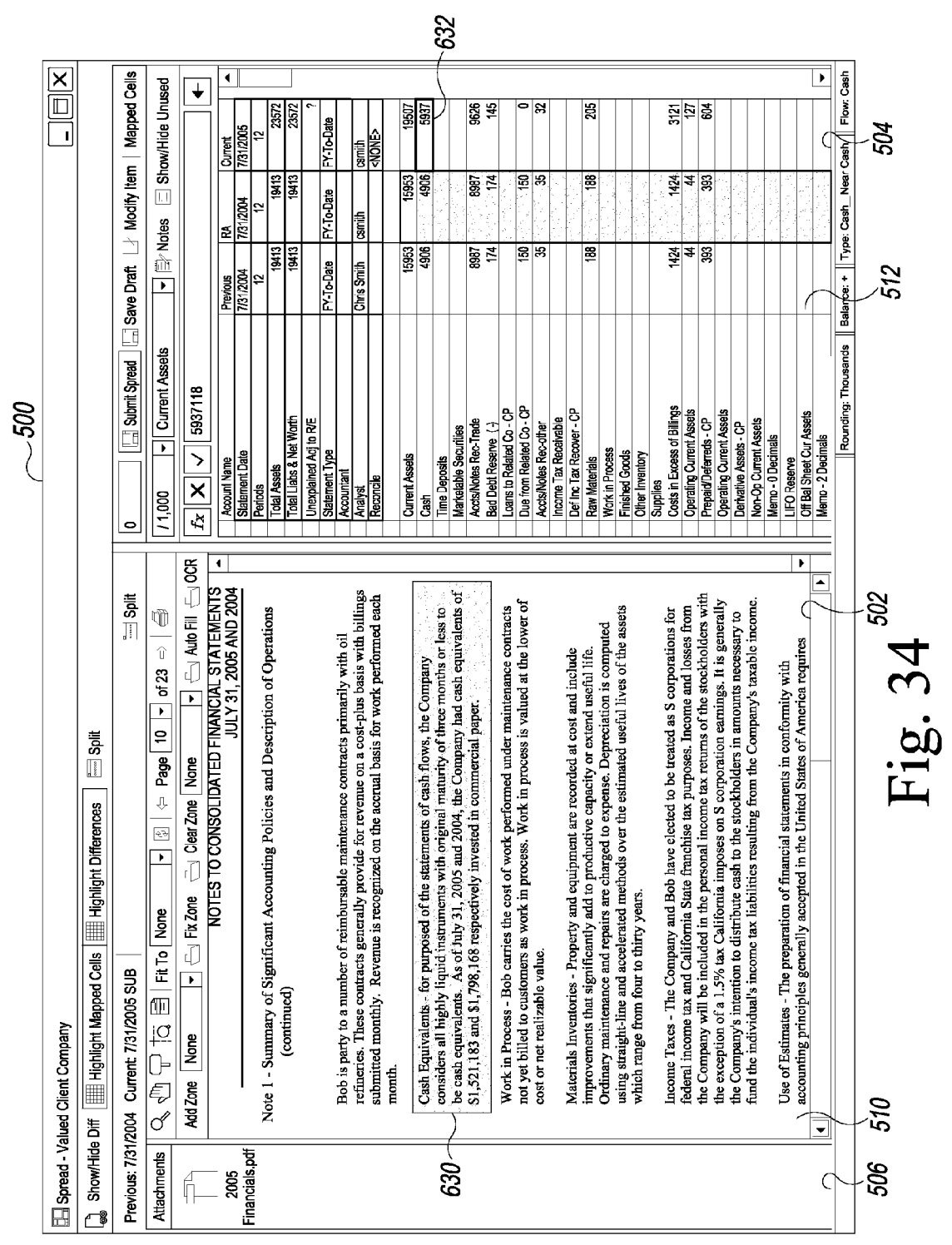

During or subsequent to the mapping process of steps 318 and 320, the user may map textual portions of the data statement to one or more data cells of the standardized spreadsheet 512 and/or append additional notes to one or more data cells of the spreadsheet 512 in process step 322. For example, as illustrated in FIG. 33, the user may select a portion 630 of the data statement 510 to be associated with a data cell 632 of the standardized spreadsheet 512. The user may select the portion 630 by dragging or otherwise placing a selection window around the desired area. In response, the selected portion of the data statement 510 is highlighted as illustrated in FIG. 33. If the particular page of the data statement 510 on which the selection window is located has not yet been subjected to the optical character recognition process, the user may apply the optical character recognition process to the relevant page of the data statement 510 (or selection portion of the page in some embodiments) by selecting an OCR button 631 from the top tool bar of the user interface 500. Once the desired portion 630 of the data statement 510 has been selected, and the optical character recognition process has been applied, the user may select the data cell 632 of the spreadsheet 512 to which the portion 630 is to be associated. When the user selects the data cell 632, indicia is placed in the data cell 632 to indicate that it has been mapped to a spatial portion of the data statement 510. For example, as illustrated in FIG. 34, the data cell 632 may be shaded, colored, or otherwise highlighted.

Figure 35:
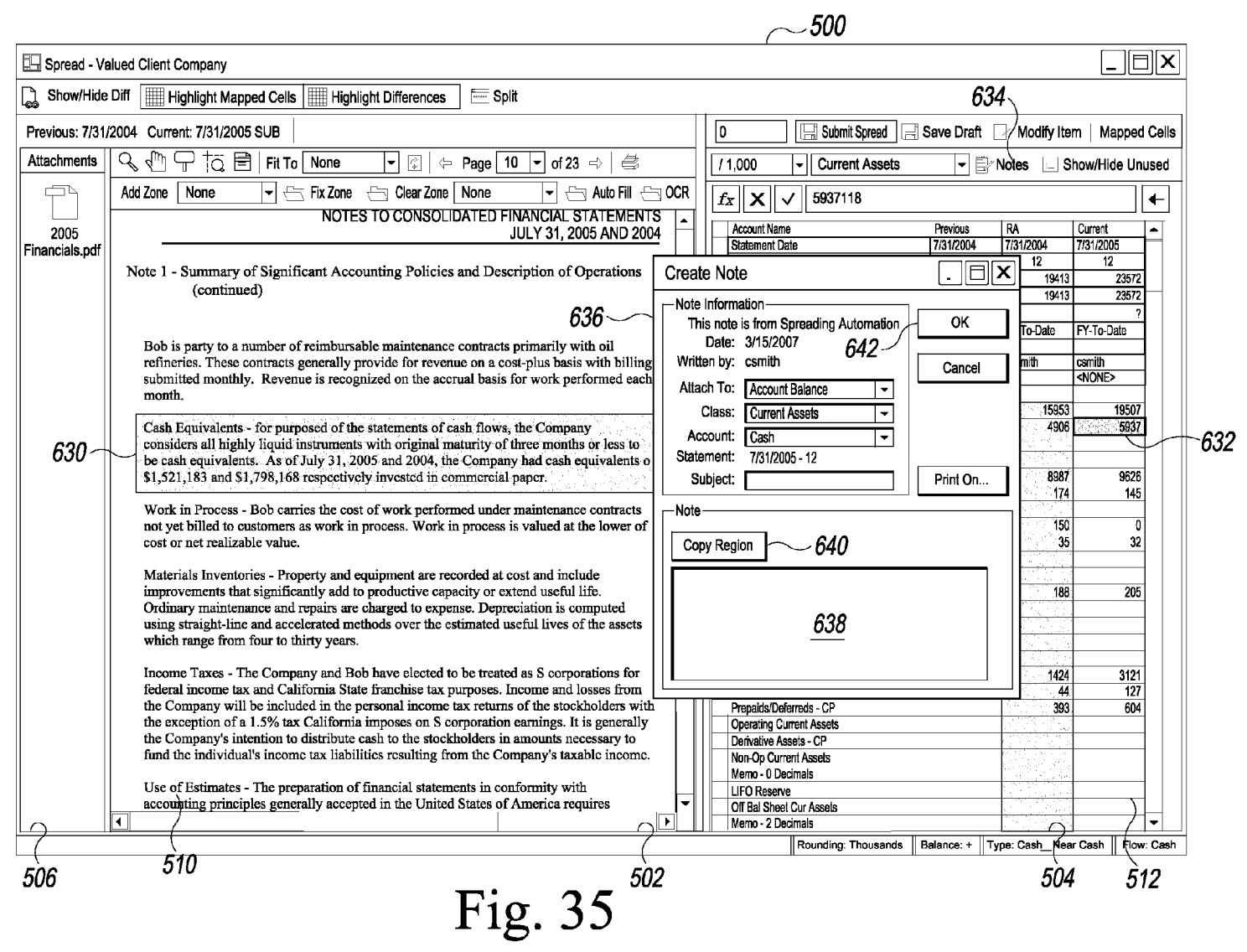
Figure 36:
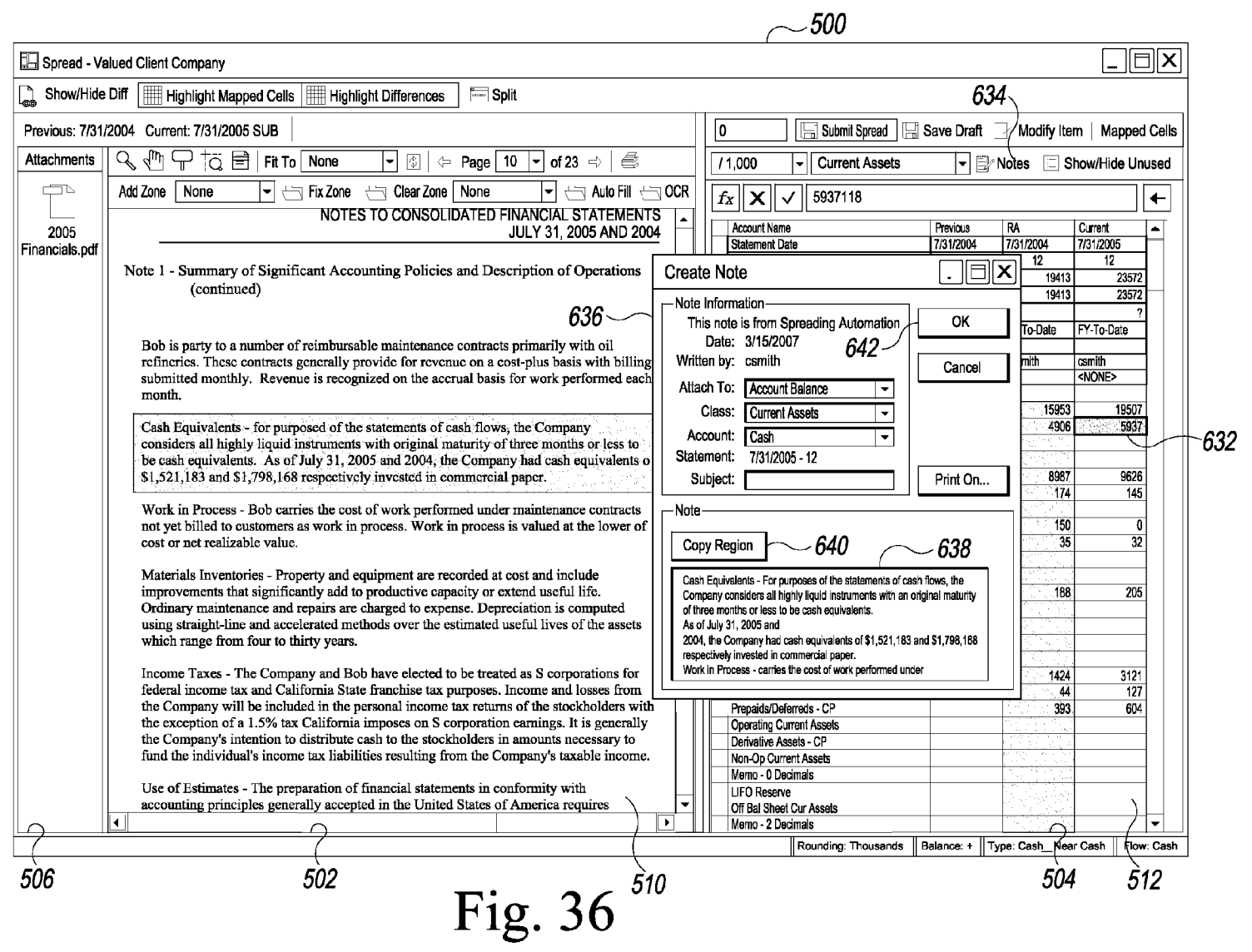
Figure 37:
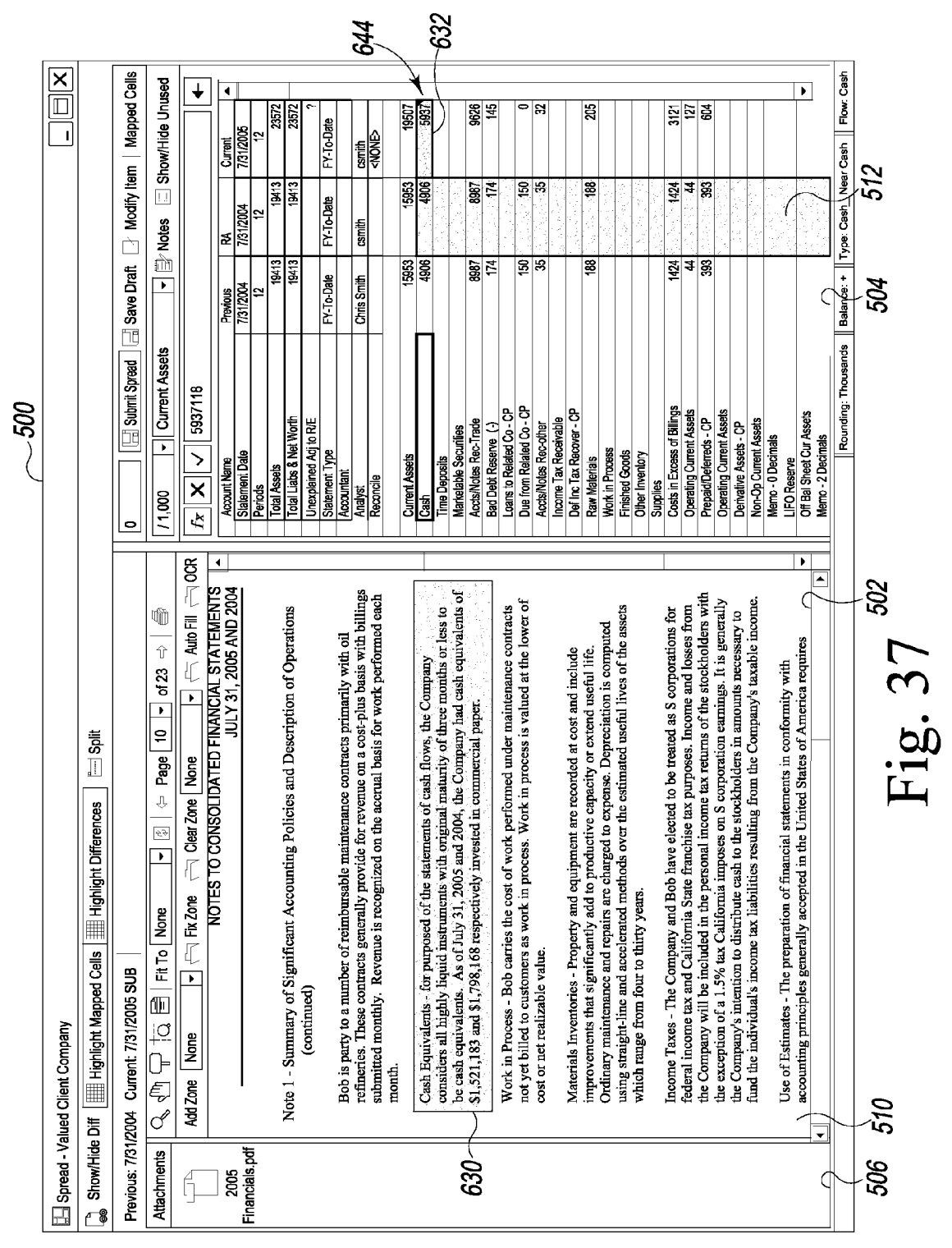

In addition to attached or otherwise associating a region or portion of the data statement 510 to a data cell, the user may attach a note to the data cell 632. For example, as illustrated in FIG. 35, the user may select the data cell 632 and subsequently select a note button 634 located above the standardized spreadsheet 512. In response, a create note window 636 is displayed to the user. The create note window 636 includes a note field 638 in which the user may type the desired note. Additionally or alternatively, the user may select a copy region button 640 to cause text of the selected region 630 of the data statement 512 to be copied into the note field 638 of the window 636 as illustrated in FIG. 36. The user may then edit the copied text and/or append additional notes to the text. Once the user is satisfied with the note, the user may select an OK button 642 to cause the note to be attached to the data cell 632. When a note is attached to a data cell, the data cell may be highlighted or other indicia may be used to indicate that a note is attached. For example, as illustrated in FIG. 37, an arrow 644 is displayed in the upper left-hand corner of the data cell 632 to indicate that a note is attached to the data cell 632.

Figure 38:

The mapping of any data cell may be viewed by selecting a mapped cells button 648 of the user interface 500. For example, the mapping of the data cell 632 may be viewed by selecting the mapped cells button 648. In response, as illustrated in FIG. 38, a mapped cell window 650 is displayed to the user. The mapped cell window 650 displays each item that is mapped to the selected data cell 632. For example, if a numerical value of a data item from one or more zones is mapped to the selected data cell 632, the location of the data item will be displayed in a first column 652 of the mapped cell window 650 and the associated numeric value will be displayed in a second column 654 of the window 650. Additionally, if a selected textual region or portion 630 of the data statement 510 is attached to the data cell 632, the location of the region 630 will be displayed in the first column 652 and the word "region" or other indicia of the type of mapping will be displayed in the second column 654.

Figure 39:
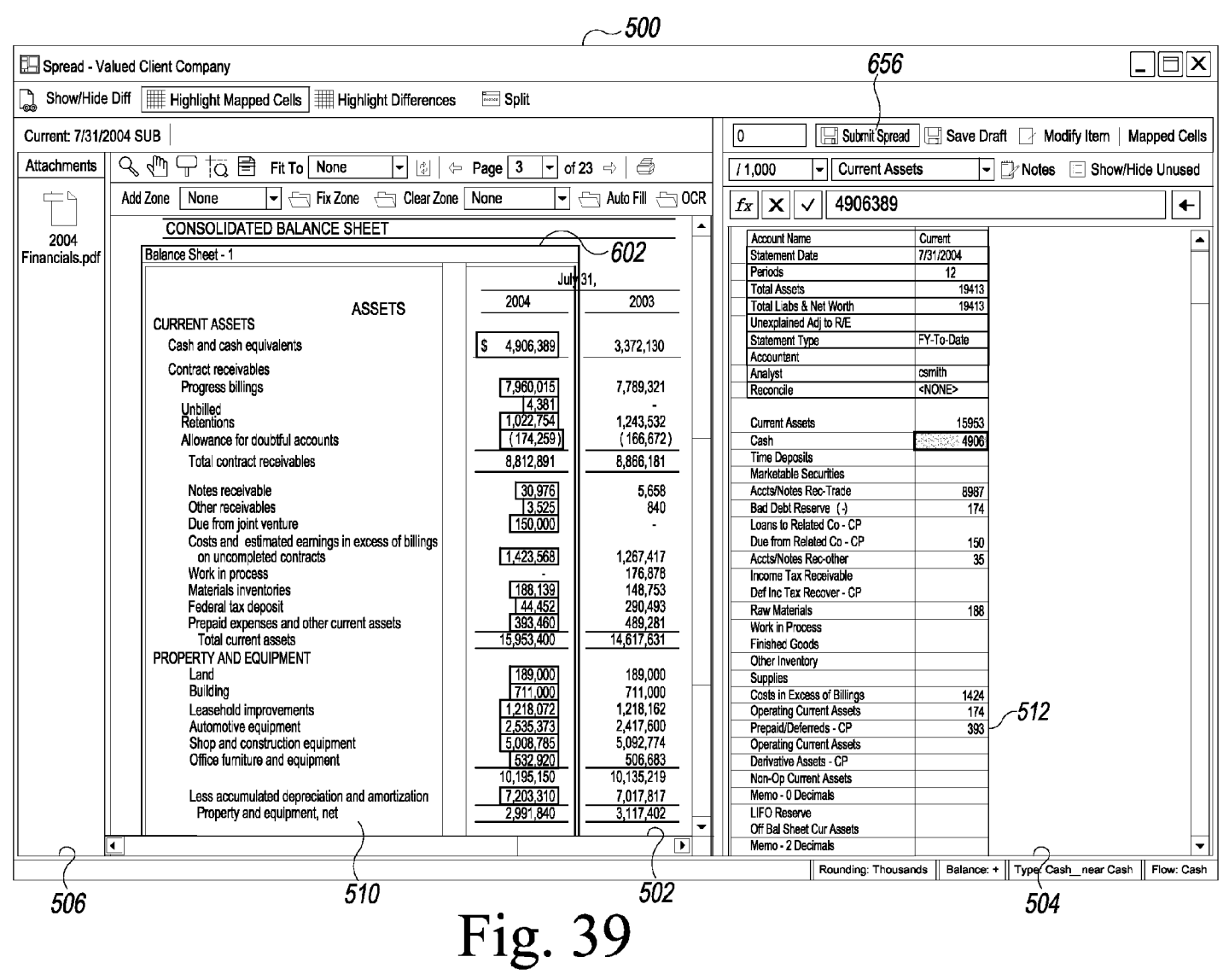

Referring back to process step 322 of the algorithm 300 illustrated in FIG. 14, once the user has mapped each zone applied to the data statement 510 in process steps 318, 320 and attached any spatial regions and/or notes to selected data cells in process step 322, the user may submit the standardized spreadsheet in process step 324. To do so, as illustrated in FIG. 39, the user may select a submit spread button 656 located at the top of the user interface 500. In response, the standardized spreadsheet is submitted to the data analysis software of the data analyzer server 26 as discussed above in regard to process step 72 of algorithm 60 illustrated in FIG. 2. To do so, the data contained in the standardized spreadsheet is converted to a format acceptable by the data analysis software. For example, the data may first be converted to XML data and subsequently to a format acceptable by the data analysis software using an associated API.

Subsequently, in process step 326, the mapping data is stored on the database 22 of the data server 20. The mapping data may be embodied as any data capable of identifying the location of the data item of the data statement 510 associated with a particular data cell of the standardized spreadsheet 512. For example, in embodiments wherein a particular data cell of the standardized spreadsheet 512 is mapped to a zone having a single key or label column and a single data column, the mapping data may include only the key or label associated with the data item that is mapped to the particular data cell. However, if the data cell of the standardized spreadsheet 512 is mapped to a zone having multiple data columns, the mapping data may include the key or label associated with the data item along with other data that identifies which data column the data item is located in (e.g., the data column number). Alternatively, in other embodiments, the mapping data may be embodied as spatial coordinate data that identifies a region or portion of the data statement 510. Regardless, once the mapping data is stored, the mapping data may be retrieved later to facilitate the automatic spreading of subsequent data statements. In addition to the mapping data, the zone data table generated during the optical character recognition process performed in process step 316 is stored. The zone data table may be retrieved later and compared to a new data statement during subsequent spreading as discussed in more detail below in regard to process step 336. Further, the standardized spreadsheet is saved on the database 22 in process step 326. Once the mapping data, zone data table, and standardized spreadsheet have been saved, the algorithm 300 loops back to process step 304 to wait to receive additional data statements.

Figure 40:
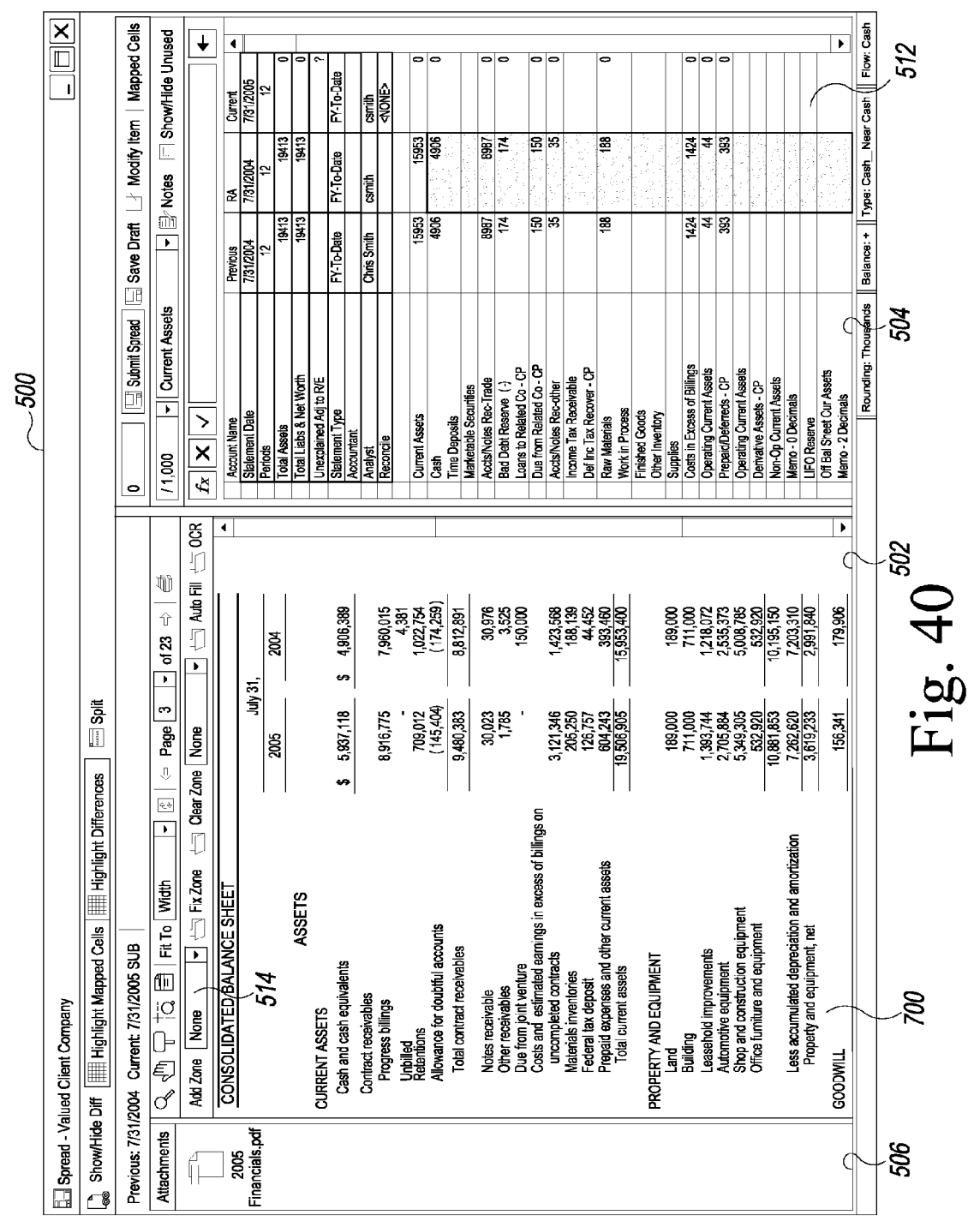
Figure 41:
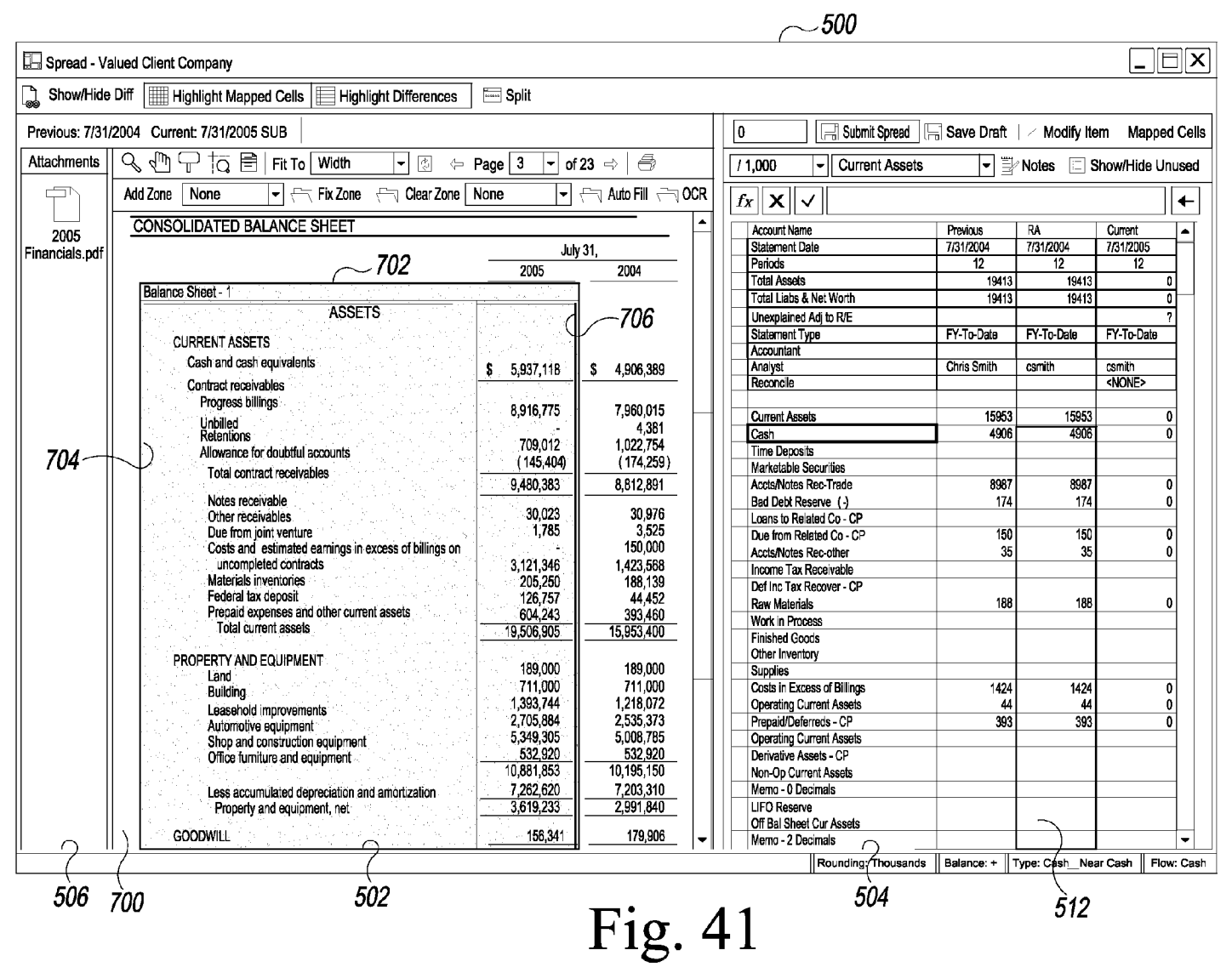

Returning now to step 308, if the current data statement is not the first data statement for the customer to be spread, the algorithm 300 advances to process step 328. As discussed above, the data statement 700 to be spread is displayed in the data statement pane 502 as illustrated in FIG. 40. In process step 328, the user applies a zone to the data statement 700 by selecting the appropriate zone from the drop down menu 514. Once the zone type has been selected from the drop down menu 514, the zone is applied to the data statement 700. For example, the user may select a balance sheet zone from the drop down menu 514. In response, a balance sheet zone 702 is applied over the data statement 700 as illustrated in FIG. 41. The illustrative balance sheet zone 702 is substantially similar to the balance sheet zone 520 and includes a key or label column 704 and a data column 706. However, other zone types and/or zones having other configurations such as multiple data column may be used alternatively or in addition thereto. The balance sheet zone 702 is initially applied to the data statement 700 in a default position. However, in process step 330, the user may reposition the selected zone (e.g., the balance sheet zone 700) and/or resize the zone.

Figure 42:
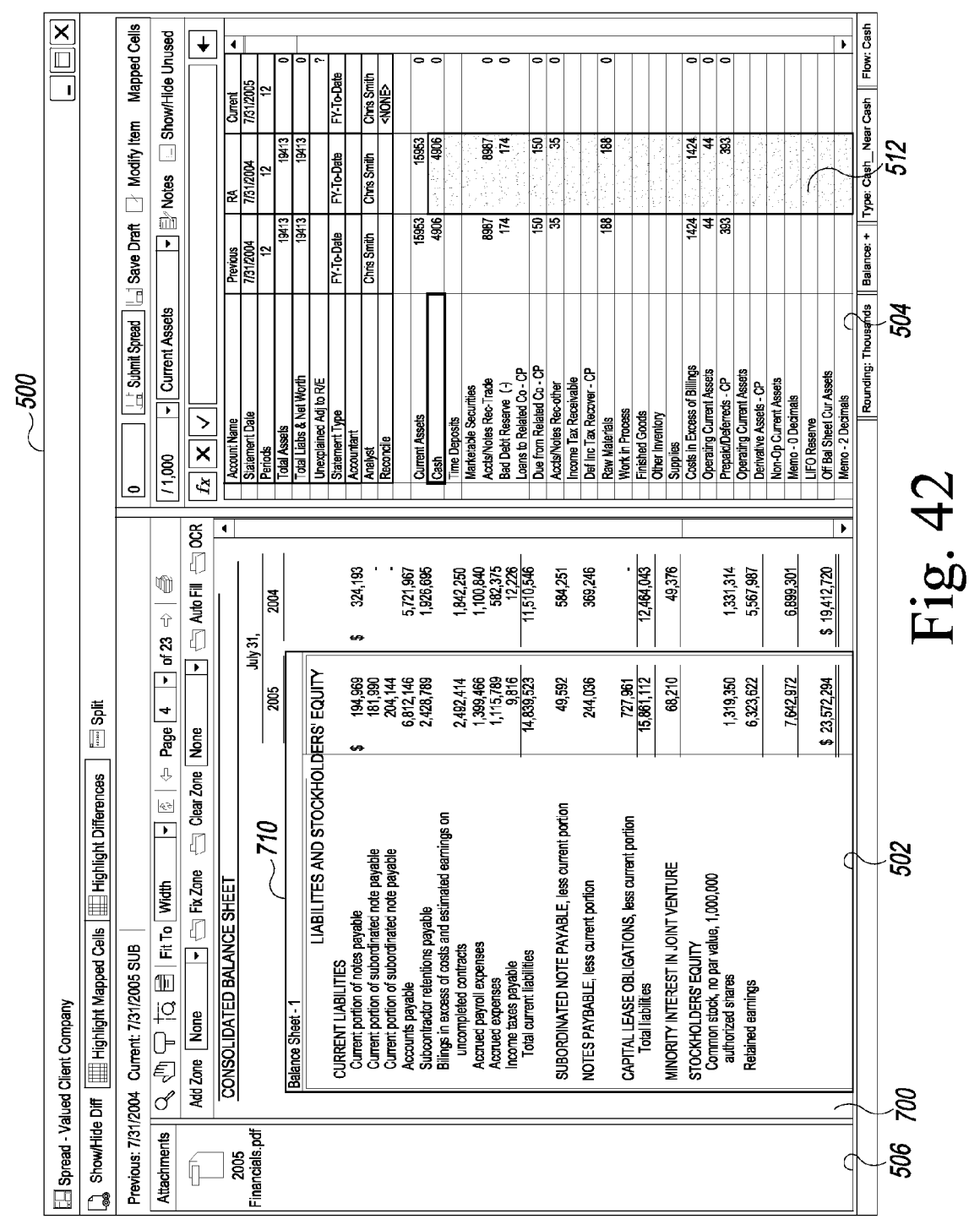
Figure 43:
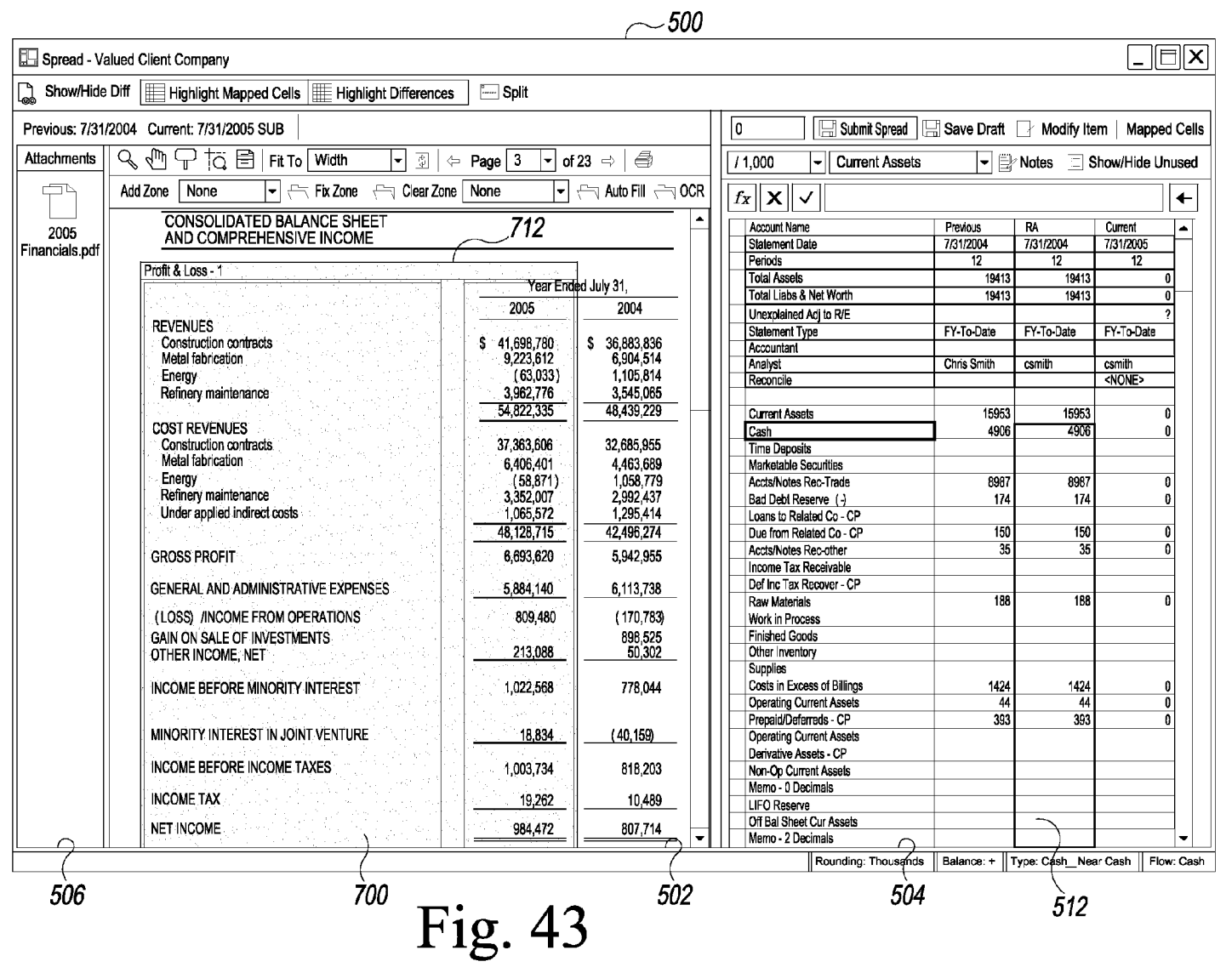

Once the user has positioned and sized the current zone in process step 330, the user may apply additional zones to the data statement 700 in process step 332. In this way, the algorithm 300 loops between process steps 328, 330, and 332 until the user has applied all of the desired zones to the data statement 700. For example, as illustrated in FIGS. 42 and 43, the user may apply, a balance sheet zone 710 to the liabilities portion of the data statement 700 and/or a profit and loss sheet zone 712 to the statement of income portion of the data statement 700. As such, it should be appreciated that the user may apply any number and type of zones to the data statement 700.

Figure 44:
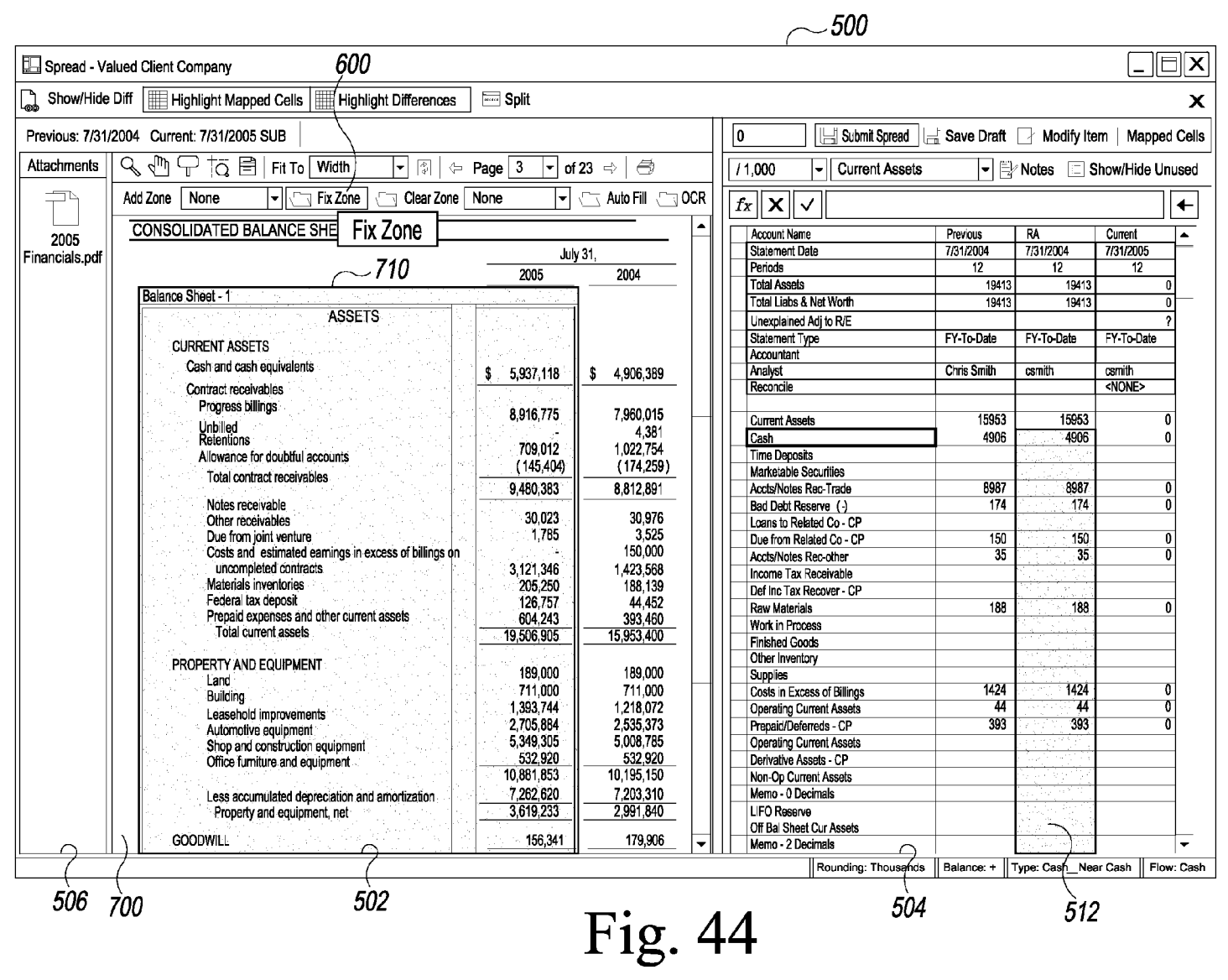

Referring now back to process step 332 of algorithm 300, once the user has applied and positioned all of the desired zones on the data statement 700, the zones are subsequently fixed in process step 334. To do so, the user may select the Fix Zone button 600 from the user interface 500 as illustrated in FIG. 44. Once selected, an optical character recognition (OCR) process is applied to the data statement 700 as discussed above in regard to process step 316. For example, in one embodiment, an optical character recognition process is applied to each page of the data statement 700 on which one or more zones have been applied. Alternatively, in other embodiments, the optical character recognition process may be applied only to those portions of the data statement 700 that are overlaid with a zone. Further, in other embodiments, the complete data statement 700 or portions greater than the overlaid portions of the data statement 700 may be subjected to the optical character recognition process. Additionally, although in the illustrative embodiment the optical character recognition process is not applied to the data statement 700 until the zones have been fixed in process step 334, the optical character recognition process may be applied to the data statement when the data statement is initially received (e.g., in process step 304) in other embodiments. In such embodiments, the data associated with the portions of the data statement overlaid with a zone are retrieved in process step 334.

Again, any optical character recognition process may be used that is capable of converting digital images of text to readable and editable text. Additionally, as described above in regard to process step 316, when the optical character recognition process is applied to the zones, the data generated by the process is stored in a table format of the system 10. As discussed above, all zones of the same type are treated as a portion of a single, larger zone. As such, the system 10 is configured to store the data located in each zone of the same type in a single zone data table (e.g., a balance sheet data table, a profit and loss sheet data table, etc.). It should be appreciated that such zone data tables include all of the data located in the relevant zones. That is, even data that is not subsequenlty mapped to the standaradized spreadsheet is stored in the zone data tables. Once the zones that have been applied to the data statement 700 are fixed in process step 334, each zone may change color, background texture, or other indicia to indicate to the user that the zone has been fixed.

Figure 45:
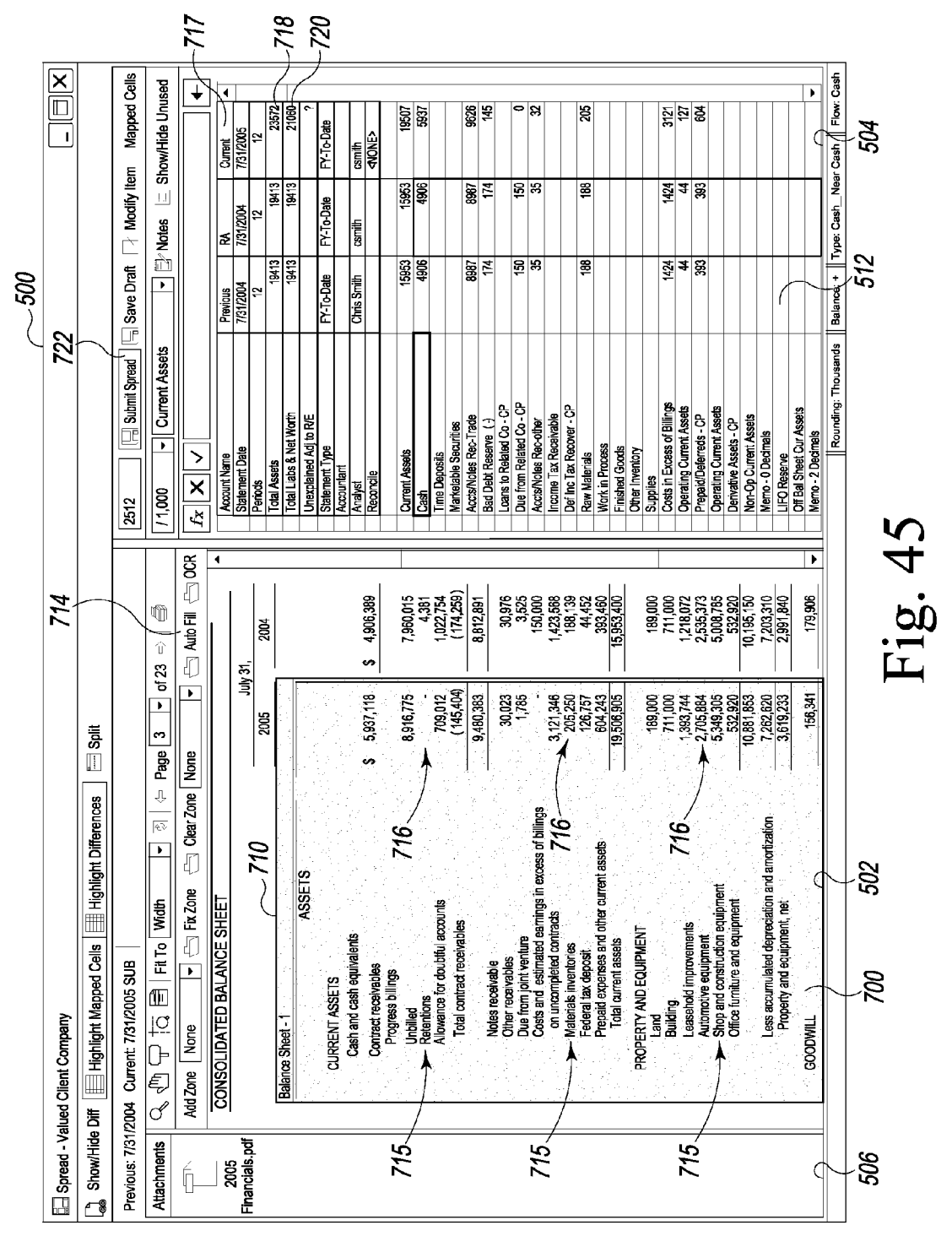

Referring now to FIG. 45, once the optical character recognition process has been applied to the data statement 700 in process step 334, the data statement 700 may be automatically spread by selection of an Auto Fill button 714 in process step 336. In response, the system 10 compares the current data statement with a previously mapped data statement, such as the first data statement 512, in process sub-step 337. To do so, the system 10 retrieves the zone data table for the previously mapped data statement and compares the data of the retrieved zone data table to zone data table for the current data statement 700, which was generated in process step 334. The zone data tables may be compared using any suitable algorithm. For example, an algorithm similar to the algorithm 94 described above in regard to and illustrated in FIGS. 3 and 4. As discussed above in regard to algorithm 94, any differences between the zone data tables are stored in a data structure or other memory location for use with the mapping data associated with the previous data statement during the automatic spreading of the current data statement as discussed below.

Once the current and previous data statements have been compared in process sub-step 337, the mapping data associated with each data cell of the standardized spreadsheet 512 is retrieved in process sub-step 338. As discussed above, the mapping data may be embodied as any type of data that defines the location of particular data items of the data statements 512, 700. Again, in one particular embodiment, the mapping data includes the name or type of zone in which the data item 716 associated with a particular data cell is located (e.g., "Balance Sheet"), the row and/or column of the zone in which the data item 716 is located, the key or label 715 associated with the data item 716, and spatial coordinates of the data item 716 on the digital image of the data statement 700.

The retrieved mapping data is updated or modified based on the comparison of the current and previous data statements performed in process sub-step 336. The mapping data may be updated based on differences between the data statements, known changes in the formatting of the data statements, and/or other criteria. For example, if the mapping data includes the row and column numbers of a data cell of the current data statement, such row and column numbers are updated to reflect the differences between the two data statements. Accordingly, if a row has been added above the mapped row, the row number in the current mapping data will be increased by one. Conversely, if a row has been deleted above the mapped row, the row number in the current mapping data will be decreased by one.

Once the mapping data has been updated based on the comparison performed in process sub-step 338, the current column 717 of the standardized spreadsheet is populated with the numerical, text, or other data from the current data statement 700. To do so, the data of each data item 716 of the data statement 510 (which was determined via the optical character recognition process) is retrieved for each data cell of the standardized spreadsheet 512 based on the updated mapping data. The numerical data is stored in the appropriate data cell of the spreadsheet 512. Additionally, any mathematical algorithm that was stored in association with the data cell is applied to the retrieved numerical data. For example, if several data items 716 are mapped to a single data cell of the standardized spreadsheet 700, the mathematical algorithm associated with the single data cell may result in a summation of each numerical value or the like.

When the user selects the Auto Fill button 714, the data of each zone that has been applied to the data statement 700 is mapped to the standardized spreadsheet 512. Once done, the system 10 determines the balance of the standardized spreadsheet 512 and whether any errors have occurred in process step 338. For example, as illustrated in FIG. 45, the system 10 may be configured to determine the value of the total assets 718 and the total liabilities and net worth 720 for the current period 717 of the data statement 700. The difference between these two values (i.e., between the total assets 718 and the total liabilities and net worth 720) is displayed in a balance window 722. If these values are different, the difference will be displayed in the window 722. In some embodiments, the window may also be highlighted or shaded to notify the user that the total assets 718 and the total liabilities and net worth 720 are different. For example, the balance window 722 may be highlighted red if the values are different. Alternatively, if the two values are equal, a zero is displayed in the balance window 722. Additionally, the window may also be highlighted or shaded to notify the user that the total assets 718 and the total liabilities and net worth 720 match. For example, the balance window 722 may be highlighted green if the values match.

Figure 46:
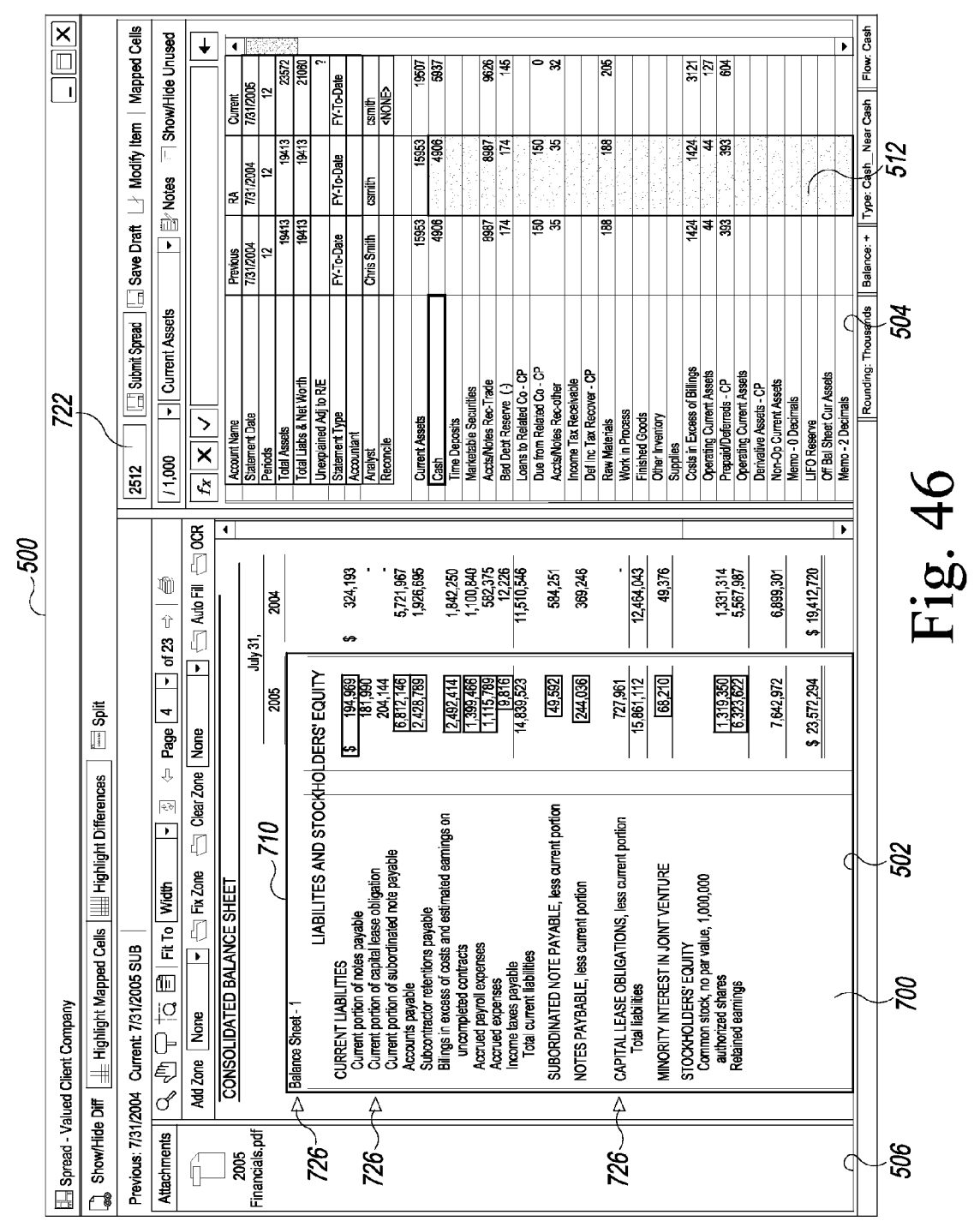
Figure 47:
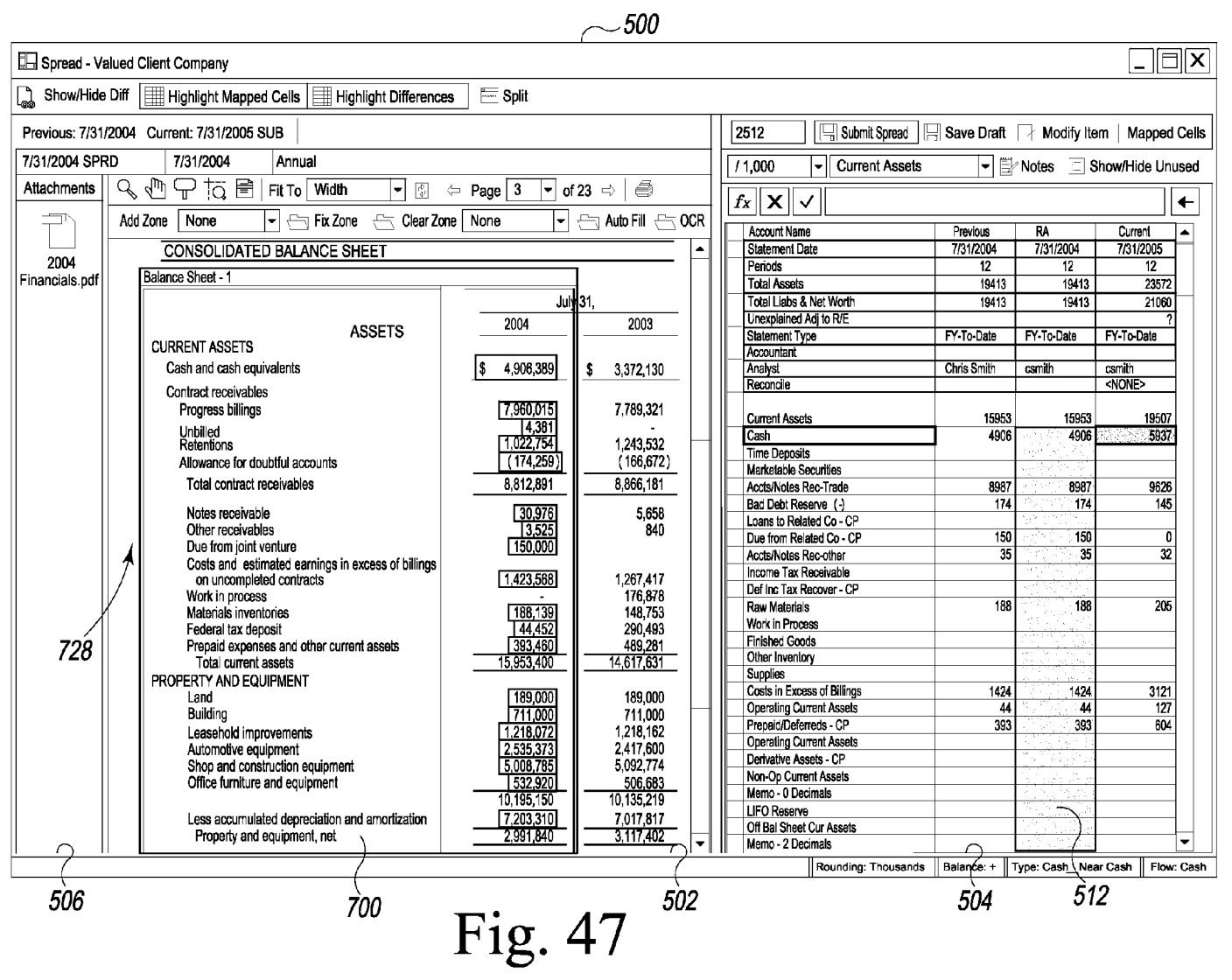

If the total assets 718 and total liabilities and net worth 720 are different, the user may browse through each zone applied to the current data statement 700 to determine if any errors have occurred. For example, rows may have been added or deleted to or from the current data statement 700 compared to previous statements. As illustrated in FIG. 46, any rows that have been added to the current data statement 700 relative to previous statements are identified by an inwardly pointing arrow marker 726 or other indicia. Similarly, as illustrated in FIG. 47, any rows that have been deleted from the current data statement 700 relative to previous statements are identified by an outwardly pointing arrow marker 728 or other indicia.

Figure 49:
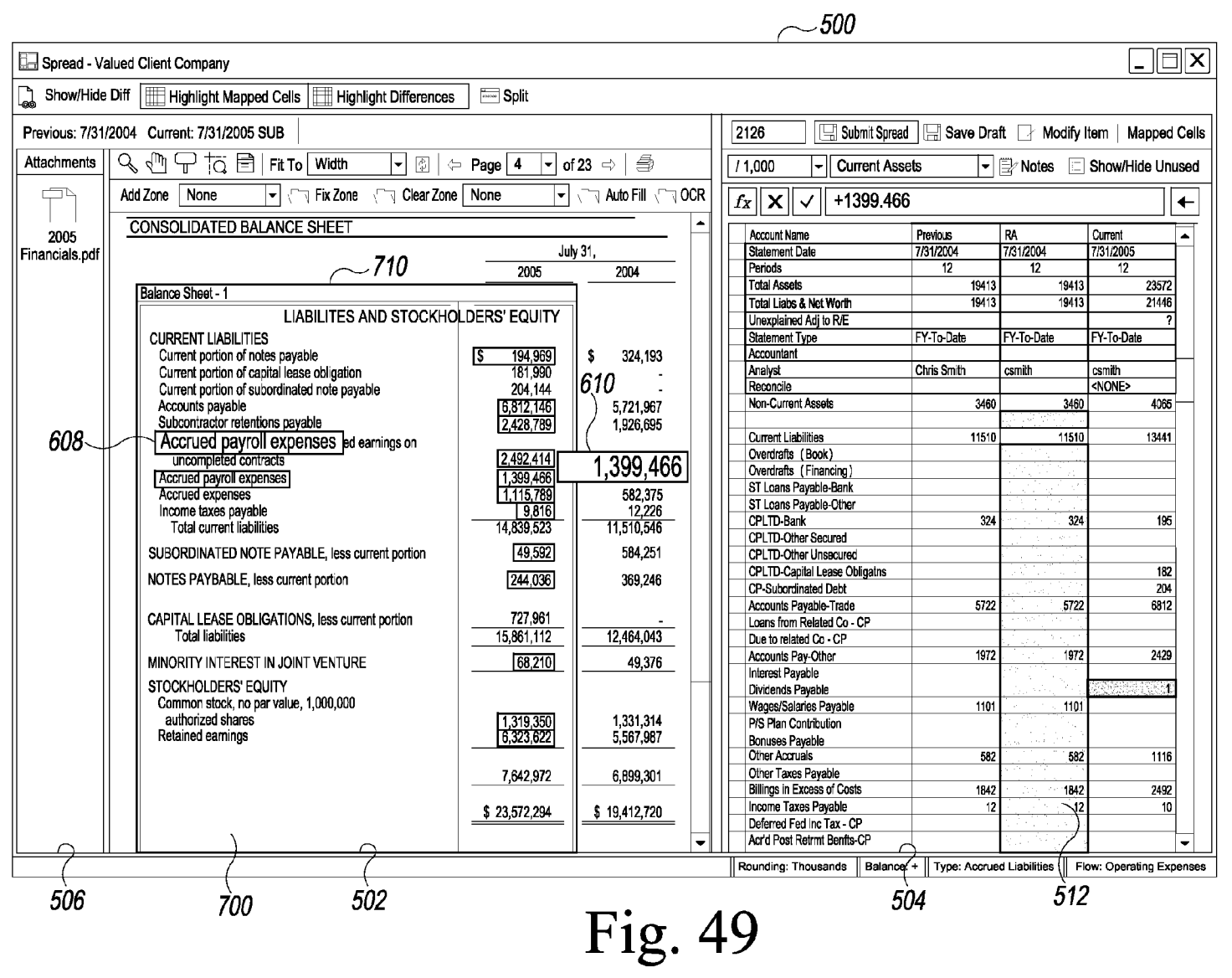
Figure 50:
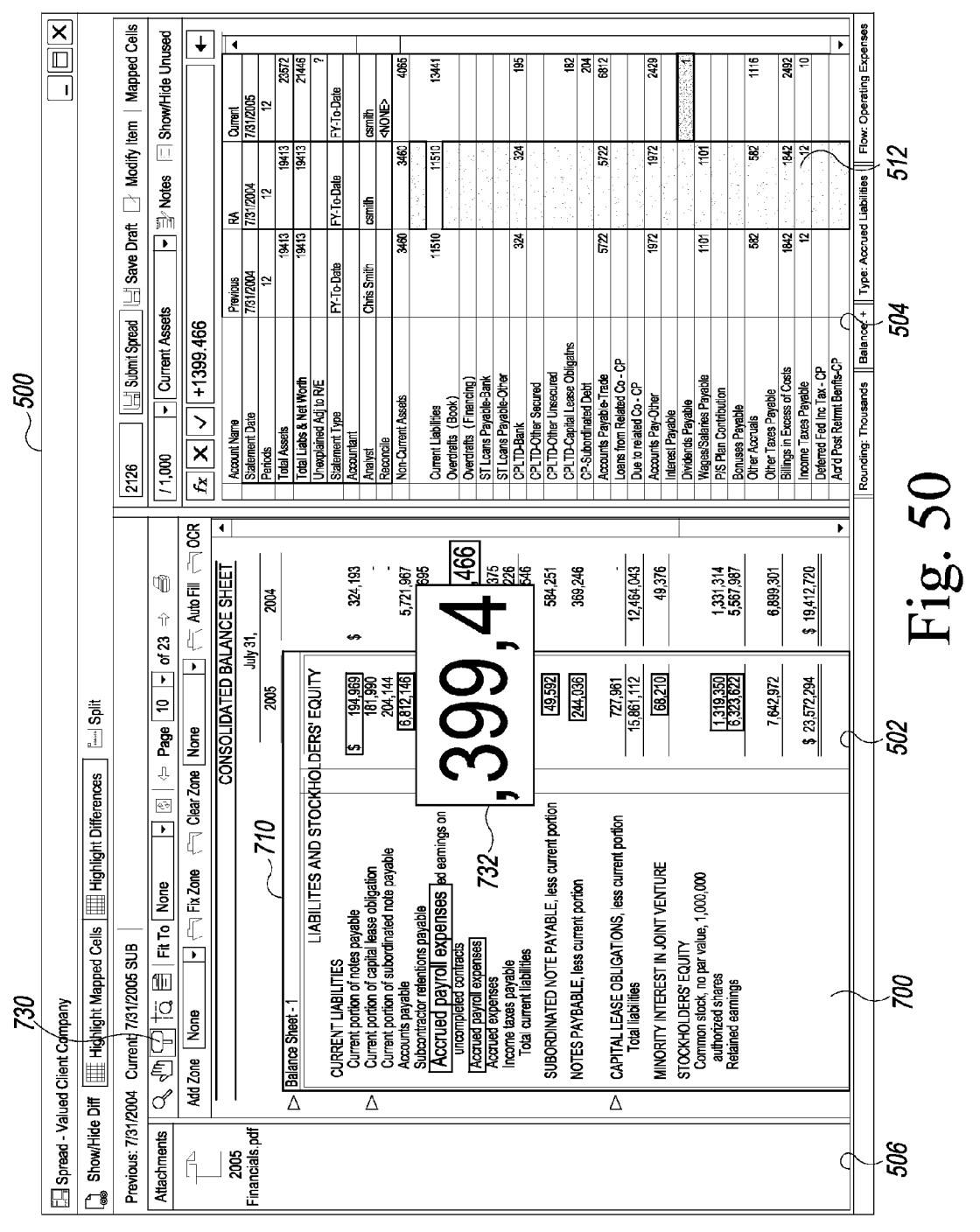
Figure 51:
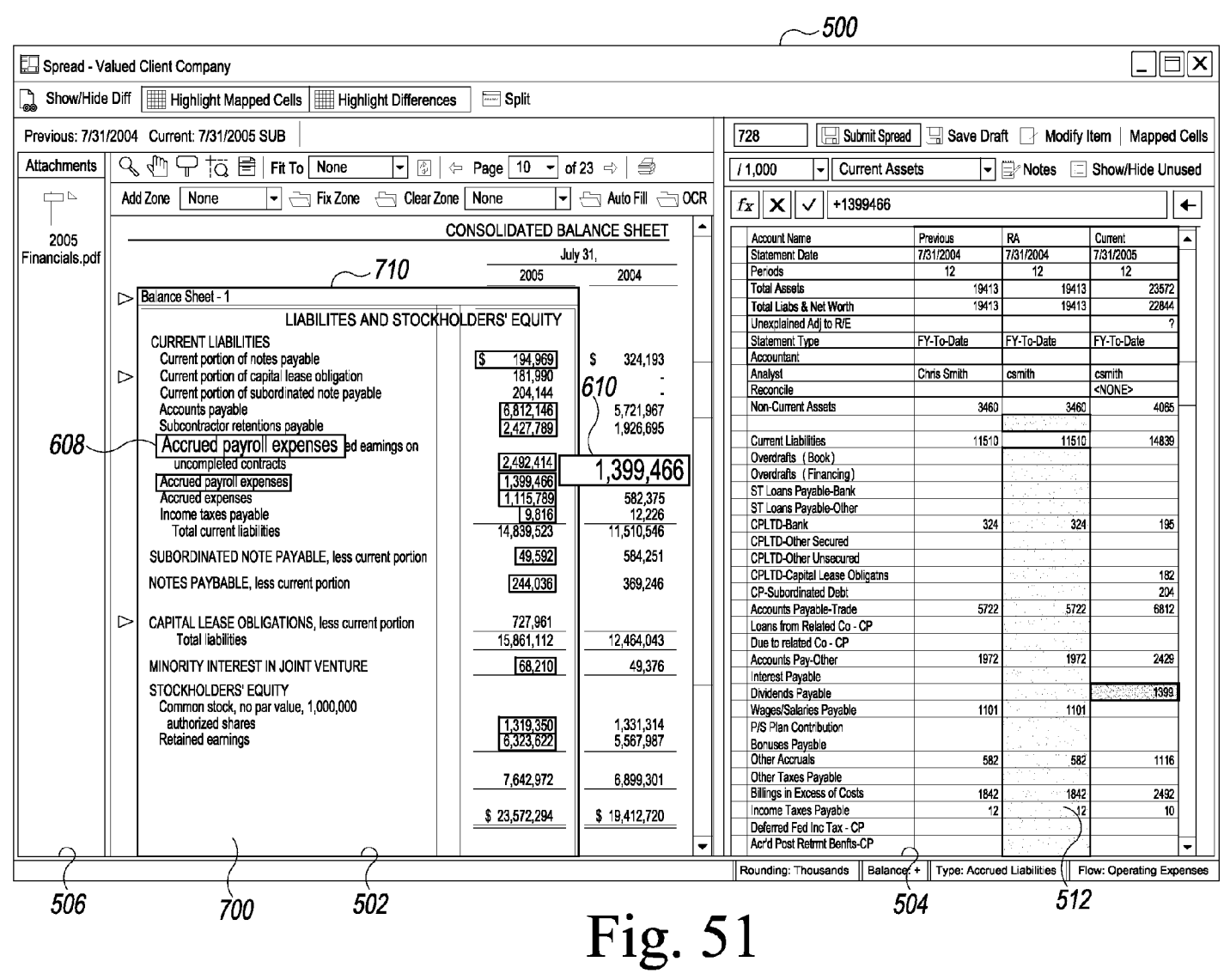

In process step 340, the algorithm 300 determines if the user would like to map any of the added rows to the data cells of the standardized spreadsheet 512. If so, the algorithm 300 advances to process step 342 and 344 in which the user manually maps the data item of each added row to a data cell of the standardized spreadsheet 512 as discussed in detail above in regard to process steps 318 and 320. Once the user has mapped the added rows, the algorithm 300 advances to process step 346 in which the user may fix any additional errors. Such errors may be generated during the optical character recognition process. For example, as illustrated in FIG. 49, the numerical value, text, or other data displayed in the data window 610 may be inaccurate compared to the actual number of the data statement. Such inaccuracies may occur more frequently when the digital image of the data statement 700 is of poor quality such as a facsimile image. The actual number or other data may be better view by selection of a Magnify button 730 as illustrated in FIG. 50. In response, a magnification window 732 is displayed to the user. The magnification window 732 may be moved around the data statement 700 and magnifies the underlying data of the data statement 700. As such, a user may use the window 732 to determine what is the actual number or text of the data statement 700. As illustrated in FIG. 51, the user may subsequently edit or change the numeric value, text, or other data displayed in the data window 610 and/or the text displayed in the key window 608. The mapped data cell of the standardized spreadsheet 512 is subsequently updated with the new and correct numerical value.

It should be appreciated that in some embodiments, the system 10 may be configured to analyze each numeric value of each data item generated from the optical character recognition process for similarity with surrounding values to determine any optional errors. For example, if one numerical value has more decimal places than surrounding values, such a configuration may be an indication of an error. Additionally, in some embodiments, the system 10 may be configured to perform spelling and/or grammatical checks on the key or label data of each key or label generated from the optical character recognition process to determine if spelling and usage is correct. If the system 10 determines the occurrence of a potential error, the system 10 may be configured to highlight the data item or key from which the erroneous optical character recognition data was generated. In this way, the user is provided notification of potential errors and may fix such errors as appropriate.

Figure 52:
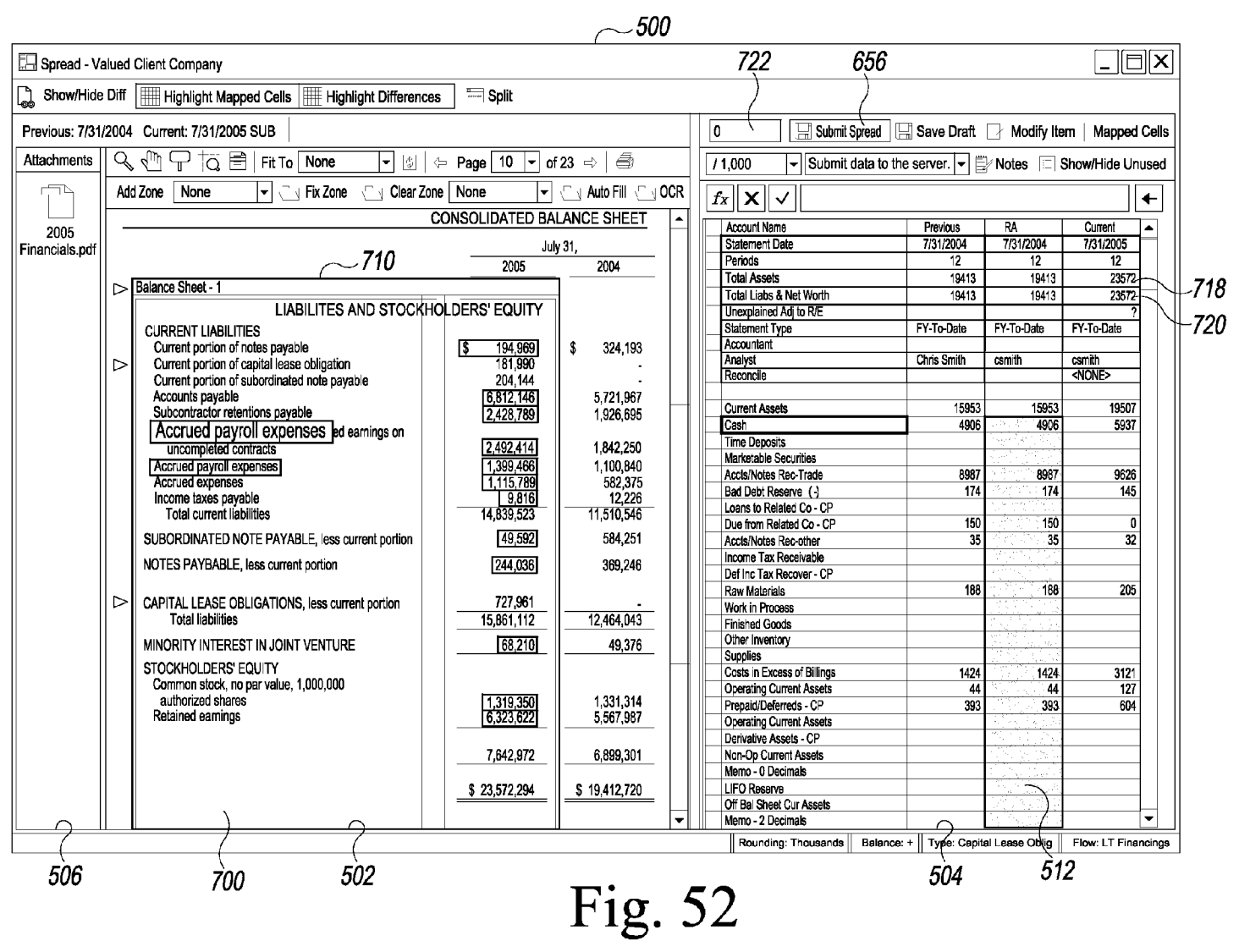

Once any errors have been corrected in process step 346, the algorithm 300 advances to process step 348 in which the user may associate regions of the data statement to the selected data cell of the standardized spreadsheet 512 and/or add notes to such data cells as discussed in detail above in regard to process step 322. Once the user has attached any spatial regions and/or notes to selected data cells, the user may submit the standardized spreadsheet in process step 350. To do so, as illustrated in FIG. 52, the user may select a submit spread button 656 located at the top of the user interface 500. In response, the standardized spreadsheet is submitted to the data analysis software of the data analyzer server 26 as discussed above in regard to process step 72 of algorithm 60 illustrated in FIG. 2. To do so, the data contained in the standardized spreadsheet is converted to a format acceptable by the data analysis software. For example, the data may first be converted to XML data and subsequently to a format acceptable by the data analysis software using an associated API. Subsequently, in process step 352, the mapping data is stored on the database 22 of the data server 20. As discussed above in regard to process step 326, the mapping data may be embodied as any data capable of identifying the location of the data item of the data statement 700 associated with a particular data cell of the standardized spreadsheet 512.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. For example, although specific data rate values and ranges and specific frequency values and ranges have been disclosed in various embodiments, it should be appreciated that data rates and/or frequencies near such values may be in used in other embodiments.

There are a plurality of advantages of the present disclosure arising from the various features of the systems and methods described herein. It will be noted that alternative embodiments of the systems and methods of the present disclosure may not include all of the features described yet still benefit from at least some of the advantages of such features. Those of ordinary skill in the art may readily devise their own implementations of the systems and methods that incorporate one or more of the features of the present invention and fall within the spirit and scope of the present disclosure as defined by the appended claims.

The invention claimed is:

1. A method for managing a standardized spreadsheet, the method comprising:
displaying a digital image of a first data statement and the standardized spreadsheet to a user;
determining data of the first data statement based on the digital image;
determining a first portion of the digital image based on a first selection made by the user;
determining a data cell of the standardized spreadsheet based on a second selection made by the user;
mapping the data cell of the standardized spreadsheet to the first portion of the digital image;
receiving a digital image of a second data statement;
comparing the first and second data statements;
determining data of the second data statement based on the comparing step; and
storing the data of the second data statement in the standardized spreadsheet based on the mapping step.

2. The method of claim 1, wherein determining data of the first data statement based on the digital image comprises performing an optical character recognition process on the digital image.

3. The method of claim 2, wherein performing the optical character recognition process to the digital image comprises performing the optical character recognition process on a portion of the digital image less than the entire digital image.

4. The method of claim 2, further comprising selecting a second portion of the digital image including the first portion, wherein performing the optical character recognition process on the digital image comprises performing the optical character recognition process on the second portion of the digital image.

5. The method of claim 1, wherein determining the first portion of the digital image based on a first selection by the user comprises determining a set of coordinates of a spatial portion based on the first selection by the user.

6. The method of claim 1, wherein determining a data cell of the standardized spreadsheet comprises determining a data cell of an industry financial model spreadsheet based on the second selection made by the user.

7. The method of claim 1, wherein mapping the data cell of the standardized spreadsheet to the first portion of the digital image comprises mapping the data cell of the standardized spreadsheet to the first portion of the digital image using at least a portion of the data.

8. The method of claim 1, wherein the data of the first data statement includes a label and an associated numerical value.

9. The method of claim 8, wherein mapping the data cell of the standardized spreadsheet to the first portion of the digital image comprises storing the label in a relationship to the data cell of the standardized spreadsheet.

10. The method of claim 8, further comprising copying the numerical value into the data cell of the standardized spreadsheet.

11. The method of claim 8, further comprising indicating errors in the data of the first data statement to the user.

12. The method of claim 11, wherein indicating errors in the data of the first data statement to the user comprising determining the validity of the numeric value.

13. The method of claim 11, wherein indicating errors in the data of the first data statement to the user comprises determining the validity of the spelling of the label.

14. The method of claim 13, wherein indicating errors in the data of the first data statement to the user comprises highlighting a portion of the digital image.

15. The method of claim 1, wherein the data of the first data statement includes a label and associated textual data.

16. The method of claim 1, further comprising:
selecting a second portion of the digital image including the first portion;
determining data of the data statement located in the second portion; and
storing the data of the second portion.

17. The method of claim 16, wherein storing the data of the second portion comprises storing the data of the second portion in a table.

18. The method of claim 17, wherein mapping the data cell of the standardized spreadsheet to the first portion of the digital image comprises:
determining first data indicative of the identity of the second portion; and
determining second data indicative of the location of the first portion in the second portion.

19. The method of claim 18, wherein mapping the data cell of the standardized spreadsheet to the first portion of the digital image comprises determining third data indicative of the spatial location of the first portion on the digital image.

20. The method of claim 19, wherein the first data is a name associated with the second portion, the second data includes a row number of the table, and the third data includes a set of coordinates.

21. The method of claim 1, further comprising indicating differences of the data of the second data statement relative to the data of the first data statement.

22. The method of claim 21, wherein indicating differences of the data of the second data statement comprises indicating whether a row has been added to the second data statement relative to the first data statement.

23. The method of claim 21, wherein indicating differences of the data of the second data statement comprises indicating whether a row has been deleted from the second data statement relative to the first data statement.

24. The method of claim 1, further comprising indicating to the user that the data cell of the standardized spreadsheet is mapped to the portion of the first data statement.

25. The method of claim 1, further comprising:
determining a second portion of the digital image of the data statement based on a selection made by the user; and
associating the second portion of the digital image to the data cell of the standardized spreadsheet.

26. The method of claim 25, further comprising indicating to the user that the data cell has been associated with the second portion.

27. The method of claim 25, further comprising determining the data of the second portion of the digital image, wherein associating the second portion of the digital image to the data cell of the standardized spreadsheet comprises associating the data of the second portion of the digital image to the data cell of the standardized spreadsheet.

28. A computer comprising:
a processor, and
a memory device electrically coupled to the processor, the memory device having stored therein a plurality of instructions which, when executed by the processor, cause the processor to:
display a digital image of a first data statement and a standardized spreadsheet to a user;
determine a first portion of the digital image based on a first selection made by the user;
perform an optical character recognition process on the first portion of the digital image to determine data of the first data statement;
determine a second portion of the digital image within the first portion based on a second selection by the user;
determine a data cell of the standardized spreadsheet based on a third selection made by the user;
map the data cell of the standardized spreadsheet to the second portion of the digital image;
receive a digital image of a second data statement;
compare the first and second data statements;
determine data of the second data statement based the compare step; and
store the data of the second data statement in the standardized spreadsheet based on the mapping step.

29. The computer of claim 28, wherein to map the data cell of the standardized spreadsheet to the second portion of the digital image comprises to map the data cell of the standardized spreadsheet to the first portion of the digital image using at least a portion of the data.

30. The computer of claim 28, wherein the data of the first data statement includes a label and an associated numeric value.

31. The computer of claim 30, wherein to map the data cell of the standardized spreadsheet to the second portion of the digital image comprises to store the label in a relationship to the data cell of the standardized spreadsheet.

32. The computer of claim 30, wherein the plurality of instructions further cause the processor to copy the numeric value into the data cell of the standardized spreadsheet.

33. The computer of claim 30, wherein the plurality of instructions further cause the processor to determine the validity of the numeric value.

34. The computer of claim 28, wherein to determine data of the second data statement comprises to:
perform an optical character recognition process on the first portion of the digital image of the second data statement to data of the second data statement.

35. The computer of claim 34, wherein the plurality of instructions further cause the processor to indicate differences of the data of the second data statement relative to the data of the first data statement.

36. The computer of claim 28, wherein the plurality of instructions further cause the processor to:
determine a second portion of the digital image of the data statement based on a fifth selection made by the user; and
associate the second portion of the digital image to the data cell of the standardized spreadsheet.

37. The computer of claim 36, wherein the plurality of instructions further cause the processor to determine the data of the second portion of the digital image, wherein to associate the second portion of the digital image to the data cell of the standardized spreadsheet comprises to associate the data of the second portion of the digital image to the data cell of the standardized spreadsheet.

* * * * *